United States Patent
Jones et al.

(10) Patent No.: US 10,372,315 B2
(45) Date of Patent: Aug. 6, 2019

(54) LOCATION-AWARE CONFERENCING WITH CALENDAR FUNCTIONS

(75) Inventors: Boland T. Jones, Atlanta, GA (US); Peter Stewart, Berkeley Lake, GA (US); David Michael Guthrie, Atlanta, GA (US); Scott A. Schemmel, Alpharetta, GA (US)

(73) Assignee: American Teleconferencing Services, Ltd, Atlanta, GA (US)

( * ) Notice: Subject to any disclaimer, the term of this patent is extended or adjusted under 35 U.S.C. 154(b) by 159 days.

(21) Appl. No.: 12/771,742

(22) Filed: Apr. 30, 2010

(65) Prior Publication Data

US 2011/0271206 A1 Nov. 3, 2011

(51) Int. Cl.
*G06F 3/0481* (2013.01)
*G06F 3/0488* (2013.01)
*G06F 3/0486* (2013.01)

(52) U.S. Cl.
CPC .......... *G06F 3/0488* (2013.01); *G06F 3/0486* (2013.01)

(58) Field of Classification Search
CPC .................................................... G06F 3/0481
USPC ......................................................... 715/753
See application file for complete search history.

(56) References Cited

U.S. PATENT DOCUMENTS

| | | | |
|---|---|---|---|
| 5,544,291 A | 8/1996 | Gilley | |
| 5,737,452 A | 4/1998 | Schiller | |
| 5,745,666 A | 4/1998 | Gilley | |
| 5,793,365 A * | 8/1998 | Tang .................... | G06Q 10/10 715/758 |
| 5,930,396 A | 7/1999 | Fiala | |
| 6,049,339 A | 4/2000 | Schiller | |
| 6,067,094 A | 5/2000 | Schuster | |
| 6,072,502 A | 6/2000 | Gupta | |
| 6,101,480 A * | 8/2000 | Conmy et al. ............... | 705/7.18 |
| 6,167,432 A | 12/2000 | Jiang | |
| 6,208,355 B1 | 3/2001 | Schuster | |
| 6,233,389 B1 | 5/2001 | Barton | |
| 6,262,745 B1 | 7/2001 | Perani | |
| 6,278,478 B1 | 8/2001 | Ferriere | |
| 6,279,028 B1 | 8/2001 | Bradshaw, Jr. | |
| 6,304,677 B1 | 10/2001 | Schuster | |
| 6,411,742 B1 | 6/2002 | Peterson | |

(Continued)

FOREIGN PATENT DOCUMENTS

EP 1930846 A1 * 6/2008

OTHER PUBLICATIONS

"Xobni: One-Click Scheduling" by Xobni, archived by the Internet Wayback Machine on Dec. 26, 2008, downloaded on Dec. 25th, 2014 from https://web.archive.org/web/20081226015801/http://www.xobni.com/learnmore/letsmeet.*

*Primary Examiner* — Matthew Ell
(74) *Attorney, Agent, or Firm* — Robert A. Blaha; Smith Tempel Blaha LLC

(57) ABSTRACT

A method for providing a virtual conference is described. The method includes: a conferencing system receiving a request to schedule a meeting; the conferencing system displaying a calendar associated with a first conference participant identifier of the virtual conference; and the conferencing system receiving a request to retrieve calendar data associated with one or more second conference participant identifiers of the virtual conference. The conferencing system then receives calendar data through one or more communication channels associated with one or more second conference participant identifiers.

12 Claims, 69 Drawing Sheets

(56) References Cited

U.S. PATENT DOCUMENTS

| | | | |
|---|---|---|---|
| 6,477,240 B1 | 11/2002 | Lim | |
| 6,567,813 B1 | 5/2003 | Zhu | |
| 6,574,599 B1 | 6/2003 | Lim | |
| 6,584,493 B1 | 6/2003 | Butler | |
| 6,598,075 B1 | 7/2003 | Johnson | |
| 6,601,087 B1 | 7/2003 | Zhu | |
| 6,643,362 B2 | 11/2003 | Hogan | |
| 6,646,655 B1 | 11/2003 | Brandt | |
| 6,654,032 B1 | 11/2003 | Zhu | |
| 6,691,154 B1 | 2/2004 | Zhu | |
| 6,721,446 B1 | 4/2004 | Wilensky | |
| 6,763,501 B1 | 7/2004 | Zhu | |
| 6,771,303 B2 | 8/2004 | Zhang | |
| 6,789,119 B1 | 9/2004 | Zhu | |
| 6,891,929 B2 | 5/2005 | Yang | |
| 6,901,448 B2 | 5/2005 | Zhu | |
| 6,925,645 B2 | 8/2005 | Zhu | |
| 6,954,216 B1 | 10/2005 | Dowling | |
| 6,961,736 B1 | 11/2005 | Amirghodsi | |
| 6,968,179 B1 | 11/2005 | De Vries | |
| 6,988,132 B2 | 1/2006 | Horvitz | |
| 6,990,252 B2 | 1/2006 | Shekter | |
| 7,003,061 B2 | 2/2006 | Wilensky | |
| 7,006,707 B2 | 2/2006 | Peterson | |
| 7,023,800 B1 | 4/2006 | McAuley | |
| 7,069,298 B2 | 6/2006 | Zhu | |
| 7,095,905 B1 | 8/2006 | Peterson | |
| 7,103,236 B2 | 9/2006 | Peterson | |
| 7,130,883 B2 | 10/2006 | Zhu | |
| 7,136,062 B1 | 11/2006 | Butler | |
| 7,143,132 B2 | 11/2006 | Afula | |
| 7,146,577 B2 | 12/2006 | Hoffman | |
| 7,158,616 B2 | 1/2007 | Yang | |
| 7,167,182 B2 | 1/2007 | Butler | |
| 7,184,602 B2 | 2/2007 | Morris | |
| 7,200,213 B2 | 4/2007 | Zhu | |
| 7,203,755 B2 | 4/2007 | Zhu | |
| 7,213,051 B2 | 5/2007 | Zhu | |
| 7,216,147 B2 | 5/2007 | Blagsvedt | |
| 7,216,172 B2 | 5/2007 | Yang | |
| 7,228,332 B2 | 6/2007 | Rust | |
| 7,236,926 B2 | 6/2007 | Scherpbier | |
| 7,260,278 B2 | 8/2007 | Zhang | |
| 7,272,658 B1 | 9/2007 | Edelman | |
| 7,302,594 B2 | 11/2007 | Di Benedetto | |
| 7,313,595 B2 | 12/2007 | Rust | |
| 7,317,826 B2 | 1/2008 | Wilensky | |
| 7,328,239 B1 | 2/2008 | Berberian | |
| 7,346,631 B2 | 3/2008 | Amirghodsi | |
| 7,349,944 B2 | 3/2008 | Vernon | |
| 7,352,858 B2 | 4/2008 | Stokes | |
| 7,355,622 B2 | 4/2008 | Clarke | |
| 7,355,623 B2 | 4/2008 | Cutler | |
| 7,360,152 B2 | 4/2008 | Capps | |
| 7,360,172 B2 | 4/2008 | Grossman | |
| 7,362,350 B2 | 4/2008 | Cutler | |
| 7,373,381 B2 | 5/2008 | Rust | |
| 7,386,188 B2 | 6/2008 | Peterson | |
| 7,386,784 B2 | 6/2008 | Capps | |
| 7,389,351 B2 | 6/2008 | Horvitz | |
| 7,395,221 B2 * | 7/2008 | Doss et al. | 705/7.19 |
| 7,395,312 B2 | 7/2008 | Kothari | |
| 7,398,295 B2 | 7/2008 | Shoroff | |
| 7,421,069 B2 | 9/2008 | Vernon | |
| 7,421,114 B1 | 9/2008 | Brandt | |
| 7,426,297 B2 | 9/2008 | Zhang | |
| 7,426,578 B2 | 9/2008 | Jones | |
| 7,428,330 B2 | 9/2008 | Blake | |
| 7,471,849 B2 | 12/2008 | Peterson | |
| 7,512,262 B2 | 3/2009 | Criminisi | |
| 7,512,883 B2 | 3/2009 | Wallick | |
| 7,515,173 B2 | 4/2009 | Zhang | |
| 7,518,623 B2 | 4/2009 | Dowling | |
| 7,518,631 B2 | 4/2009 | Hershey | |
| 7,529,798 B2 | 5/2009 | Rust | |
| 7,583,287 B2 | 9/2009 | Cohen | |
| 7,587,509 B1 | 9/2009 | Edelman | |
| 7,596,498 B2 | 9/2009 | Baru | |
| 7,599,572 B2 | 10/2009 | Shekter | |
| 2005/0021754 A1 * | 1/2005 | Alda | G06F 9/4428 709/225 |
| 2006/0089949 A1 | 4/2006 | Robbin | |
| 2006/0123052 A1 | 6/2006 | Robbin | |
| 2007/0111716 A1 | 5/2007 | Leigh | |
| 2008/0008458 A1 | 1/2008 | Gudipaty | |
| 2008/0015922 A1 * | 1/2008 | Nelken | 705/8 |
| 2008/0091504 A1 * | 4/2008 | Lyle et al. | 705/9 |
| 2008/0313714 A1 | 12/2008 | Fetterman | |
| 2009/0013265 A1 * | 1/2009 | Cole | H04L 12/581 715/758 |
| 2009/0017916 A1 * | 1/2009 | Blanchard et al. | 463/42 |
| 2009/0106347 A1 | 4/2009 | Harwood | |
| 2009/0144392 A1 | 6/2009 | Wang | |
| 2009/0144837 A1 | 6/2009 | Huff | |
| 2009/0172592 A1 * | 7/2009 | Schirmer et al. | 715/810 |
| 2009/0180763 A1 | 7/2009 | McCarthy | |
| 2009/0216601 A1 * | 8/2009 | B.S. | 705/9 |
| 2009/0259959 A1 | 10/2009 | Grotjohn | |
| 2009/0296535 A1 | 12/2009 | Jones | |
| 2012/0110473 A1 * | 5/2012 | Tseng | G06Q 50/01 715/753 |

* cited by examiner

LOCATION-AWARE CONFERENCING WITH CALENDAR FUNCTIONS

CROSS-REFERENCE TO RELATED APPLICATIONS

This application is related by subject matter to the following concurrently-filed patent applications filed on Apr. 30, 2010, each of which is hereby incorporated by reference in its entirety: International Patent Application Serial No. PCT/US2009/033084, entitled "Systems, Methods, and Computer Programs for Providing a Conference User Interface" (Applicant: American Teleconferencing Services, Ltd.; International Patent Application Serial No. PCT/US2009/033096, entitled "Conferencing Application Store" (Applicant: American Teleconferencing Services, Ltd.; International Patent Application Serial No. PCT/US2009/033108, entitled "Sharing Social Networking Content in a Conference User Interface" (Applicant: American Teleconferencing Services, Ltd.; International Patent Application Serial No. PCT/US2009/033122, entitled "Distributing Information Between Participants in a Conference via a Conference User Interface" (Applicant: American Teleconferencing Services, Ltd.; International Patent Application Serial No. PCT/US2009/033137, entitled "Record and Playback in a Conference" (Applicant: American Teleconferencing Services, Ltd.; U.S. patent application Ser. No. 12/771,979 entitled "Conferencing Alerts" (First Named Inventor: Boland T. Jones; U.S. patent application Ser. No. 12/771,920 entitled "Participant Profiling in a Conferencing System" (First Named Inventor: Boland T. Jones; U.S. patent application Ser. No. 12/771,827 entitled "Location-Aware Conferencing" (First Named Inventor: Boland T. Jones; U.S. patent application Ser. No. 12/771,400 entitled "Real-Time Speech-to-Text Conversion in an Audio Conference Session" (First Named Inventor: Boland T. Jones; U.S. patent application Ser. No. 12/772,023 entitled "Managing Participants in a Conference via a Conference User Interface" (First Named Inventor: Boland T. Jones; U.S. patent application Ser. No. 12/772,069 entitled "Managing Conference Sessions via a Conference User Interface" (First Named Inventor: Boland T. Jones; U.S. patent application Ser. No. 12/772,068 entitled "Participant Authentication via a Conference User Interface" (First Named Inventor: Boland T. Jones; U.S. patent application Ser. No. 12/771,172 entitled "Location-Aware Conferencing with Participant Rewards" (First Named Inventor: Boland T. Jones; U.S. patent application Ser. No. 12/771,668 entitled "Location-Aware Conferencing with Graphical Representations That Enable Licensing And Advertising" (First Named Inventor: Boland T. Jones; U.S. patent application Ser. No. 12/771,253 entitled "Location-Aware Conferencing with Graphical Interface for Communicating Information" (First Named Inventor: Boland T. Jones; U.S. patent application Ser. No. 12/771,942 entitled "Location-Aware Conferencing with Entertainment Options" (First Named Inventor: Boland T. Jones; U.S. patent application Ser. No. 12/771,366 entitled "Location-Aware Conferencing with Graphical Interface For Participant Survey" (First Named Inventor: Boland T. Jones; and U.S. patent application Ser. No. 12/771,522 entitled "Transferring a Conference Session Between Client Devices" (First Named Inventor: Boland T. Jones.

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings include an audio component and a visual component, such as, a shared presentation, video, whiteboard, or other multimedia, text, graphics, etc. These types of convenient conference solutions have become an indispensable form of communication for many businesses and individuals.

Despite the many advantages and commercial success of existing conference, meeting, grouping or other types of gathering systems, there remains a need in the art for improved conference, meeting, grouping or other types of gathering systems, methods, and computer programs.

SUMMARY

A method for providing a virtual conference is described. The method includes: a conferencing system receiving a request to schedule a meeting; the conferencing system displaying a calendar associated with a first conference participant identifier of the virtual conference; and the conferencing system receiving a request to retrieve calendar data associated with one or more second conference participant identifiers of the virtual conference. The conferencing system then receives calendar data through one or more communication channels associated with one or more second conference participant identifiers.

A method for providing a virtual conference is described in which the method includes: a conferencing system receiving a request to schedule a future meeting; the conferencing system receiving a request to retrieve calendar data associated with one or more conference participant identifiers of the virtual conference; and the conferencing system receiving calendar data through one or more communication channels associated with one or more conference participant identifiers.

A conferencing system for providing a virtual conference includes a processor, wherein the processor is operable to: receive a request to retrieve calendar data associated with one or more conference participant identifiers of the virtual conference; and to receive calendar data through one or more communication channels associated with one or more conference participant identifiers. The processor is also able to merge the calendar data associated with the one or more conference participant identifiers.

DETAILED DESCRIPTION

Figure 1:
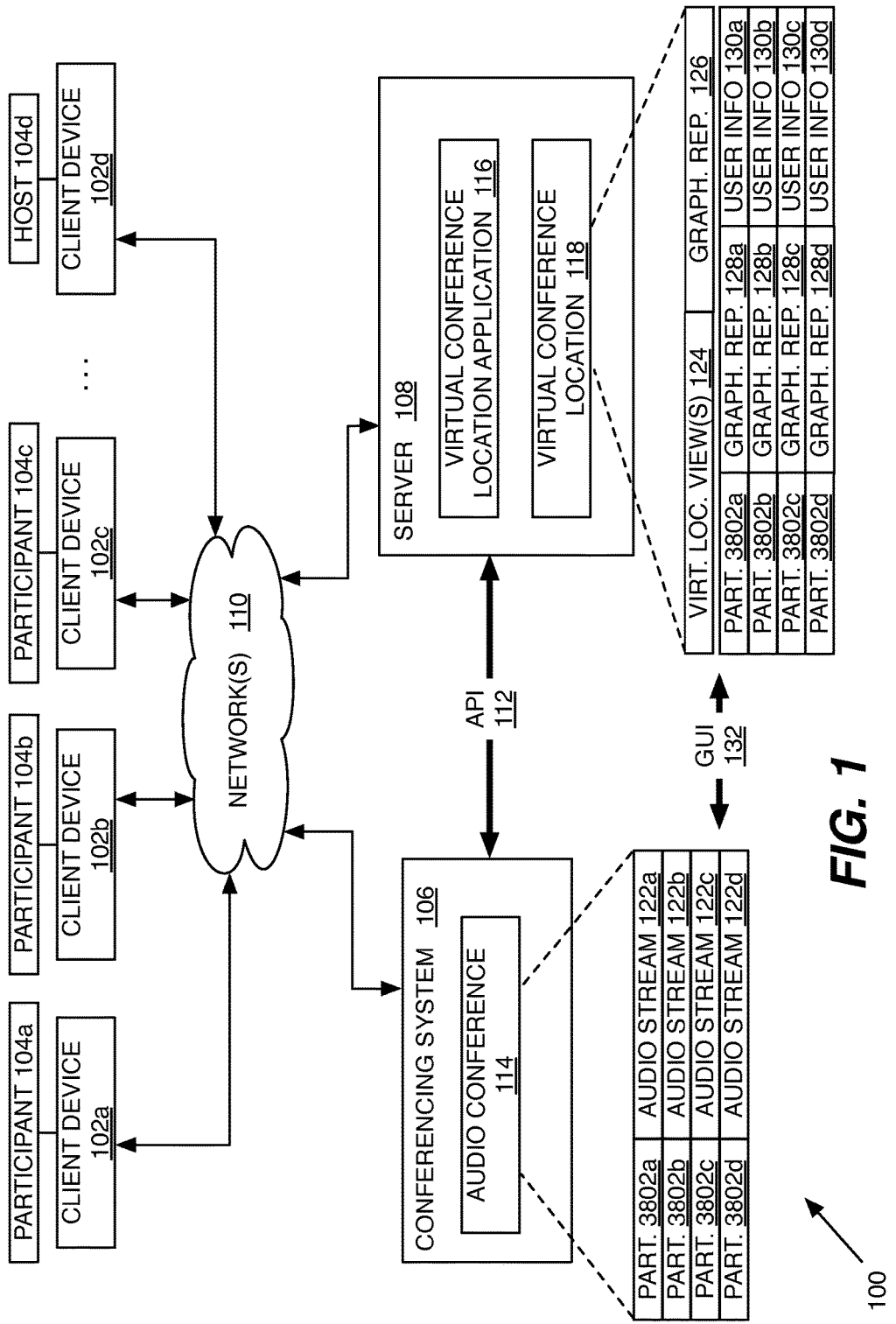
FIG. 1 is a block diagram illustrating an embodiment of a computer system for integrating a conference interface with an audio conference.

Various embodiments of systems, methods, and computer programs are disclosed for providing a visually engaging conference experience to participants of a conference via a conference user interface presented to a client device. The conference interface may be used for conferences, meetings, groupings or other types gatherings (collectively, a "conference" with a system that provides the conference interface for a conference being referred to herein as a "conferencing system") for any variety of purposes of one or more people, groups or organizations (including combinations thereof and collectively referred to as "participants") with or without an audio component, including, without limitation, enabling simulcast audio with such conference for the participants. As mentioned above and described below in detail with reference to one or more of the embodiments illustrated in the drawings, the conference interface may be configured to provide any desirable content and/or functionality and may support various user interface and conferencing features. In some embodiments, the conference interface comprises a computer-simulated virtual conference location that is presented to one or more of the participants of an audio conference via a graphical user interface.

FIG. 1 illustrates a computer system 100 representing an exemplary working environment for providing a virtual conference location with an audio conference. The computer system 100 comprises a plurality of client devices 102*a*-102*d* in communication with a conferencing system 106 and server(s) 108 via one or more communication networks 110. The network(s) 110 may support wired and/or wireless communication via any suitable protocols, including, for example, the Internet, the Public Switched Telephone Network (PSTN), cellular or mobile network(s), local area network(s), wide area network(s), or any other suitable communication infrastructure. The client devices 102*a*-102*c* may be associated with participants 104*a*-104*c*, respectively, of the audio conference, and the client device 102*d* may be associated with a host 104*d* of the audio conference. The terms "host" and "participant" merely refer to different user roles or permissions associated with the audio conference. For example, the "host" may be the originator of the audio conference and, consequently, may have user privileges that are not offered to the participants, and the conference interface may provide additional functionality not available to the other participants. Nonetheless, it should be appreciated that the terms "host," "participant," and "user" may be used interchangeably depending on the context in which it is being used.

The client devices 102 may comprise any desirable computing device, which is configured to communicate with the conferencing system 106 and the server 108 via the networks 110. The client device 102 may comprise, for example, a personal computer, a desktop computer, a laptop computer, a mobile computing device, a portable computing device, a smart phone, a cellular telephone, a landline telephone, a soft phone, a web-enabled electronic book reader, a tablet computer, or any other computing device capable of communicating with the conferencing system 106 and/or the server 108 via one or more networks 110. The client device 102 may include client software (e.g., a browser, plug-in, or other functionality) configured to facilitate communication with the conferencing system 106 and the server 108. It should be appreciated that the hardware, software, and any other performance specifications of the client device 102 are not critical and may be configured according to the particular context in which the client device 102 is to be used.

The conferencing system 106 generally comprises a communication system for establishing an audio conference 114 between the client devices 102. The conferencing system 106 may support audio via a voice network and/or a data network. In one of a number of possible embodiments, the conferencing system 106 may be configured to support, among other platforms, a Voice Over Internet Protocol (VoIP) conferencing platform such as described in U.S. patent application Ser. No. 11/637,291 entitled "VoIP Conferencing," filed on Dec. 12, 2006, which is hereby incorporated by reference in its entirety. It should be appreciated that the conferencing system 106 may support various alternative platforms, technologies, protocols, standards, features, etc. Regardless of the communication infrastructure, the conferencing system 106 may be configured to establish an audio connection with the client devices 102a-102d, although in some embodiments the audio portion may be removed. As illustrated in FIG. 1, the conferencing system 106 may establish the audio conference 114 by combining audio streams 122a-122d associated with the client devices 102a-102d, respectively.

In the embodiment of FIG. 1, the server 108 comprises a virtual conference location application 116 that generally comprises the logic or functionality for configuring and presenting, via the graphical user interface 132, a virtual conference location 118 (or other conference user interface) with the audio conference 114 to the client devices 102. One of ordinary skill in the art will appreciate that the virtual conference location application 116 (and any associated or other modules described herein) may be implemented in software, hardware, firmware, or a combination thereof. In one embodiment, the systems are implemented in software or firmware that is stored in a memory and that is executed by a suitable instruction execution system. In software or firmware embodiments, the logic may be written in any suitable computer language. In hardware embodiments, the systems may be implemented with any or a combination of the following, or other, technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As mentioned above, the virtual conference location 118 comprises a computer-simulated conference location that is presented to the client devices 102. The virtual conference location 118 may be presented to the participants 104a-104d via a graphical user interface 132. The virtual conference location 118 may store in an associated memory various forms of data for managing and presenting the computer-simulated conference locations. In the embodiment illustrated in FIG. 1, the virtual conference location 118 comprises graphical representations 126 of one or more virtual location views 124. The same virtual location view 124 may be provided to each of the participants 104. In some embodiments, the participants 104 may customize a virtual location view 124 or other aspects of the conference interface, in which case the system may present different location views 124 across the client devices 102. The virtual conference location 118 may further comprise graphical representations 128a, 128b, 128c, and 128d of the participants 104a, 104b, 104c, and 104d, respectively, as well as user-related information 130a, 130b, 130c, and 130d associated with each participant 104a, 104b, 104c, and 104d, respectively. In this manner, the virtual conference location 118 graphically represents the participants on the audio conference 114 in a simulated conference location via the GUI 132.

Figure 3:
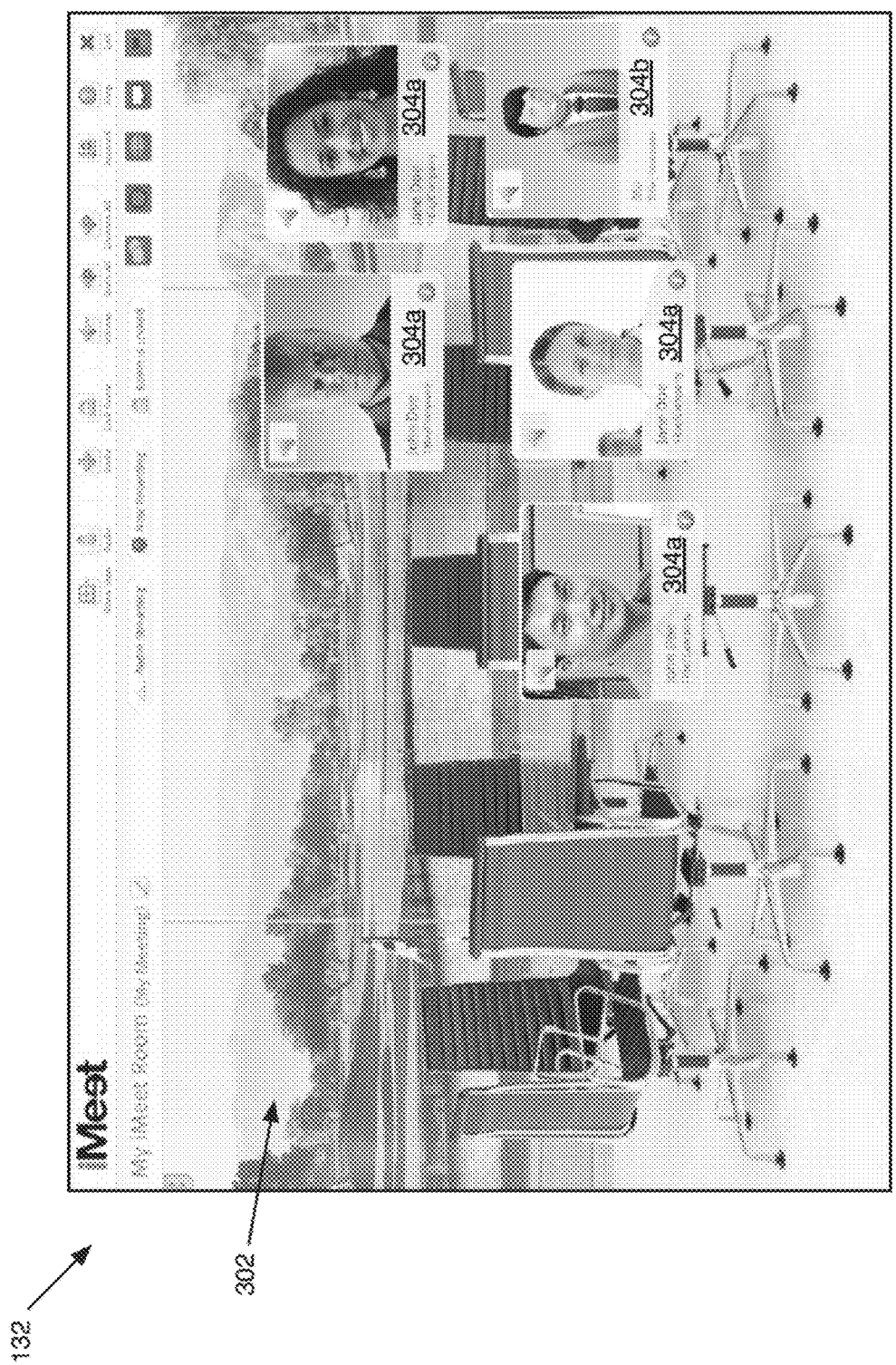
FIG. 3 is a screen shot illustrating an embodiment of a conference interface presented via the graphical user interface in the computer system of FIG. 1.

It should be appreciated that the graphical representations 128a-128d of the participants 104a-104d may comprise, for example, a 2-D graphic, a 3-D graphic, an avatar, an icon, an uploaded image, or any other suitable graphics, emblems, designs or other marks (each a "graphical representation") for uniquely or otherwise identifying the participants 104. The user-related information 130a-130d (e.g., name, address, email, telephone number, profile information, etc.) may be displayed in association with, or separately from, the graphical representations 128a-128d. FIG. 3 illustrates an exemplary implementation of a virtual conference location 118 presented in the graphical user interface 132 as one of a number of possible embodiments of a conference interface. In the embodiment of FIG. 3, the virtual location view 124 comprises an image 302 of an office conference table with chairs and a background of a golf course. The participants 104 are visually represented with participant objects (e.g., tiles 304a and 304b). The image 302 may generally comprise any background or visual backdrop or functionality for the tiles 304. The graphical representation 128 in the tiles 304a comprises a picture or photograph of the corresponding participant 104, although any content, audio, video, media, or functionality may be presented. The graphical representation 128 in the tiles 304b comprises an avatar-like image, which may be uploaded to the server 108 or selected and/or customized from predefined images.

Figure 2:
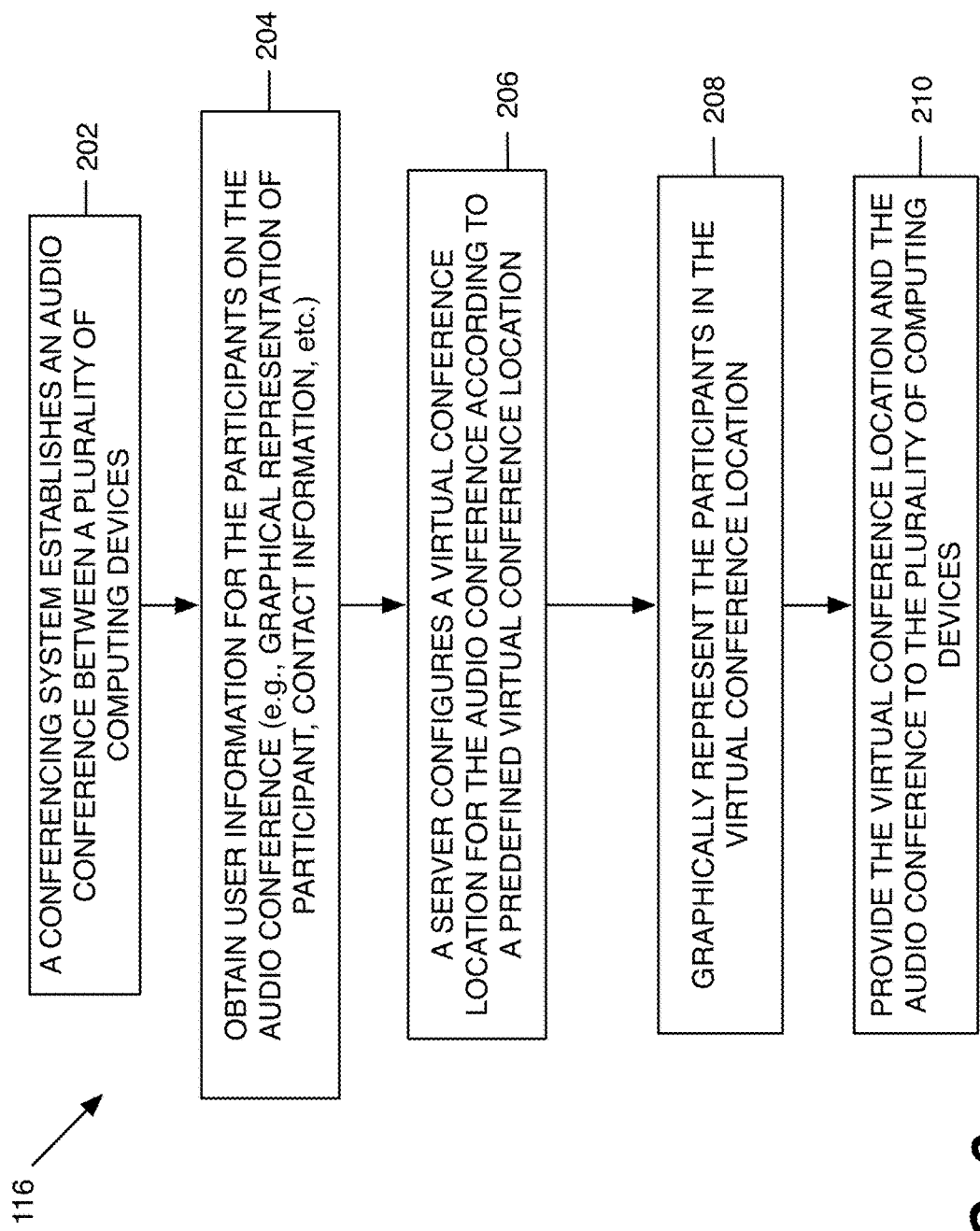
FIG. 2 is a flowchart illustrating an embodiment of the operation of the computer system of FIG. 1.

FIG. 2 illustrates an embodiment of a method for providing the virtual conference location 118. At block 202, the conferencing system 106 establishes the audio conference 114 between the client devices 102. As known in the art, the conferencing system 106 may establish a separate audio stream 122 (FIG. 1) for each client device 102. The audio streams 122a-122d may be combined into a single audio stream for presentation to the client devices 102 as the audio conference 114. One of ordinary skill in the art will appreciate that audio conference 114 may be established in various ways depending on the particular conferencing technologies being employed. At block 204, the virtual conference location application 116 may obtain information from the participants 104 via the graphical user interface 132. The information may be obtained via the conferencing system 106 and/or the server 108. For example, the participants 104 may provide or select the graphical representations 128 and/or 126 and the user-related information 130, or other media. At block 206, the server 108 configures the virtual conference location 118 according to the virtual location view(s) 124. It should be appreciated that the virtual location view(s) 124 may be specified by the participants 104 or automatically generated by the server 108 based on, for example, known or acquired characteristics of the participants 104, locations of the participants 104, the identity of organization(s) associated with the conference, planned subject matter for the conference, or any other desirable information for manually or automatically matching a virtual location view 124 to the conference. In some embodiments, the virtual location view 124 may be modified or replaced, either manually or automatically, during the conference by participants 104 or the server 108. At block 208, the virtual conference location 118 may be populated with the participants 104, for example, by graphically representing the participants 104 in the participant objects (e.g., tiles 304) according to the graphical representations 128 and/or the user-related information 130. The graphical representations 128 may be logically associated with a corresponding audio stream 122 to visually distinguish a participant 104 while he/she is talking. As illustrated in FIG. 3, the graphical representations 128 may include a microphone image that is visually altered when a participant 104 is talking. At block 210, the virtual conference location 118 and the audio conference 114 are provided to the client devices 102.

As further illustrated in the embodiment of FIG. 3, the conference interface may further comprise various user interface control(s) for enabling a participant to access any of the following, or other, features: a drop down menu for selecting and/or changing the virtual conference location 118, view, etc.; an invite control for inviting additional participants 104 to the audio conference 114; a lock room control for locking the current conference; an audio control for managing aspects of the audio conference 114 (e.g., recording the audio conference 114); a volume control; a mute/unmute control; and an account control for accessing and managing the participant's account with the conferencing system 106.

Figure 4:
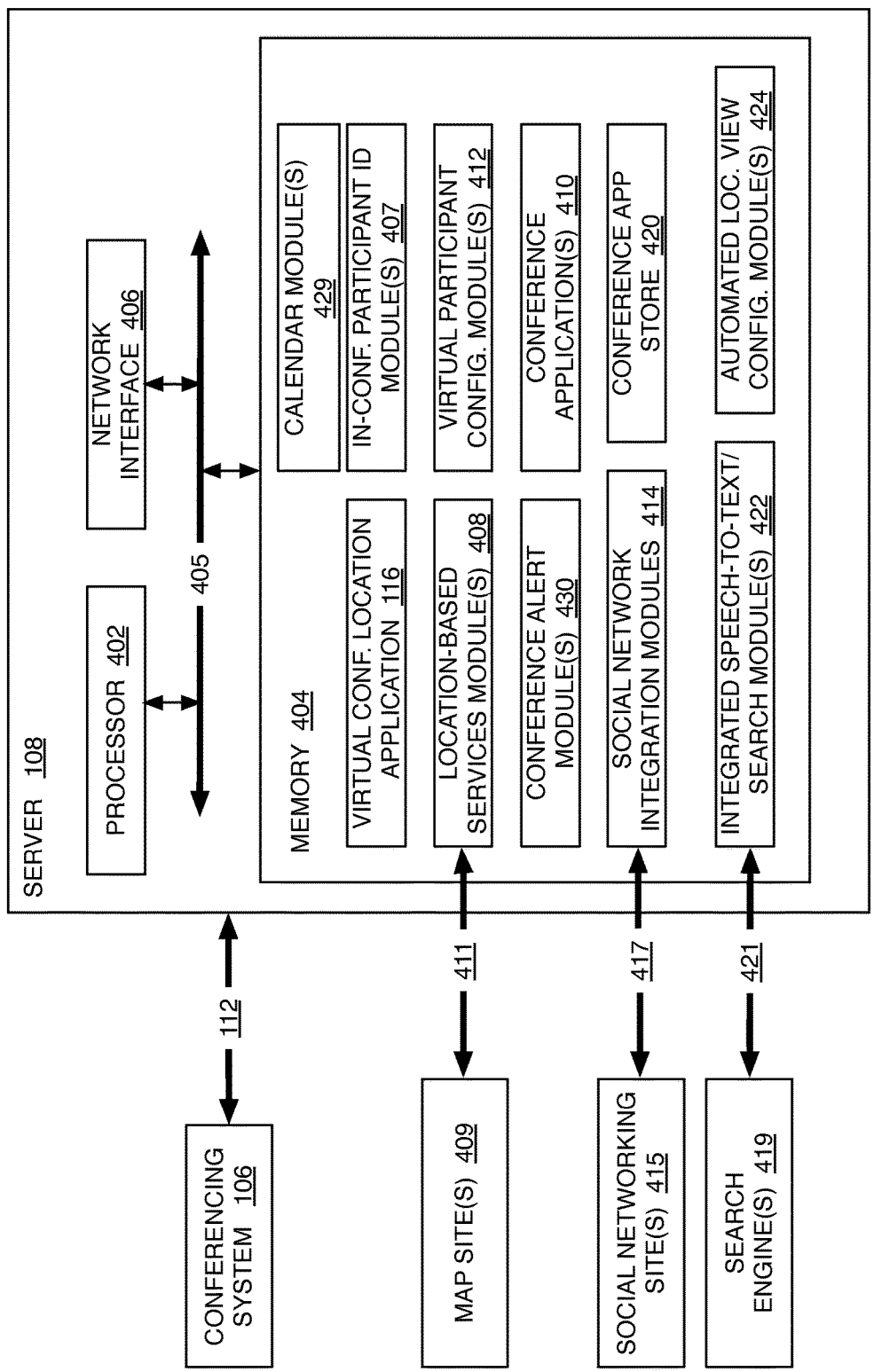
FIG. 4 is a block diagram illustrating an embodiment of the server of FIG. 1 for integrating a conference interface with an audio conference.

FIG. 4 is a block diagram illustrating the general structure and architecture of an embodiment of the server 108 for supporting the virtual conference location application 116 (or other conference interface(s) or application(s) presented to or residing at the client device 102 or server(s) 108) and associated features, functionality, etc. The server 108 may comprise one or more processors 402, a network interface 406, and memory 404 in communication via, for example, a local interface 405. The network interface 406 is configured to communicate with the conferencing system 106 and other computer systems or servers (e.g., server(s) hosting or otherwise providing map sites 409, social networking sites 415, search engines 419, etc.) via the network(s) 110. The server 108 and the virtual conference location application 116 may support various services, features, applications, etc. that may be implemented via computer programs stored in memory 404 and executed via processors 402. In the embodiment illustrated in FIG. 4, memory 404 includes virtual conference location application 116 and various additional modules for implementing associated features, including location-based services module(s) 408, conference alert module(s) 430, social network integration module(s) 414, in-conference participant identification module(s) 407, participant configuration module(s) 412, conferencing application(s) 410, automated location view configuration module(s) 424, integrated speech-to-text/search module(s) 422, and a conference app store functionality 420.

As described below in more detail with reference to FIGS. 50-64, conference alert module(s) 430 support a conference alert or notification feature, which may be provided to client devices 102. An alert application (or other software) residing on a client device 102 may be configured to notify the host 104d that a conference (e.g., audio conference 114, an online conference, a virtual conference location 118, or other conference interface) has started and manages who has joined by showing the name and number of participants 104 via, for example, a push from the application. As participants join, the notification may maintain a count of the number of participants 104. It may also allow the host 104d to quickly enter the conference from the application, modify settings prior to an audio conference 114 starting, and provide easy access to account numbers. The application may display, for example, an icon or other user interface control or feature in a system application tray of the client device 102, which exposes a menu or other functionality that enables users to modify certain settings, configurations, options, etc.

While the conference alert application is running, it communicates with the conferencing infrastructure using, for example, a conferencing API 112 (FIG. 4). The communications may comprise, for example, status checks of the user's conferencing bridges or locations to determine if there are any active participants 104. In the event that someone has entered the user's location or joined one of their bridges via a phone, this activity may be transmitted to the alert application as a status update. The update may include other information about the newly joined participant 104 such as the incoming phone number, email address, name, or other identifiable details (e.g., user-related information 130—FIG. 1) that may determined using, for example a caller ID database.

The application alerts the user by displaying a message on a display of the client device 102. The message may appear for a pre-determined amount of time, which may be configurable in the application's settings. The content of the message may further include the details transmitted in the status update mentioned above. The message display may also provide a mechanism for the user to acknowledge the message by either cancelling or joining a location. If the user chooses to cancel a particular message, subsequent messages will appear as new members join a location or audio bridge, with a running tally indicating the total number of participants. If the user chooses to join their own location, the alerts will cease until the event has ended.

The in-conference participant identification module(s) 407 generally support various techniques for developing and operating a database (e.g., participant ID database 2018—FIG. 20) for identifying participants in an audio conference 114. The conferencing system 106 and/or servers 108 may employ caller identification (ID) databases to capture information about who has dialed into, or otherwise accessed, the audio conference 114. For callers who dial in without joining via a web presence, the system can capture the dial-in number (ANI). There are numerous databases that store information such as name, location, etc. about that ANI. In order to better identify the caller in the audio conference 114, data may be pulled from various databases and made visible in the virtual conference location 118. Once obtained, that data may be stored to be used when that caller dials-in again. In this manner, the virtual conference location application 116 may create and manage a proprietary caller ID database 2018 (FIG. 20) for participants 104, which may provide more information about them.

Figure 20:
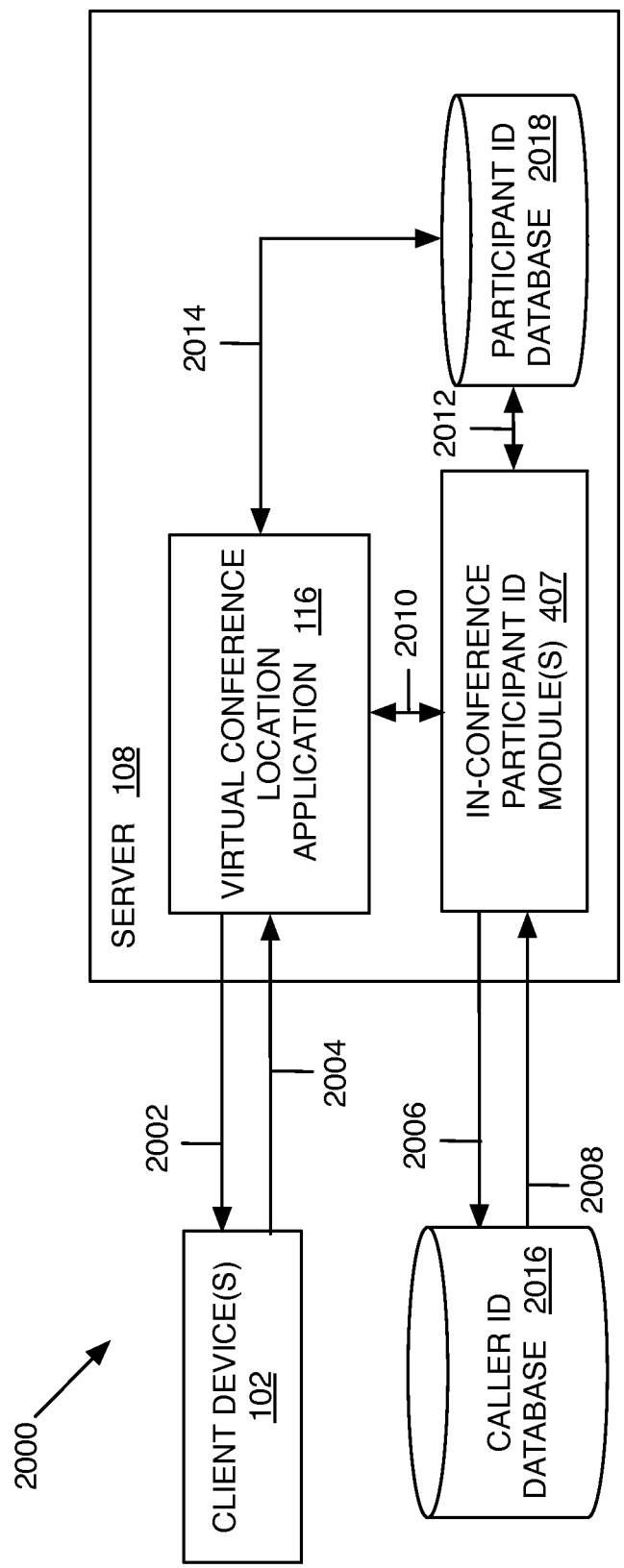
FIG. 20 is a functional block diagram illustrating an embodiment of the in-conference participant identification modules(s) in the server of FIG. 4.

As illustrated in the embodiment of FIG. 20, the virtual conference location application 116 may obtain information about participants 104 by sending a request 2002 to the client device(s) 102 or otherwise enabling the participants 104 to submit information 2004 (either about themselves or other participants 104) to the virtual conference location application 116. For example, the GUI 132 (FIG. 1) may include various UI mechanisms for enabling the user to provide the information 2004. During the audio conference 114, a participant 104 may recognize an unidentified participant's voice and provide appropriate contact information, which may then be stored in the database 2018 via interface 2014. Participants 104 may also specify additional information about themselves by, for example, supplementing user info 130 (FIG. 1) or providing new information. This information may be specified manually or the participants 104 may authorize the server 108 to access user information stored in remote servers. For example, a participant 104 may authorize the server 108 to access data stored on a social networking site 415 (FIG. 4), or the information may automatically be obtained via, for example, search engine(s) 419 based on the currently-available user info 130. As illustrated in FIG. 20, user information may be obtained from caller ID databases 2016 (or other server(s)) via requests 2006 and responses 2008 between the server 108 and the databases 2016. The information obtained from the databases 2016 or servers may be stored in the participant identification database 2018 (via interface 2012).

Figure 37:
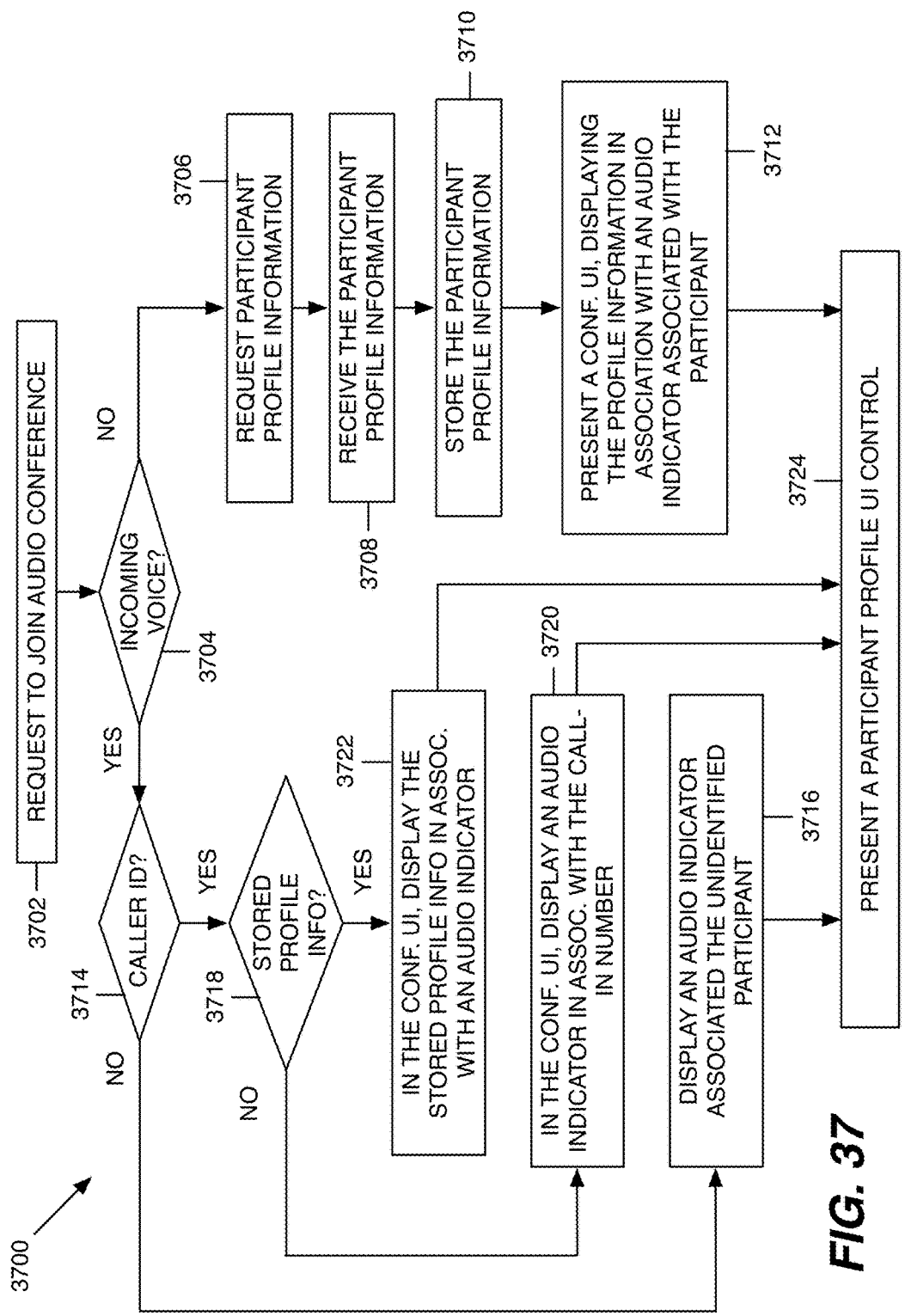
FIG. 37 is a flowchart illustrating an embodiment of a method for gathering participant information for the participant database in the system of FIG. 20.

FIG. 37 illustrates an embodiment of a method 3700 for obtaining participant information in an audio conference 114 via a conference interface. At block 3702, a participant 104 requests to join an audio conference 114. The request may originate from the client device 102 and be sent to the conferencing system 106 via, for example, a voice network, a data network, any combination thereof, or any other network. In this regard, it should be appreciated that, in some embodiments, the participant 104 may be requesting to join the audio conference 114 via a voice call originating from a client device having a telephone number. The voice call may be carried over a mobile telephone system, the PSTN, etc. The voice call may originate from the computing device 102 as an incoming voice call to the conferencing system 106 or, as described above, the participant 104 may request an outgoing voice call to the computing device 102. Alternatively, the participant 104 may join the audio conference 114 by establishing an audio session via, for instance, a VoIP session, a web-based connection, or any other data connection.

Figure 38:
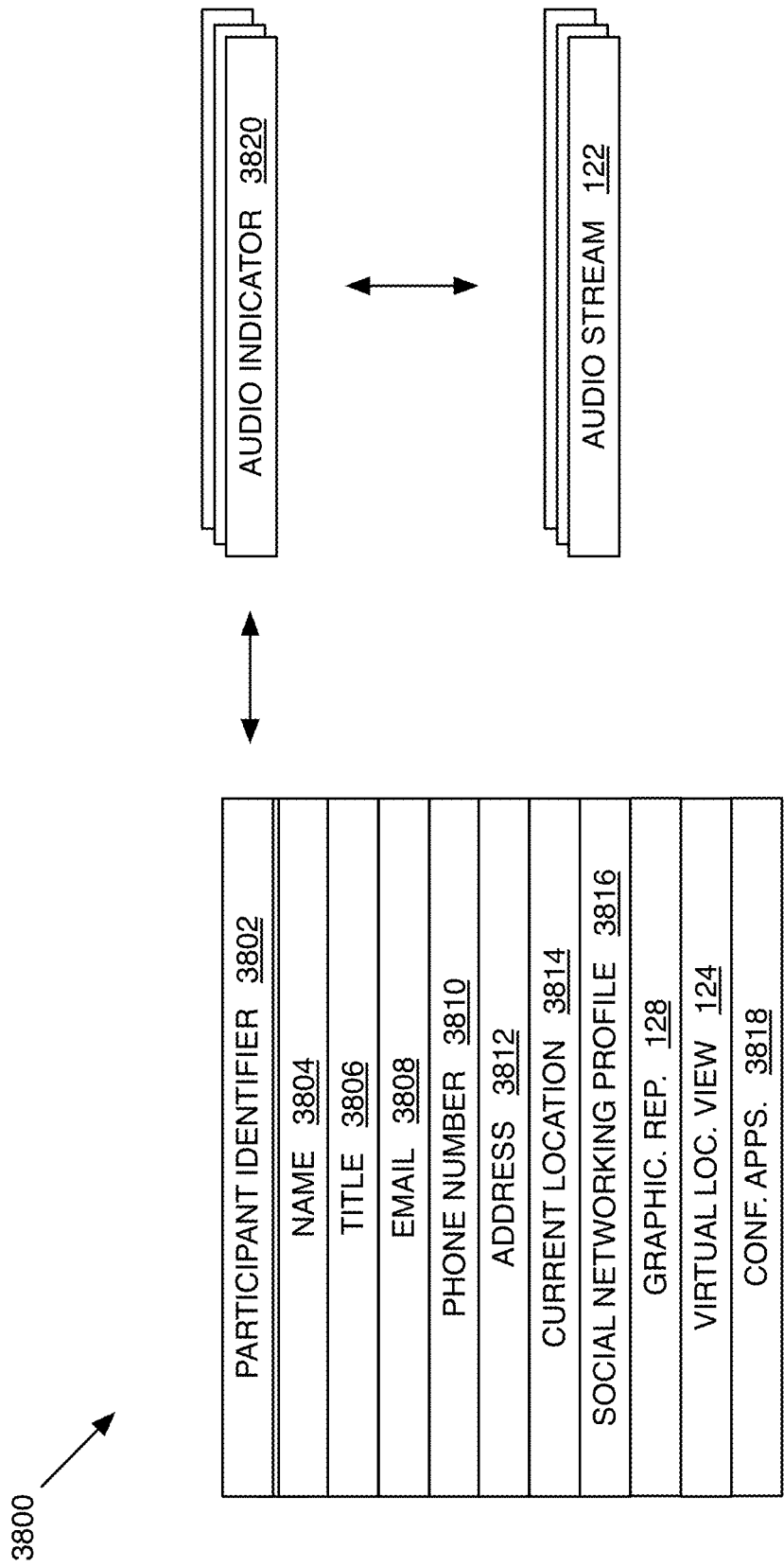
FIG. 38 is a diagram illustrating an exemplary data structure implemented in the participant database of FIG. 20.

At decision block 3704, the conferencing system 106 may determine whether the participant 104 is joining the audio conference 114 via an incoming voice call. If the participant 104 is not joining the audio conference 114 via an incoming voice call (e.g., the participant is joining via a web presence), the system may request that the participant 104 provide participant profile information (block 3706). The participant profile information may comprise any desirable parameters identifying the participant 104 or other information related to the participant 104 (e.g., the parameters identified in the exemplary screen shots of FIGS. 6-8). At block 3708, the conferencing system 106 receives the specified parameters and, at block 3710, stores them in a database (e.g., database 2018). FIG. 38 illustrates an embodiment of a data structure 3800 for storing various participant profile parameters associated with a particular participant 104. Each participant 104 in an audio conference 114 may be identified with a unique participant identifier 3802 (individually identified with reference numerals 3802a, 3802b, 3802c, and 3802d and collectively identified with reference numeral 3802) to and may include any of the following, or other, parameters; a name 3804; a title 3806; an email address 3808; a phone number 3810; a resident and/or home address 3812; a current location 3814 (which may be obtained by GPS coordinates from the client device, from an IP address, etc.); social networking profile parameters 3816; a graphical representation 124 (FIG. 1); a virtual location view 124 (FIG. 1); and conference applications 3818 that the participant 104 has purchased, selected, or are otherwise accessible to the participant during an audio conference 114.

At block 3712, the conferencing system 106 may present a conference user interface to the computing device 102 associated with the participant 104 (as well as the other devices/participants in the audio conference 114). To identify the participant 104, the conference user interface may display one or more of the specified participant profile parameters in association with an audio indicator 3820 (FIG. 38). The audio indicator 3820 comprises a user interface control that indicates when the participant 104 is speaking. In this regard, each participant identifier 3802 may have a corresponding audio indicator 3820. In an embodiment, the conference user interface may be configured as a virtual conference location 118, as described above, although it should be appreciated that the term conference user interface or conference interface refers to any graphical user interface associated with the audio conference 114, an online conference, or any other conference, which presents information, data, multimedia, etc. and/or functionality or applications (e.g., conferencing applications 3818) to the participants.

Figure 40:
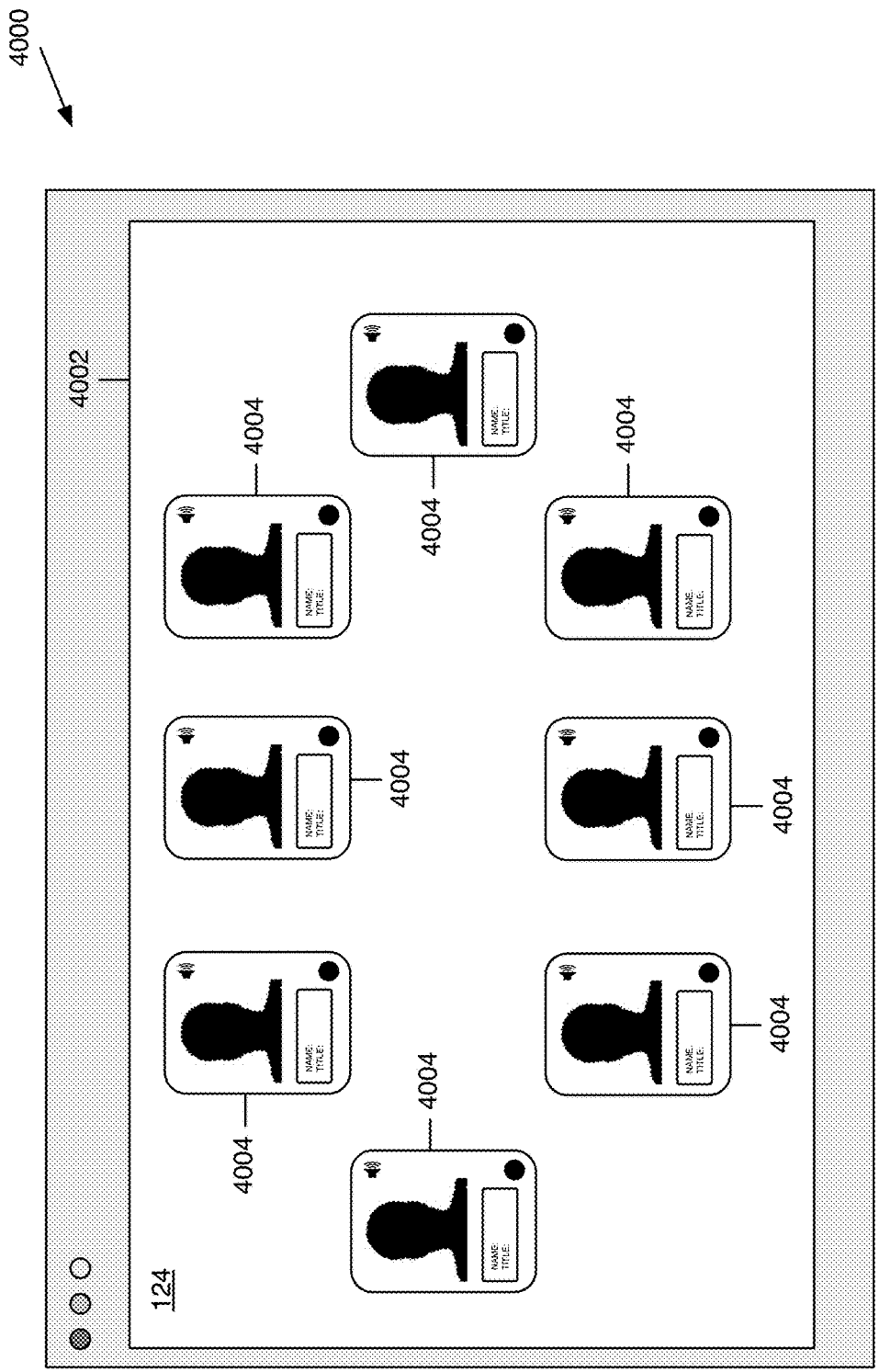
FIG. 40 is a user interface screen shot illustrating an embodiment of a conference interface for implementing aspects of the in-conference participant identification module(s).

FIG. 40 illustrates an embodiment of a conference user interface 4000 for displaying the participant profile parameters. The conference user interface generally comprises a screen portion 4002 that displays a participant object 4004 for each participant 104. The objects 4004 may be arranged in any of the ways described below in connection with FIGS. 9-14. The screen portion 4002 may further comprise a virtual location view 124. An object 4004 may comprise a graphical representation 4102, profile information 4104, an audio indicator 4106 (which corresponds to the audio indicator identifier 3820 in FIG. 38), and a business card component 4108. The graphical representation 4102 comprises a picture, photograph, icon, avatar, etc. for identifying the corresponding participant 104. The graphical representation 4004 may be similar to the graphical representation 128, and may comprise an image that is uploaded to the server 108 or selected and/or customized from predefined images.

Figure 41B:
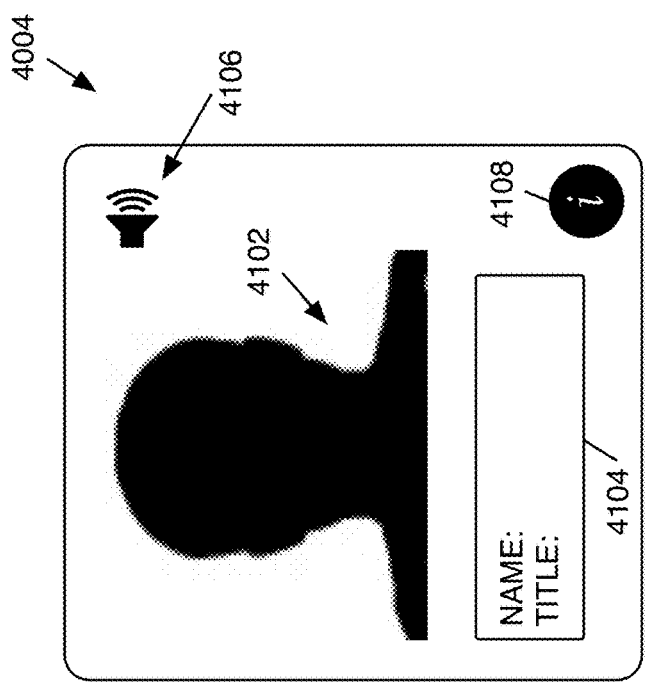
FIG. 41b illustrates the participant object of FIG. 41a with the audio indicator in a speaking state.
Figure 41A:
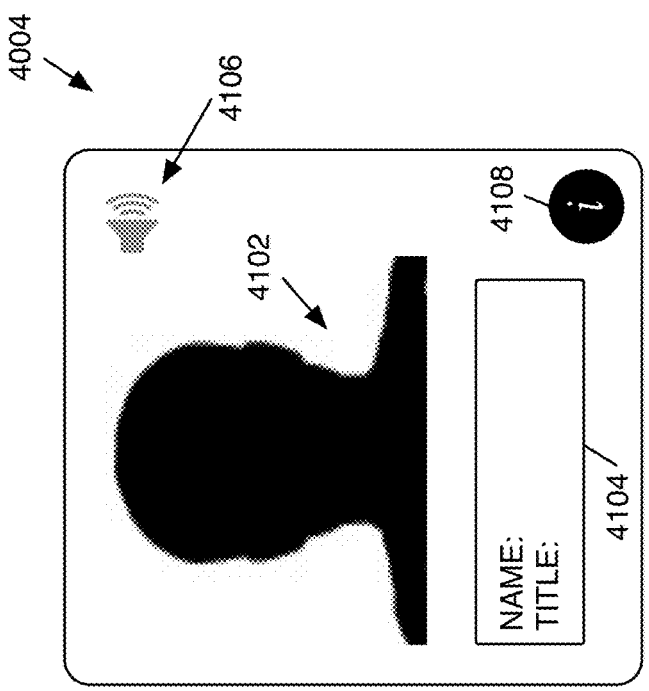
FIG. 41a is a more detailed view of one of the participant objects in the conference interface of FIG. 40.

The profile information 4104 may comprise one or more of the participant profile parameters. The audio indicator 4106 visually identifies when the associated participant 104 is speaking during the audio conference 114. By monitoring the audio streams 122 for certain audio characteristics, the conferencing system 106 may determine when a participant 104 is speaking. The audio stream 122 may be logically mapped to the corresponding audio indicator 4106 according to the participant identifier 3802 and/or the audio indicator identifier 3820 (FIG. 38). When a participant is speaking, the audio indicator 4106 may be displayed in a first visual state (FIG. 41a), such as, by graying out the audio indicator 4106. When the participant 104 is speaking, the audio indicator 4106 may be displayed in a second visual state (FIG. 41b), such as, by blacking out the audio indicator 4106. It should be appreciated that any visual and/or audio distinctions may be employed to identify a speaking participant in the conference interface.

Figure 42B:
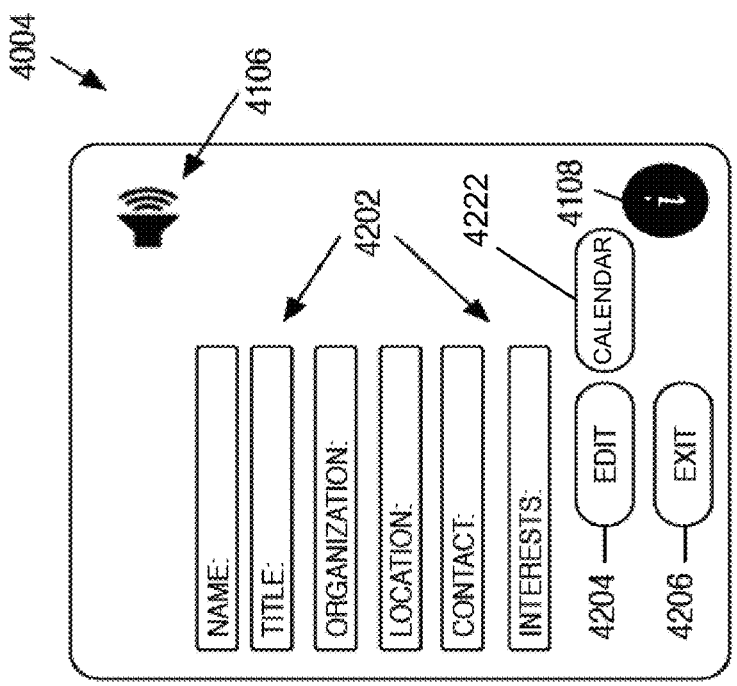
FIG. 42b illustrates an embodiment of a user interface screen for implementing a participant profile user interface control.

The business card component 4108 comprises a user interface control that, when selected, displays further information about the participant 104. The business card component 4108 may trigger the display of any additional participant profile parameters. In the embodiment illustrated in FIG. 42b, the business card component 4108 "flips" the object 4004 to display additional parameters 4202. As further illustrated in FIG. 42b and at block 3724 (FIG. 37), the object 4004 may further comprise a participant profile control 4204, which comprises a user interface control for enabling the participants 104 to edit their own, or another participant's, participant profile parameters. The object 4004 may also comprise a calendar button 4222 that initiates a calendar function as described in further detail below in connection with FIGS. 65-67.

Figure 42A:
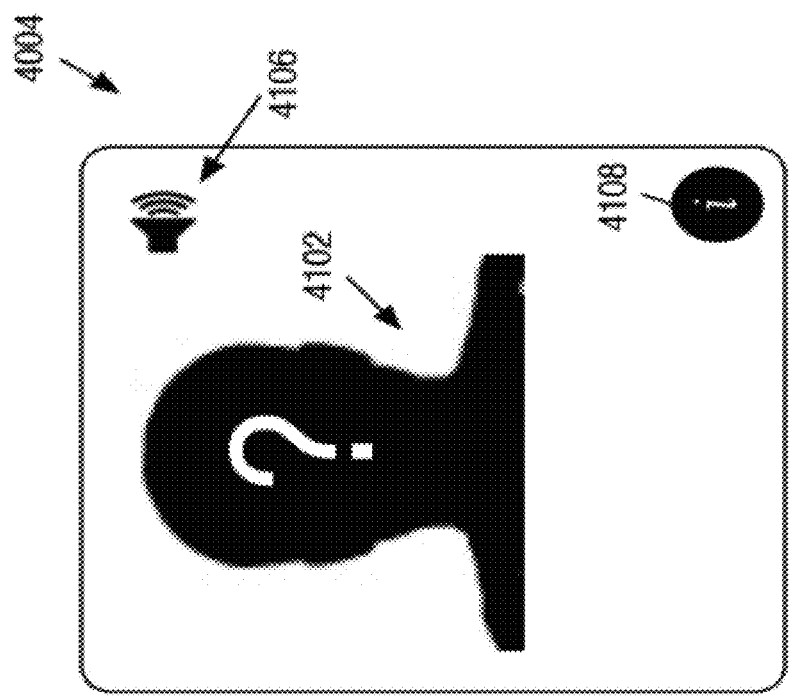
FIG. 42a illustrates an embodiment of a participant object for an unidentified participant.

Referring again to FIG. 37, if the participant 104 is joining the audio conference 114 via an incoming voice call (decision block 3704), a caller ID database, resource, or service may be used to automatically identify the originating telephone number (block 3714). If an originating telephone number is not available, the participant 104 may be added to the audio conference 104 and displayed in the conference user interface as an unidentified participant (FIG. 42a). Where an originating telephone number is available, at decision block 3718, the number may be used as an input to a look-up table, database, service, etc. to determine additional information. In an embodiment, the originating telephone number may reference a stored participant profile, such as, the data structure 3800 (FIG. 38). If additional information is not available (either in a stored participant profile or a response 2008), the participant 104 may be identified in the conference user interface based on the originating telephone number and the associated audio indicator 4106. Regardless lie availability of participant information, telephone numbers, etc., at block 3724, the objects 4004 may be presented with the participant profile edit control 4204.

Figure 39:
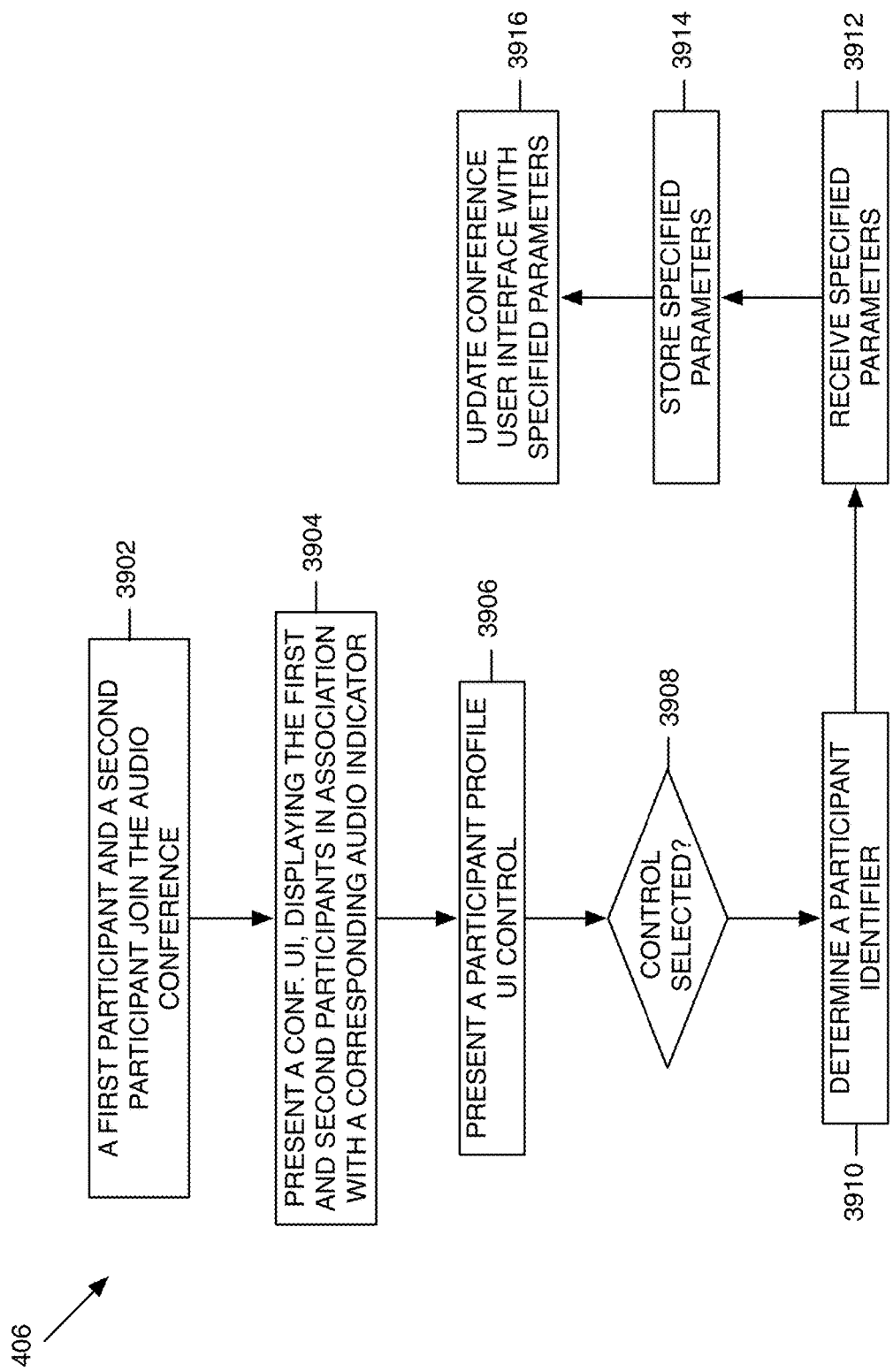
FIG. 39 is a flowchart illustrating the architecture, operation, and/or functionality of an embodiment of the in-conference participant identification module(s) in the server of FIG. 4.

It should be appreciated that the participant profile control 4204 provides a convenient mechanism for enabling participants 104 to specify, during the audio conference 114, additional profile information about themselves and/or other participants 104 via the conference user interface. In this manner, the conferencing system 106 may develop a proprietary database (e.g., participant database 2018) for identifying participants 104. FIG. 39 illustrates an embodiment of a simplified method for operating the participant profile control 4204 to develop or supplement a participant database 2018. At block 3902, a first participant 104 and a second participant 104 join an audio conference 114. At block 3904, the conference user interface displays an object 4004 associated with the first and second participants 104. The objects 4004 may comprise no profile information (i.e., an unidentified participant) or any level of profile details, as described above. Regardless the existence of, or level of, profile information, each object 4004 displays a corresponding audio indicator 4106 to indicate when the participant 104 is speaking. Each object 4004 may further display a corresponding participant profile control 4902 for specifying information about the participant 104. The participant profile control 4902 may be selected (decision block 3908) by any participant 104 in the audio conference 114, enabling participants 104 to specify information about themselves or any of the other participants. This mechanism may be particularly useful when, for example, the participant 104 is an unidentified participant, the participant 104 specified minimal information at log-in, or there is otherwise minimal and/or incorrect profile information.

For example, assume that a first participant 104 is an unidentified participant. During the audio conference 114, a second participant 104 may recognize the identity of the first participant 104 based on the speaker's voice and the state of the audio indicator 4106 in the object 4004. The second participant 104 may select the participant profile edit control 4204 in the object 4004 associated with the first participant 104. In response, the conference user interface 4000 may enable the second participant 104 to specify profile parameters, such as those described above. When selected, the conference user interface may prompt the participant 104 to enter known parameters. In another embodiment, the conference user interface may be configured to enable the second participant 104 to specify information via, for example, a search engine results page, a local or remote contact application, a social networking system, or any other source of profile information. At block 3910, the specified profile parameters may be linked to the participant identifier 3802 (FIG. 38). At block 3912, the conferencing system 106 receives the specified profile parameters and, at block 3914, stores the parameters in the participant database 2018, according to the participant identifier 3802. At block 3916, the specified parameters may be added or updated to the participant object 4004 displayed in the conference user interface.

Figure 19:
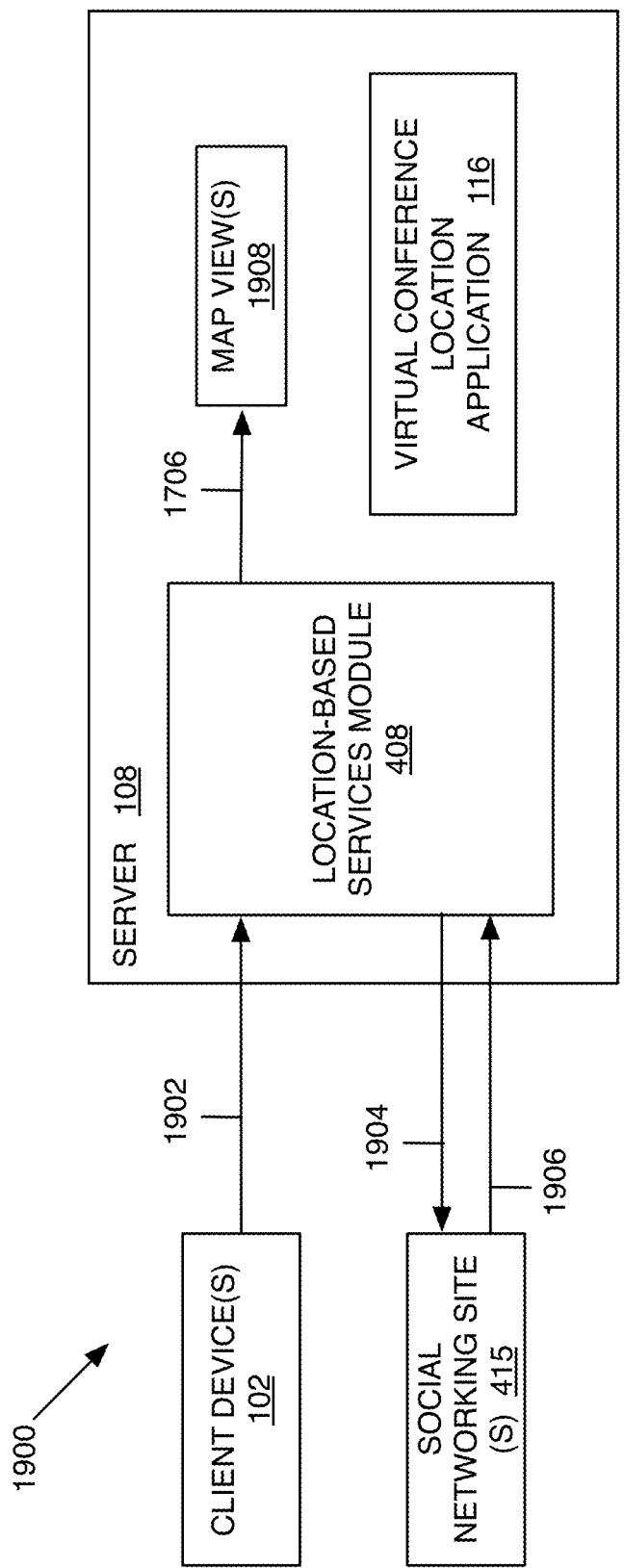
FIG. 19 is a functional block diagram illustrating an embodiment of the location-based services module(s) in the server of FIG. 4.

Referring again to FIG. 4 and the various modules located in the server memory 404, the location-based services module(s) 408 comprise the logic and/or functionality for supporting various location-based services provided by the conferencing system 106. As illustrated in the embodiment of FIG. 19, the location-based module(s) 408 may receive location information from the client devices 102 (arrow 1902). It should be appreciated that the location information may be obtained in various ways. As described below in more detail, when a participant 104 joins an audio conference 114, an online conference, or otherwise accesses the conferencing system 106, the location information may be captured from GPS information, caller ID, IP address, sign-in profiles, etc.

The client device 102 may include a GPS transceiver that acquires GPS signals. When the client device 102 accesses the conferencing system 106, the GPS coordinates may be passed to the location-based module(s) 408. The conferencing system 106 may also obtain caller ID information in the manner described herein. The caller ID information may be automatically obtained by the conferencing system 106 when the participant 104 joins an audio conference 114. The conferencing system 106 may perform various look-ups to determine the location associated with the telephone number. The conferencing system 106 may translate the area code into a corresponding geographic area. In other embodiments, the conferencing system 106 may use the telephone numbers as an input to a look-up table, web service query, etc. to determine if there is an associated location. The location may be a stored current location associated with a participant identifier (e.g., current location 3814—FIG. 38). The stored current location may be a previously stored location specified by a user or acquired as described herein. The conferencing system 106 may also query the client device 102 for (or otherwise obtain) an IP address of the client, which may be used to determine the current location of the device.

Figure 31:
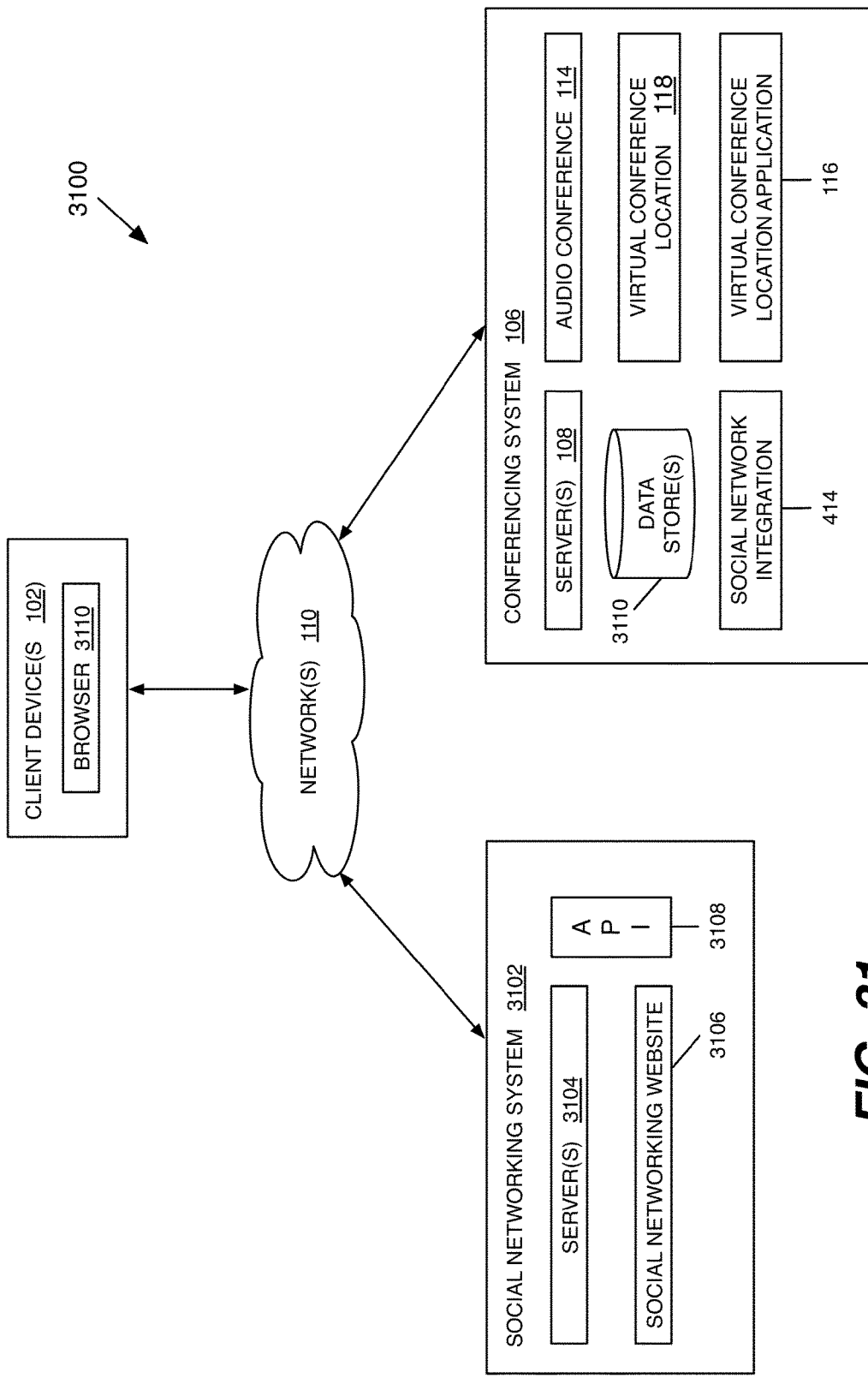
FIG. 31 is a block diagram illustrating an embodiment of a computer system for sharing social networking content in a conference interface.
Figure 32:
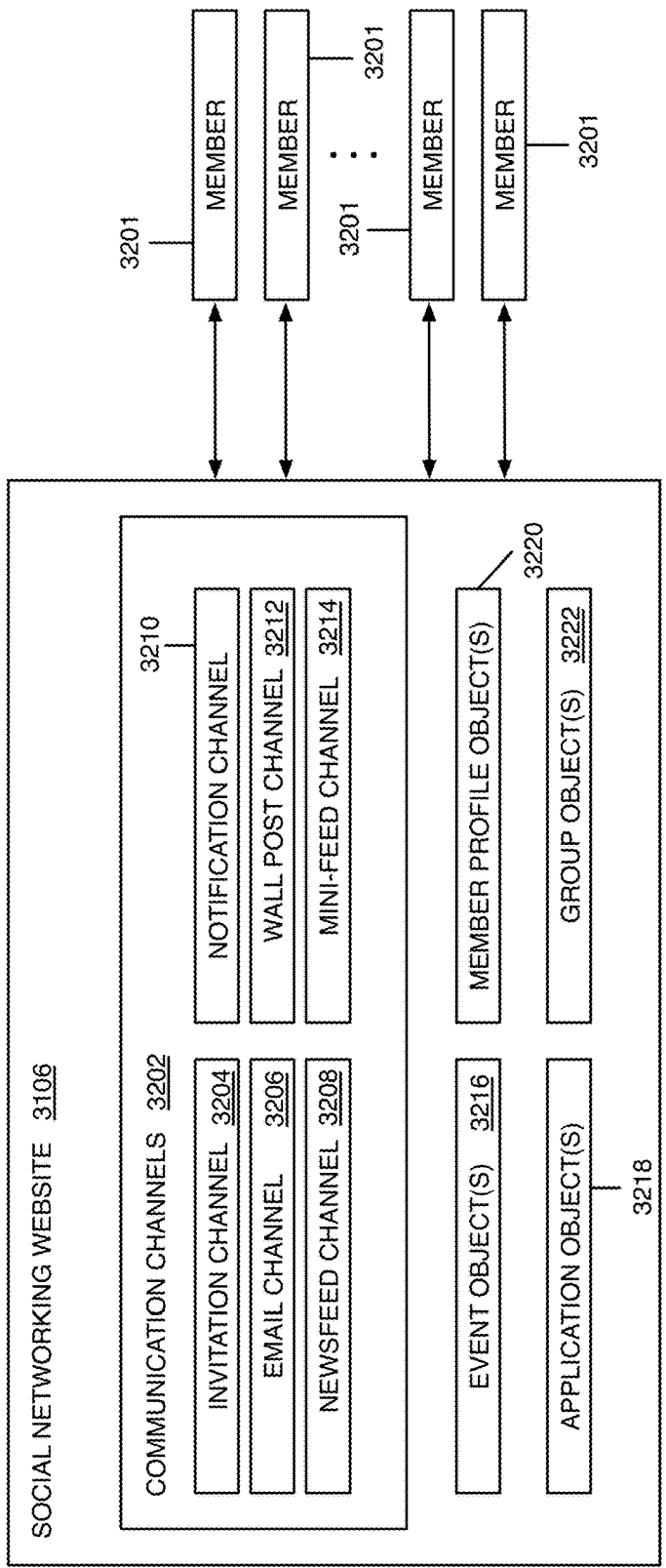
FIG. 32 is a block diagram illustrating an exemplary social networking system.

In additional embodiments, the location information may be obtained from the participant's social networking data via a request 1904 and response 1906 to a social networking system 3102 (FIG. 31). For example, as described below, the participant may be a member of the social networking system 3102 and provide location information to a communication channel 3202 (FIG. 32). This information may be automatically acquired by the social networking system 3102 from the client device 102, or specified by the user. Regardless of the manner in which the location information is acquired by the social networking system 3102, it should be appreciated that the conferencing system 106 may obtain this information via the API 3108 and associated social networking integration module(s) 414 (FIG. 4), as described below.

Figure 64:
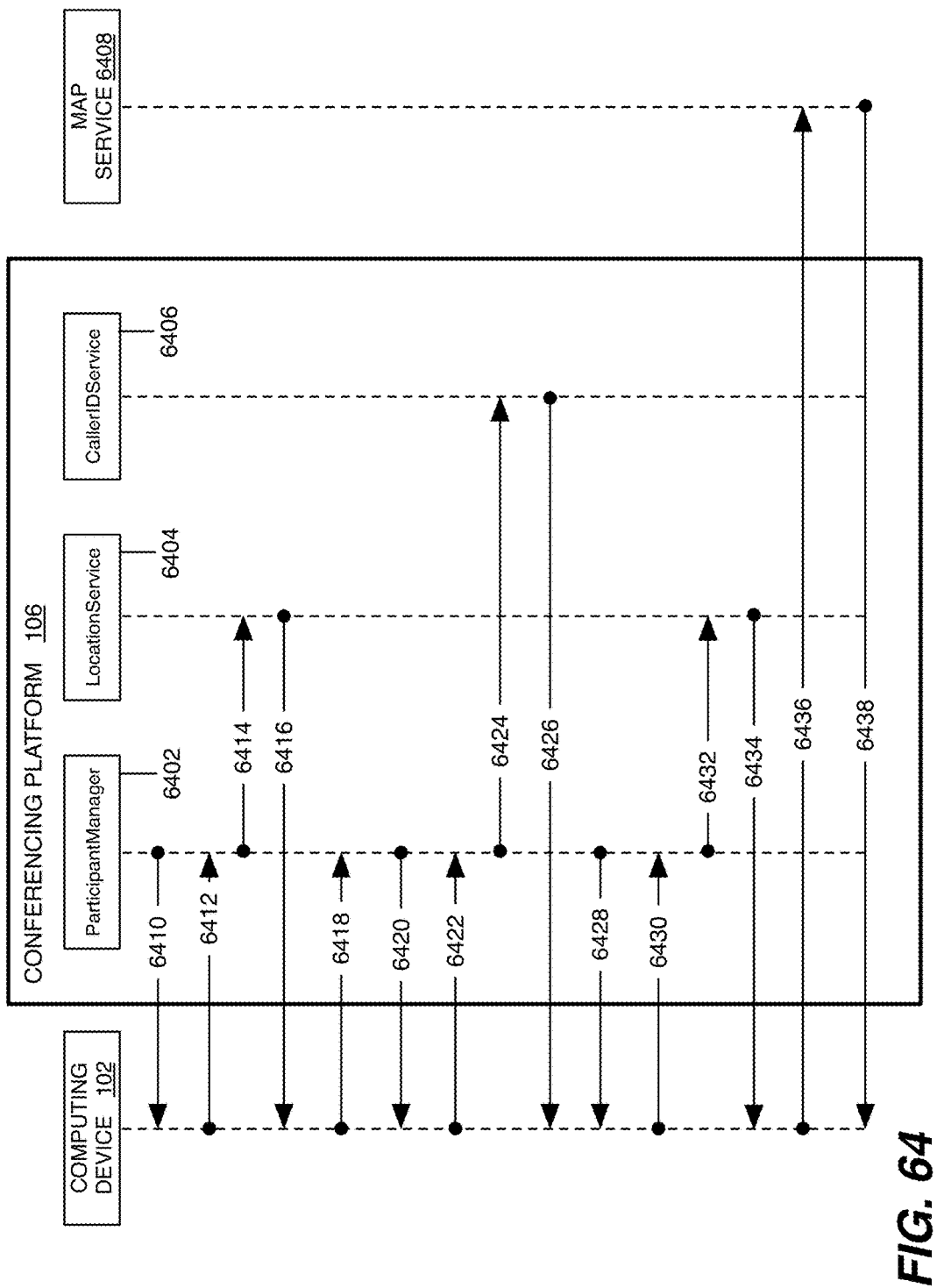
FIG. 64 is a combined block/flow diagram illustrating exemplary embodiments for enabling a conferencing system to obtain location information.

As illustrated in FIG. 64, the conferencing system 106 may implement various software mechanisms to obtain the location information from the client device 102. In the embodiment of FIG. 64, the conferencing system 106 comprises a Participant Manager Service 6402, a Location Service 6404, and a Caller ID Service 6406. In operation, the computing device 102 may access the conferencing system 106 by visiting a particular web site. The Participant Manager Service 6402 may send a getClientIPAddress( ) message 6410 to the computing device 102. In response, the client device 102 may send a ClientIP response 6412 containing an IP address associated with the device. It should be appreciated that the IP address may be associated with the client device 102 or other communication devices associated with the client device 102. The Participant Manager Service 6402 may send a getLocationbyIP( ) request 6414 to the Location Service 6404, which returns a response 6416 to the client device 102. The response 6416 may specify location according to, for example, latitude and longitude, or any other means.

In another embodiment, the client device 102 may access the conferencing system 106 and send a Login Request 6418 to the Participant Manager Service 6402. The Participant Manager Service 6402 may authenticate the participant 104.

If the login is successful, the Participant Manager Service 6402 may send a getClientPhoneNumber( ) request 6416 to the client device 102. The participant 104 may provide the information via, for example, a conferencing user interface, such as those described herein or others. The entered telephone number may be provided to the Participant Manager Service 6402 as a PhoneNumber response 6422. The Participant Manager Service 6402 may send a getLocationbyPhoneNumber( ) request 6424 to the Caller ID Service 6406, which contains the entered phone number. The Caller ID Service 6406 may provide corresponding location information to the client device in a response 6426.

Figure 18:
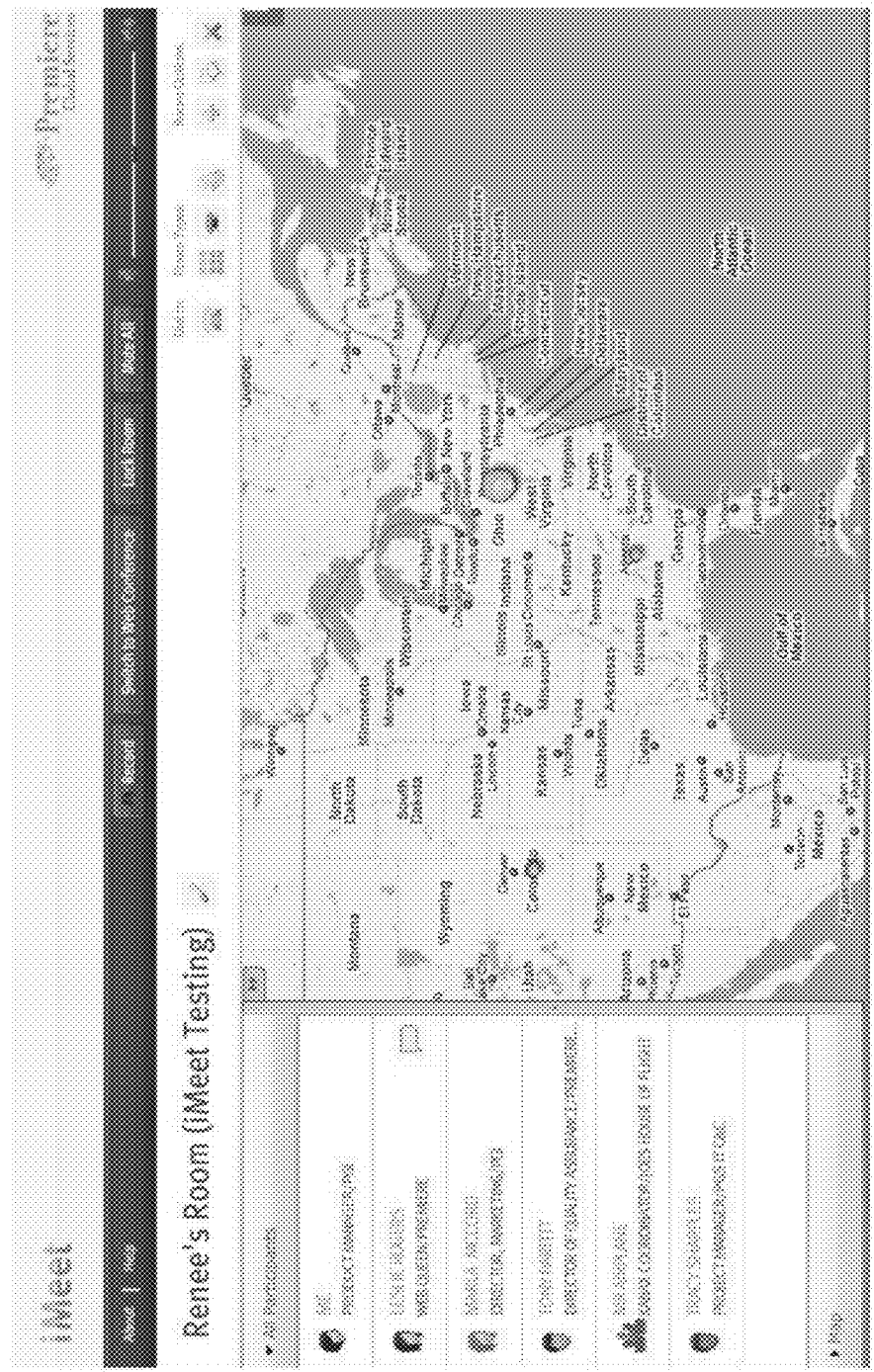
FIG. 18 is a screen shot illustrating an embodiment of a map view of the participants in the conference interface.

It should be appreciated that additional information may be requested from the client device 102. For example, the Participant Manager Service 6402 may send a getClientCurrentLocation( ) request 6428, and receive a City/State response 6430 containing the entered city, state, zipcode, etc. The Participant Manger Service 6402 may send a getLocationByCity( ) request 6432 (which may include any of the entered information) to the Location Service 6404. The Location Service 6404 may provide corresponding location information to the client device in a response 6434. Regardless of the manner in which the location information is obtained, the client device 102 may send a getMapParticipantLocation( ) request 6436 to a map service 6408. The map service 6408 may return a showMapWithParticipantDetails response 6438. The conferencing system 106 may perform this process for each participant 104 and then present the combined location information in a map view 1908. An exemplary embodiment of a map view 1908 is illustrated in FIG. 18, although it should be appreciated that the location information may be presented in the conference interface in any manner.

Based on the location information, the conference interface may customize the presentation of the interface with location-based information associated with one or more participants 104. For example, the conferencing system 106 may provide a unique conference interface to each participant 104 based on the participant's corresponding location. The customization may involve providing location-based resources, services, functionality, etc. to the participant 104 (e.g., news, weather, traffic, events, etc.). Furthermore, in some embodiments, a virtual location view 124 may be selected by the conferencing system 106 to match the location information obtained from the participant 104 (e.g., a participant 104 in San Francisco may be presented a virtual location view 124 including the Golden Gate Bridge).

In further embodiments, the location information may be used to provide an intelligent conference dial-out and/or dial-in feature, which dynamically provides guidance to the participants 104 on how to join the audio conference 114 (e.g., via a login screen 604 (FIG. 6) or setup screens 702 (FIGS. 7 & 8)) or automatically configures an appropriate dial-out from the conferencing system 106 to the participant 104. When a participant 104 accesses the conferencing system 106, the location information may be obtained. Based on the participant location, the conferencing system 106 may recommend a dial-in number, taking into consideration customer data and/or voice plans and carrier provider rates, or automatically determine a desirable dial-out number. For example, based on this information, the conferencing system 106 may select a dial-in number for a more cost-effective incoming call from the participant 104. Furthermore, it should be appreciated that the location information may be used to present an optimal (e.g., lowest cost, highest quality) dial-in option, as well as the optimal dial-out. The conferencing system 106 may dial-out to the participant 104 after checking, for example, a routing database and then initiating the dial-out from the optimal node on the network based on the acquired location information.

Figure 63:
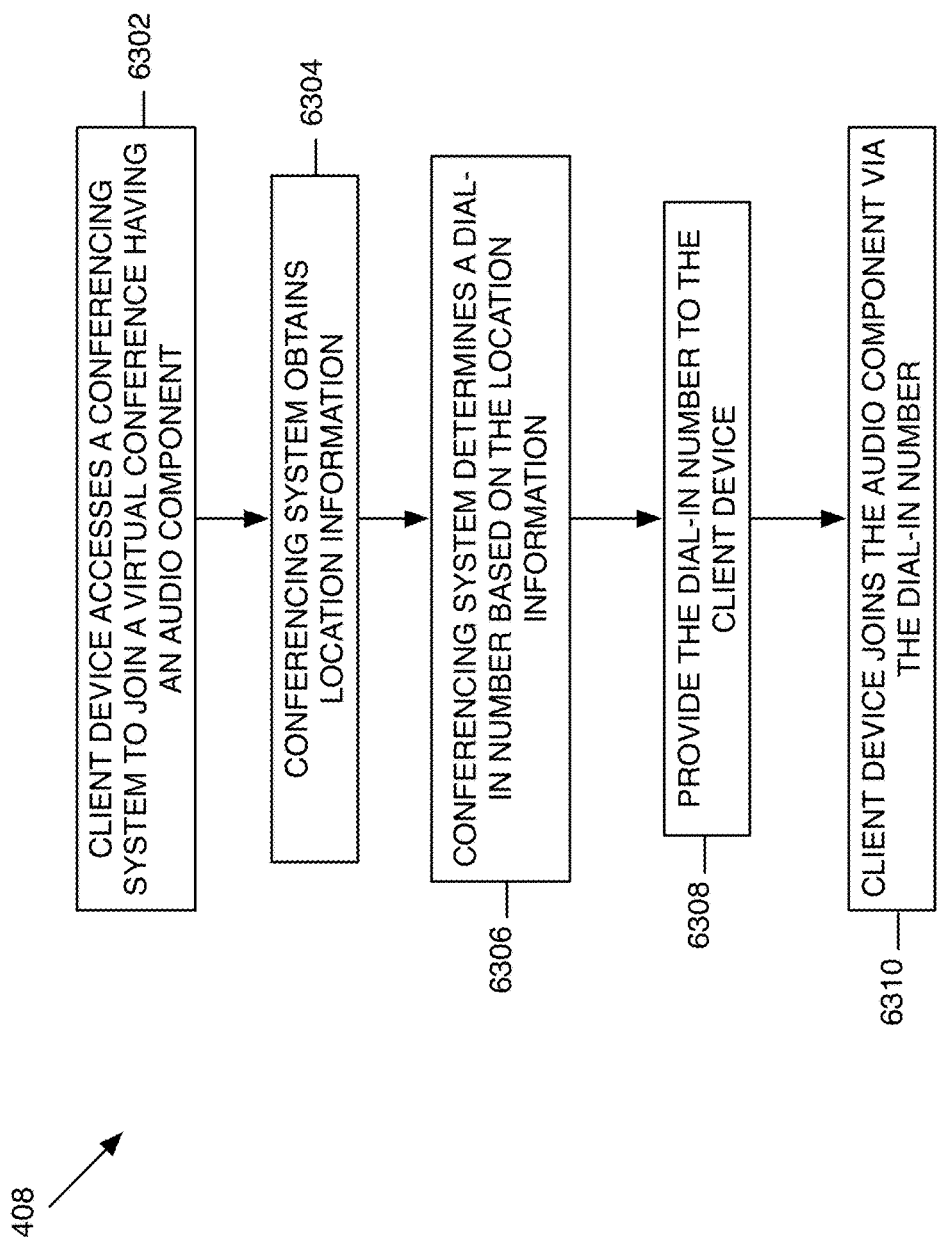
FIG. 63 is a flowchart illustrating the architecture, operation, and/or functionality of another embodiment of the location-based services module(s) of FIG. 19.

FIG. 63 illustrates an embodiment of a method for implementing certain aspects of the location-based services module(s) 408. At block 6202, the conferencing system 106 obtains location information from a plurality of participants 104. At block 6204, the conferencing system 106 associates the unique location information with a corresponding participant identifier 3802 (FIG. 38). At block 6206, the conferencing system 106 establishes an audio conference 114 with the plurality of participants 104. At block 6208, the conferencing system 106 presents a conference interface (e.g., conference interface 4100 or 4400, virtual location view 116, etc.) to the plurality of participants 104. At block 6210, the conference interface selectively displays a map view 1902, which identifies a location of each of the plurality of participants 104.

FIG. 64 illustrates another embodiment of a method for implementing aspects of the location-based services module(s) 408. At block 6302, a client device 102 accesses a conferencing system 108 to join a conference having an audio component. At block 6304, the conferencing system 106 obtains location information associated with the client device 102. At block 6306, the conferencing system 106 determines a telephone number for enabling the participant 104 to access the audio component of the conference. The telephone number is determined based on the location information to provide the most cost-effective means of enabling the participant 104 to access the audio conference 114. It should be appreciated that the telephone number may comprise a dial-in number which is provided to the participant 104 (block 6308) and used by the participant 104 to access the audio conference. In other embodiments, the telephone number may comprise a dial-out number which is used by the conferencing system 106 to initiate an outgoing call to the participant 104. At block 6310, the client device joins the audio conference 114 via the telephone number determined by the conference system.

The virtual conference location application 116 (or other conference interface applications) may support a real-time speech-to-text functionality that may automatically convert speech from the audio streams 122 (FIG. 1) into text. As described below in more detail, the output text is processed by one or more algorithms to identify keywords, topics, themes, or other subject matter being discussed during the audio conference 114. The keywords are used as input to a search engine, knowledge base, database, etc. for the purpose of identifying resources related to the keywords, which may be presented, in real-time, to the participants 104 during the audio conference 114 via the conference interface (e.g., virtual conference location 118). In this manner, the participants 104 may be provided with additional materials, information, educational material, etc. (collectively referred to as "resources") based on the subject matter being discussed during the audio conference 114. It should be appreciated that the resources may be embodied in any desirable format, including, for example, audio, video, graphics, text, or any other medium presentable via the conference interface and/or the audio conference session.

Figure 17:
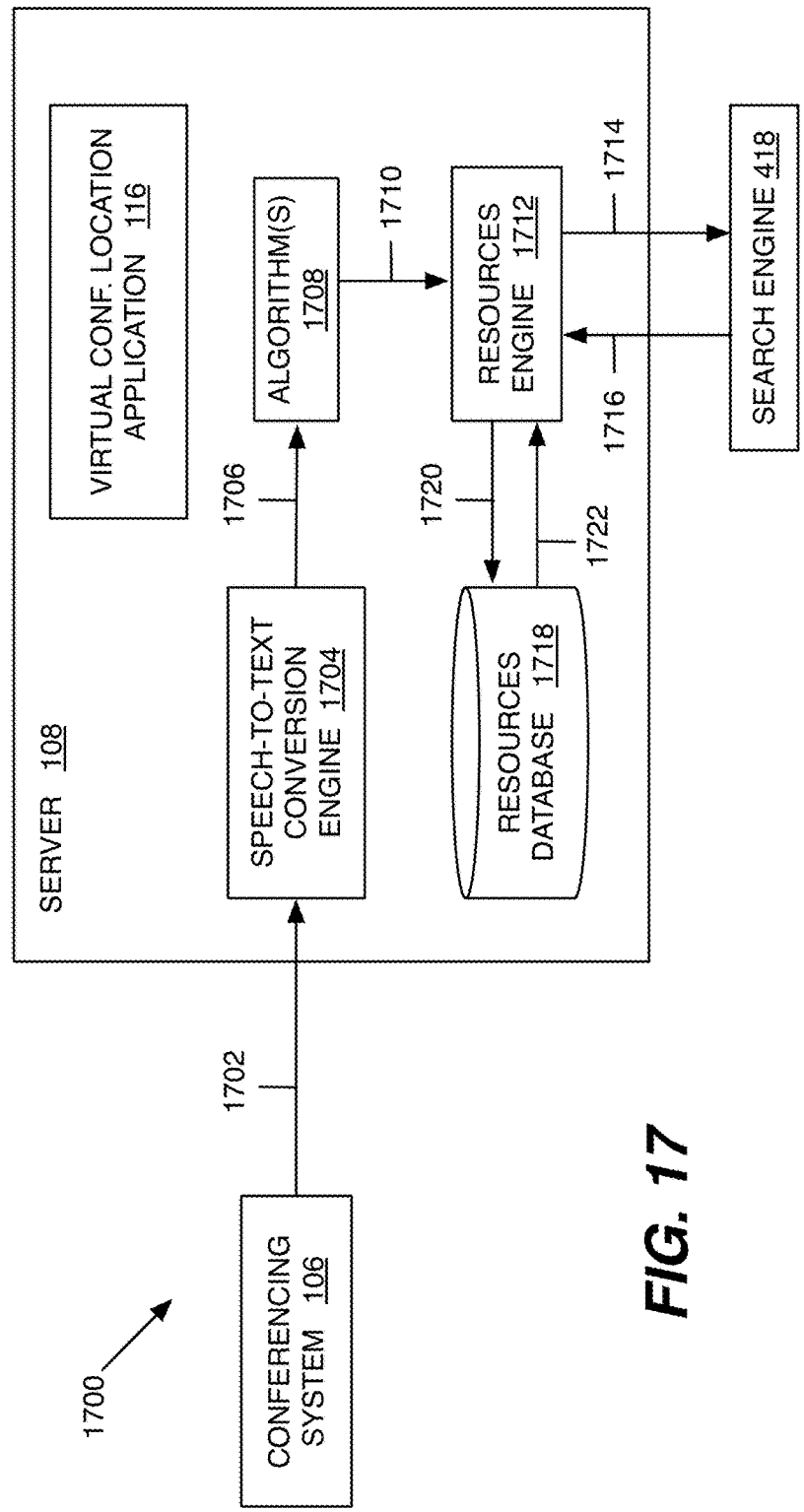
FIG. 17 is a functional block diagram illustrating an embodiment of the integrated speech-to-text/search module(s) in the server of FIG. 4.

As illustrated in the embodiment of FIG. 17, the server 108 may comprise a speech-to-text conversion engine 1704 that processes the audio streams 122 from the conferencing system 106. The speech-to-text conversion engine 1704 may output the text to one or more algorithm(s) 1708 (via interface 1706). The algorithm(s) 1708 may be configured to identify, based on the words spoken in the audio conference 114, relevant keyword(s) or topics of interest being discussed. The identified keywords or other identified terms (i.e., output of the algorithm(s) 1708) may be received by a resources engine 1712 (via interface 1710). The resources engine 1712 may be configured to select additional information, data, or other resources related to the identified terms and provide the information to the participants in the conference interface. The resources engine 1712 may make requests 1720 to, and receive responses 1722 from, a resources database or knowledge base 1718. The resources engine 1712 may also make calls 1714 to, and receive responses 1716 from, a search engine via, for example, an API 421 (FIG. 4).

Figure 27:
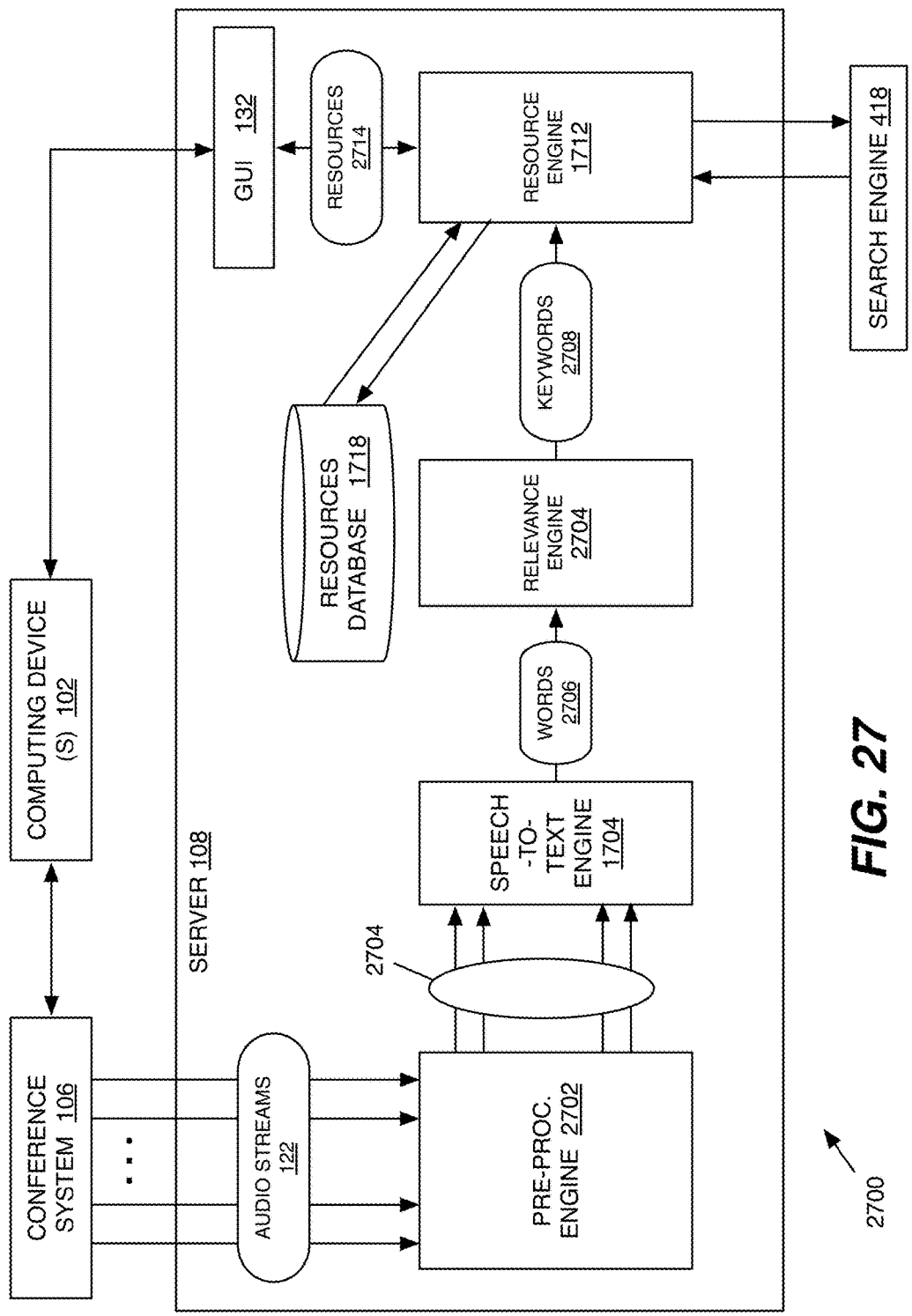
FIG. 27 is block diagram illustrating a server for implementing another embodiment of the integrated speech-to-text/search module(s) of FIG. 4

FIG. 27 illustrates another embodiment of a computer system 2700 for implementing real-time speech-to-text conversion in an audio conference 114. The computer system 2700 comprises a conference system 106 and one or more server(s) 108. The conference system 106 may be configured in the manner described above, or otherwise, for establishing an audio conference 114 between a plurality of participants 104 operating client devices 102 via a communication network. The conferencing system 106 controls an audio stream 122 for each computing device 102 in the audio conference 114. The audio streams 122 are combined by the conference system 106 to comprise the audio conference 114.

The server 108 comprises one or more functional processors for implementing aspects of the overall speech-to-text conversion process. It should be appreciated that the functional processors may be implemented in hardware, software, firmware, or any combination thereof. The overall speech-to-text conversion process and any associated processes are preferably performed in real-time during the audio conference 114. In an embodiment, the functional processors comprise a pre-processing engine 2702, a speech-to-text conversion engine 1704, a relevance engine 2704, and a resource engine 1712. The pre-processing engine 2702 communicates with the conference system 106, which may be integrated with the server(s) 108 or remotely located. The pre-processing engine 2702 receives the audio streams 122 from the conference system 106, extracts a speech signal 2704 from each audio stream 122, and provides the speech signals 2704 to the speech-to-text conversion engine 1704. The speech-to-text conversion engine 1704 receives the speech signals 2704, extracts words 2706 from the speech signals, and provides the words 2706 to the relevance engine 2704. It should be appreciated that any desirable conversion algorithms, models, processes, etc. may be used to quickly and accurately extract the words 2706.

The relevance engine 2704 processes the words 2706 according to, for example, heuristic algorithms, to determine relevant keywords 2708 spoken in the audio conference 114. The relevance engine 2704 provides the relevant keywords 2708 to the resource engine 1712. It should be appreciated that the relevant keywords 2708 may represent, for example, frequently spoken words, statistically significant words, topics, etc. The keywords 2708 may comprise one or more of the words 2706 or, in alternative embodiments, may comprise related words based on the subject matter of the audio conference 114.

The resource engine 1712 receives the keywords 2706 and determines resources 2714. The resources 2714 are selected with the purpose of providing to the participants 104 during the audio conference any desirable information, material, data, or other subject matter related to the keywords 2708. As illustrated in FIG. 27 and described below in more detail, the resources 2714 may be selected from a remote search engine 418 and/or a local resources database 1718 by sending a query 2720 and receiving a response 2722 to the query 2720.

Figure 26:
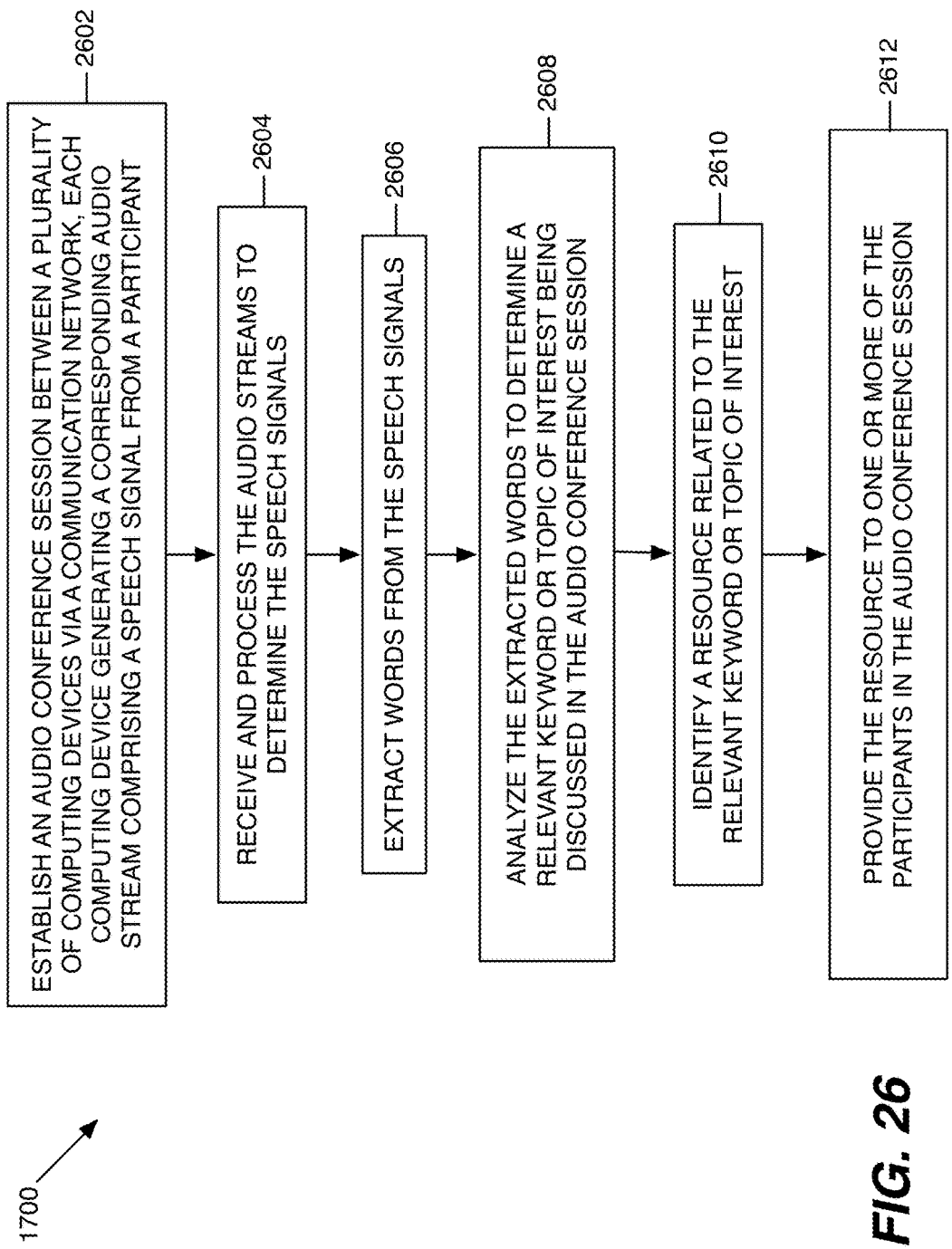
FIG. 26 is a flow chart illustrating an embodiment of a method for providing real-time resources to participants in a conference interface.

FIG. 26 illustrates an embodiment of a method implemented by the computer system 2700 for providing real-time resources 2714 to participants 104. In general, the real-time resources 2714 are identified based on the content being discussed in the audio conference 114 and provided to the participants 104 during the audio conference 114 via the conference interface. At block 2602, an audio conference session, such as audio conference 114, is established between a plurality of computing devices 102 via a communication network 110. Each computing device 102 participating in the audio conference session has an associated audio stream 122 that includes a speech signal for the corresponding participant 104. During the audio conference session, the audio streams 122 are provided to one or more server(s) 108 or, in alternative embodiments, may be established by or under the control of the server(s) 108. In real-time during the audio conference session, the server(s) 108 process the audio streams 122. It should be appreciated that, in some embodiments, the processing may be advantageously performed as fast as possible to minimize any delay in the feedback loop associated with blocks 2604-2612, while also ensuring suitable performance of the associated algorithm(s).

At block 2604, the audio streams 122 are received and processed by, for example, a pre-processing engine 2702, which converts the audio streams 122 into the corresponding speech signals 2704. At block 2606, words 2706 are extracted from the speech signals 2704 using any suitable algorithms for converting the speech signals 2704 into computer-readable data identifying the words 2706. The words 2706 may be extracted in a real-time stream, in batch mode, or otherwise. At block 2608, the words 2706 are analyzed, either individually or in groups, to determine relevant keyword(s) 2708 being discussed in the audio conference session. The relevant keyword(s) 2708 may comprise an identification of frequently spoken word(s), determination of a particular topic, or otherwise identify meaningful subject matter being spoken in the audio conference session and/or related to one or more extracted words 2706. In this regard, it should be appreciated that, in an embodiment, a keyword 2708 may comprise an extracted word 2706 which is repeated a certain number of times, either in absolute terms or relative to a period of time (e.g., a word occurrence or usage density). A keyword 2708 may also comprise an extracted word 2706 which appears to be of particular importance based on, for example, the identity of the participant 104 speaking the extracted word 2706, the waveform characteristics of the speech signal 2704, etc.

Figure 28:
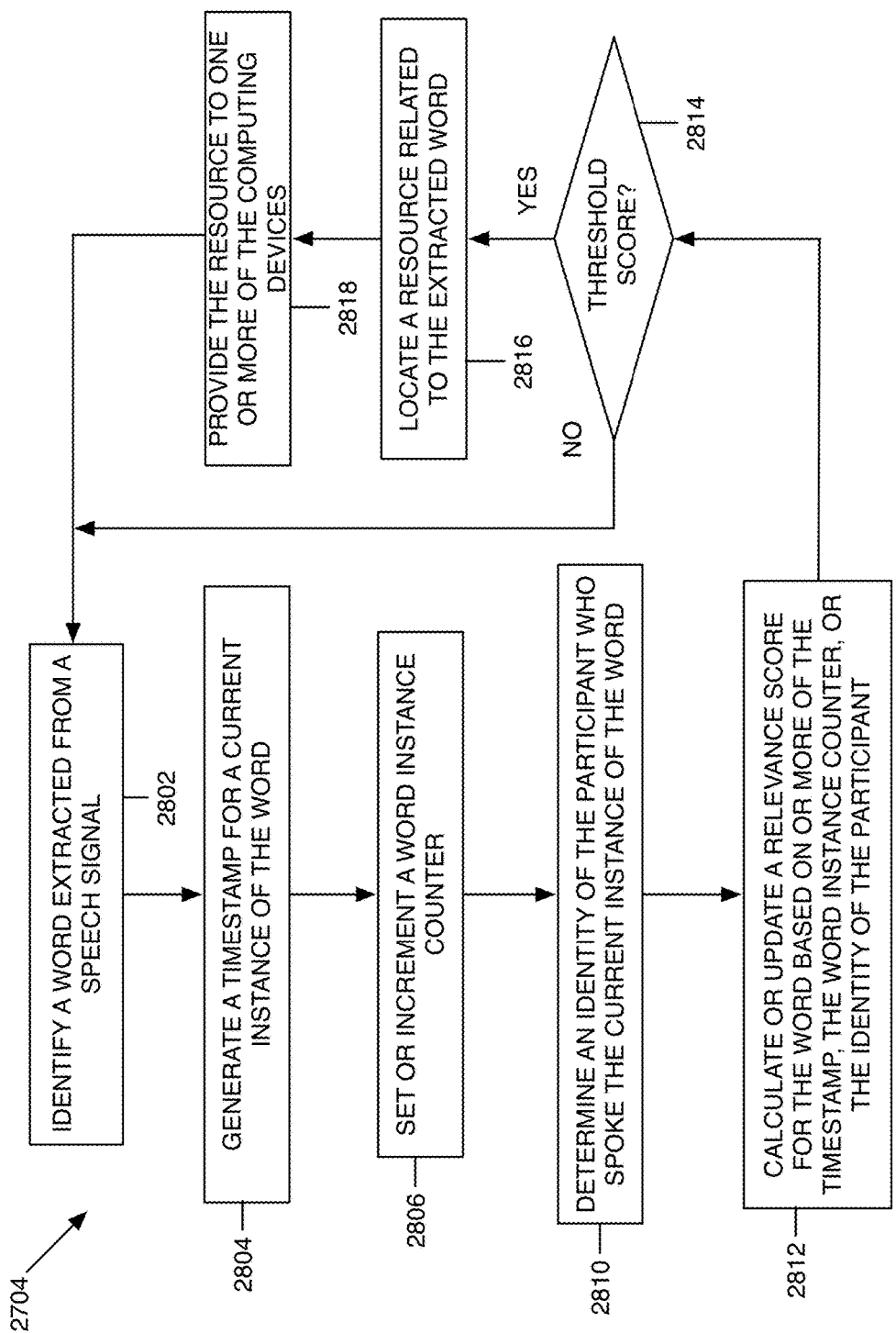
FIG. 28 is a flowchart illustrating the architecture, operation, and/or functionality of an embodiment of the relevance engine in the server of FIG. 27.

The keyword(s) 2708 may be determined using various algorithms. In the embodiment illustrated in FIG. 28, the keyword(s) 2708 are determined based on a relevance score that is calculated as the words 2706 are analyzed by, for example, the relevance engine 2704. At block 2802, one or more extracted words 2706 are identified. The extracted word(s) 2706 may be identified by a word identifier stored in a database. In this regard, it should be appreciated that the database may store a record or other data structure for maintaining data associated with a relevance score for one or more words 2706.

Figure 29:
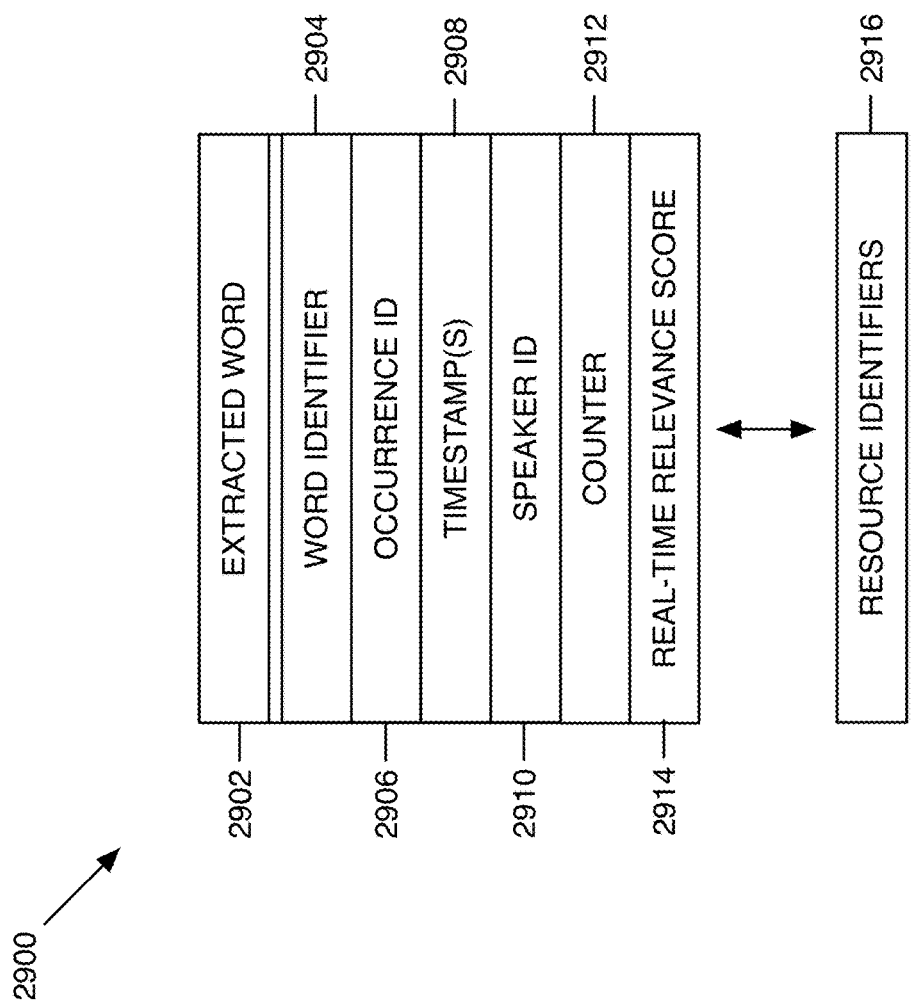
FIG. 29 is a diagram illustrating an exemplary data structure implemented by the relevance engine of FIG. 28.

FIG. 29 illustrates an exemplary data structure 2900 comprising the following data fields: an extracted word 2902, a word identifier 2904, an occurrence identifier 2906, one or more timestamps 2908, a speak identifier 2910, a counter 2912, and a real-time relevance score 2914. The extracted word 2902 identifies a particular word or combination of words that have been extracted from the speech signals 2704 with a corresponding identifier 2904. To keep track of occurrences or instances of the extracted word 2902, the data structure 2900 may comprise an occurrence identifier 2906. Each occurrence of the extracted word 2902 may include a timestamp 2908 indicating a temporal location within the audio conference 114 at which the extracted word 2902 was spoken. For any given occurrence, a speaker identifier 2910 may identify which participant 104 spoke the extracted work 2902. The speaker identifier 2910 may include a weighting or other priority scheme for determining the relevance of the participants 104, in terms of identifying keyword(s) 2708. For example, a host may be given higher priority than other participants 104. The priority scheme may incorporate one or more roles or categories of participants. In an embodiment, the roles may be based on, for example, an organizational hierarchy, whether a participant is an employee, vendor, or a "friend" on a social networking site. The counter 2912 may keep track of the number of occurrences of the extracted word 2902, either in absolute terms or relative to time based on the timestamps 2908.

Referring again to FIG. 28, as words 2706 are extracted, at block 2804, a timestamp 2908 may be generated for each instance of the extracted word 2902 and stored in the associated record according to the word identifier 2904. At block 2806, the counter 2912 may be set or incremented. At block 2808, the identity of the speaker may be determined and stored in the database. At block 2810, a relevance score may be calculated, according to various desirable algorithms, based on one or more of the following, or other types of data: timestamps 2908; speaker identifiers 2910; and counter 2912. The relevance score at any point in the audio conference may be stored in real-time score 2914.

At decision block 2814, it may be determined whether the relevance score exceeds a predetermined or calculated threshold. If the threshold is not exceeded, flow returns to block 2802. If the threshold is exceeded, at block 2816, it is determined that the extracted word 2902 is relevant, and the system attempts to locate a desirable resource related to the extracted word 2902. At block 2818, the resources 2714 are provided to the participants, in real-time during the audio conference 114.

It should be appreciated that, in an embodiment, the resource(s) 2714 may be identified by, for example, matching the extracted words 2902 to predetermined resources, according to resource identifiers 2916 associated with the extracted word 2902 (FIG. 29). The resource identifiers 2916 may link to records in the resources database 1718. In another embodiment, a resource 2714 may be determined by querying the resources database 1718 or a search engine 418 (query 2720 and response 2722—FIG. 27).

Figure 30:
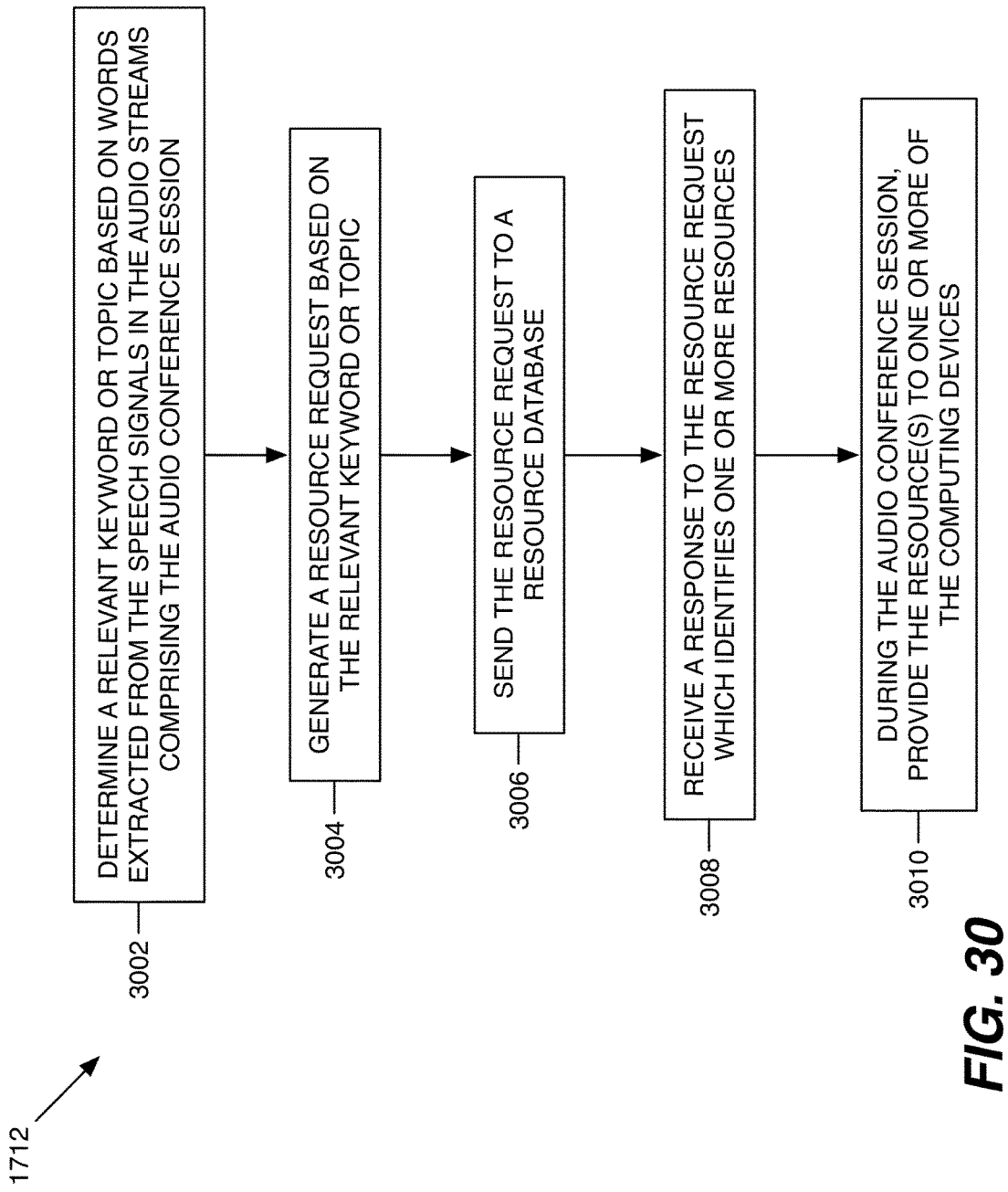
FIG. 30 is a flowchart illustrating the architecture, operation, and/or functionality of an embodiment of the resources engine of FIG. 27.

FIG. 30 illustrates an embodiment of a method for performing a search to determine the resources 2714. At block 3002, the relevant keyword(s) 2708 are received from, for example, the relevance engine 2704. At block 3004, a resource request 2722 is generated. The resource request 2722 may include the keyword(s) 2708 or other search term(s) using any desirable searching methods, APIs, etc. At block 3006, the resource request 2722 is provided to the search facility or database (e.g., database 1718, search engine 418, etc.). At block 3008, a response 2722 is received, which identifies one or more resources 2714. The response 2722 may include, for example, links to the resources 2714 (e.g., resource identifier 2916, a URL) or the actual information embodying the resources 2714. At block 3010, the resources 2714 are provided to one or more of the computing devices 102. The resources 2714 are provided to the participants 104 via the audio conference 114 and/or the conference interface. In an embodiment, the results of the resource request 2722 may be provided to the participants, thereby enabling the participants 104 to select and/or navigate the results. For example, the search engine results may be passed on, or otherwise exposed to the participants 104, via the graphical user interface 132. Referring again to FIG. 26, the resources 2714 are identified (block 2610) and provided to the participants 104 (block 2612) in the manner described above.

Various embodiments of the conference app store functionality 420 (FIG. 4) will be described with reference to FIGS. 43-49. The conference app store functionality 420 generally comprises an online store or marketplace (referred to as a "conferencing application store" or "conferencing app store") that offers various audio and/or web conferencing applications 416 or other desirable applications (collectively referred to "conferencing applications" or "conferencing apps") to participants 104. The conferencing app store may be provided to participants 104 via a conference interface (e.g., conferencing user interface 4400) presented to the computing devices 102 during the audio conference 114. The conferencing applications may include, for example, web-based applications, widgets, or other computer programs made available to participants 104 via the conferencing system 106 and/or servers 108. The conferencing applications may be provided by a host associated with the conferencing system 106 or, in some cases, may also be provided by and/or developed by third party developers 4310. In these embodiments, the conferencing system 106 may include an associated API (e.g., API 4302) and/or a software developer kit (SDK) for enabling developers to develop various conferencing applications that may be included in the conferencing app store and made available to the participants 104.

Figure 43:
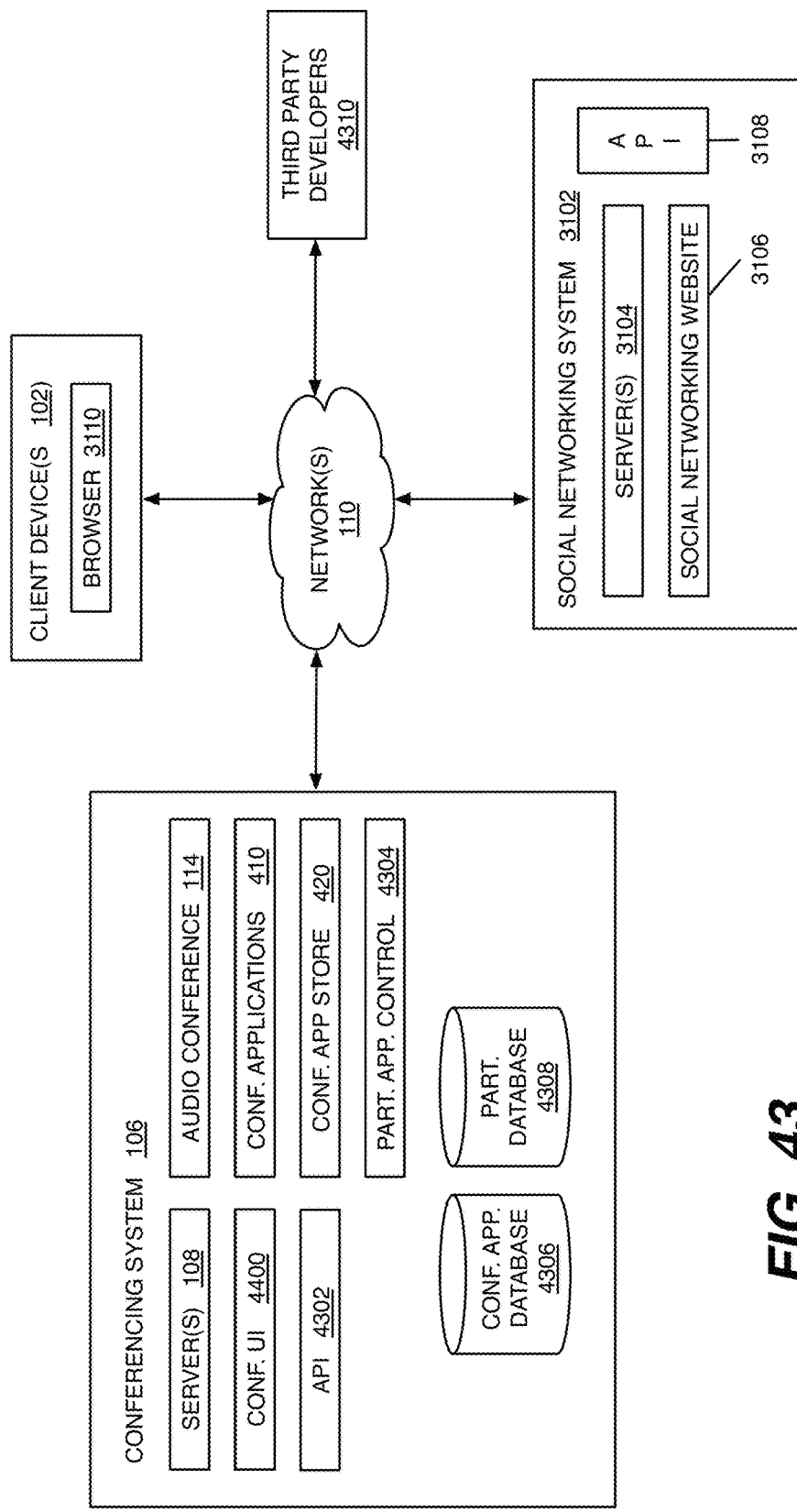
FIG. 43 is a block diagram illustrating an embodiment of a computer system for implementing a conferencing app store in a conferencing system.

As illustrated in FIG. 43, the conferencing application store may be integrated with a social networking system 3102, such as those described below in connection with FIGS. 31-36 or others. The social networking system 3102 may include various social networking applications 3218 (FIG. 32) that are provided to members 3201. In an embodiment, the conferencing system 106 may be configured to communicate with the social networking system 3102 (e.g., via API 3108, API 4302, etc.), access the social networking applications 3218, and include access to the social networking applications 3218 in the conferencing application store. In this manner, a member 3201 who is also a participant 104 in an audio conference 114 may conveniently access their social networking applications 3218 via the conferencing system 106. Similarly, the social networking system 3102 may access the conferencing system 106 and make them available to members 3102 via the social networking website 3106.

To facilitate certain aspects of the conferencing application store, the conferencing system 106 may comprise a conference application database 4306, a participant database 4306, a participant application control module 4304, and a conference user interface 4400. The conference application database 4306 may store information related to the conferencing applications 410, such as, for example, links to the application code or the application code itself. In this regard, it should be appreciated that the conferencing system 106 need not, but may, store the code associated with the conferencing applications. In some embodiments, the conferencing applications may be served by, for example, a third party system. Regardless, within the conference application database 4306, each conferencing application may be identified by a unique application identifier.

Figure 46:
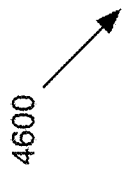
FIG. 46 is a diagram illustrating an exemplary data structure implemented by the conference app store and/or the participant application control modules in FIG. 43.

The participant database 4306 may store information related to the participants 104 and their corresponding conferencing applications. An exemplary data structure 4600 is illustrated in FIG. 46. Each participant 104 in an audio conference 114 may be identified with a unique participant identifier 3802 and may include any of the following, or other, parameters; a name 3804; a title 3806; an email address 3808; a phone number 3810; a resident and/or home address 3812; a current location 3814 (which may be obtained by GPS coordinates from the client device, from an IP address, etc.); social networking profile parameters 3816; a graphical representation 124 (FIG. 1); a virtual location view 124 (FIG. 1); conference applications 3818; and an account profile 4602. The conferencing applications 3818 may be identified with a corresponding unique application identifier as described above. The account profile 4602 may include account information associated with the participant 104, including, for example, account numbers, credit card numbers, etc. to facilitate online transactions that enable the participant 104 to purchase conferencing application.

The participant application control modules 4304 comprise the logic, functionality, etc. for performing various features associated with the conferencing application store. The participant application control module(s) 4304 enable the conferencing system to manage which conferencing applications a user has purchased or selected, and presents the appropriate applications via the conference interface when the user joins an audio conference 114. In this regard, it should be appreciated that the conferencing system 106 may provide enterprise-level conferencing services to corporations, organizations, government agencies, etc. In such embodiments, the control modules 4304 may manage access, permissions, etc. for enterprise employees. For example, the enterprise may specify which conferencing applications a particular employee may access based on title, organization role, organizational level, employee ID, etc. This information may be stored in an enterprise database and used by the control modules 4304 to select which conferencing applications are to be made available to the employee.

Figure 44:
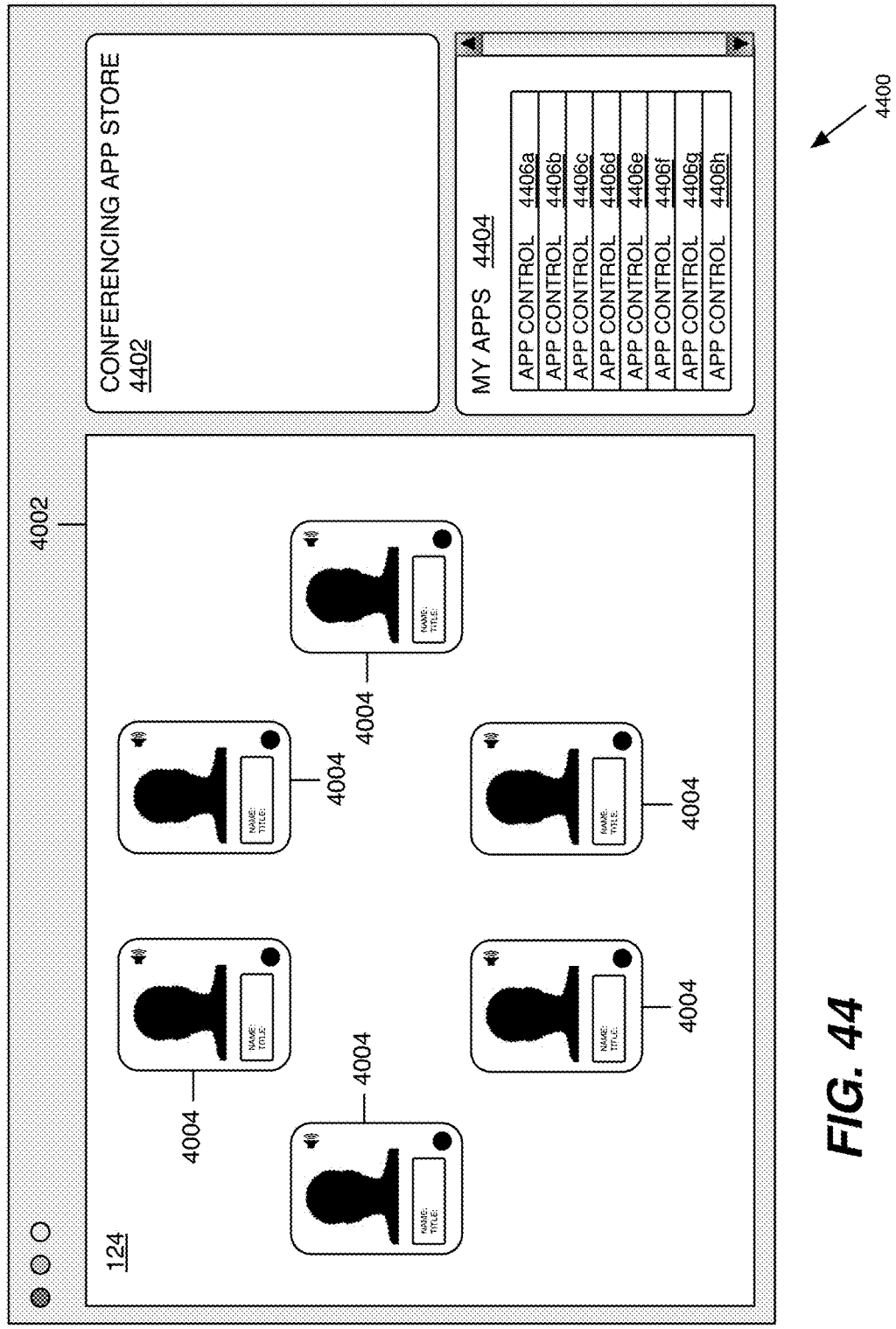
FIG. 44 is screen shot illustrating an exemplary embodiment of a conference interface for implementing certain aspects of the conferencing app store for enabling participants to interact with conferencing applications during an audio conference.

FIG. 44 illustrates an embodiment of a conference user interface 4400 for presenting the conferencing application store to participants 104 during an audio conference 114. The conference user interface 4400 generally comprises a screen portion 4002, which may display participant objects 4004 for each participant 104 in the audio conference 114, as described above. The conference user interface 4400 further comprises conferencing app store component 4402 and my apps component 4404. The conferencing app store component 4402 generally comprises the user interface mechanism(s) for presenting the app store functionality. The conferencing app store component 4402 may be accessed by the participants 104 in various ways, such as, for example, via a menu system or any other user interface inputs, controls or objects. The conferencing app store component 4402 need not be simultaneously displayed with the screen portion 4002. The conferencing application store may include a large number of conferencing applications organized into categories or otherwise organized to present a desirable browsing experience to the participants.

Figure 45:
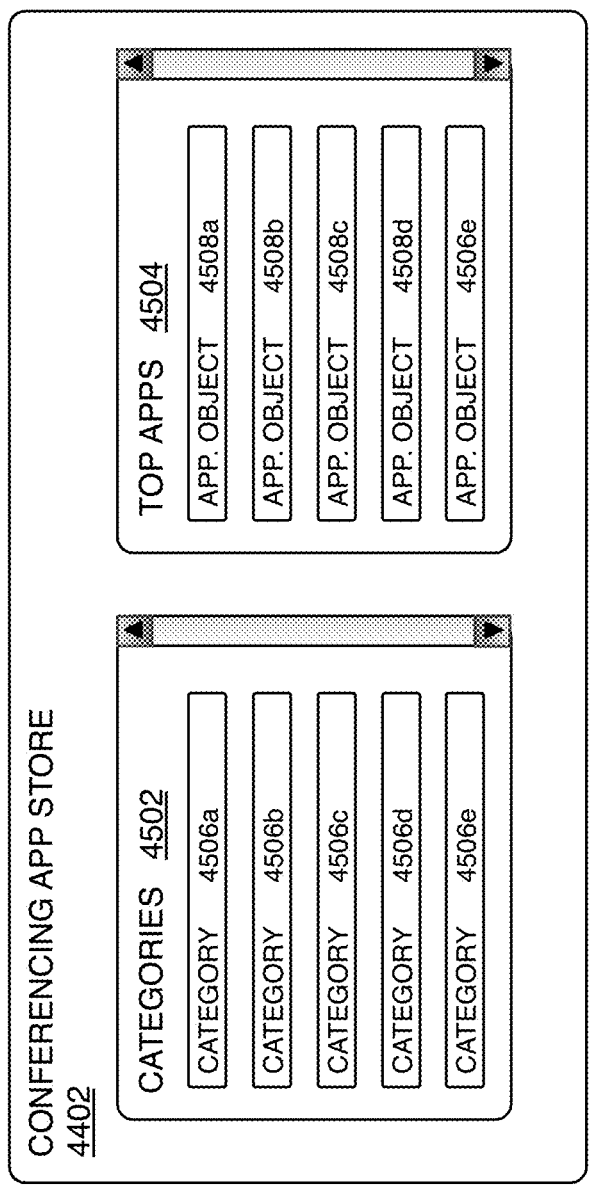
FIG. 45 is a screen shot of another embodiment of a conference interface for implementing aspects of the conferencing app store for enabling participants to browse available conference applications during an audio conference.

As illustrated in FIG. 45, the conferencing app store component 4402 may display a categories menu 4502 and a top apps menu 4504. Categories menu 4502 comprises a scrollable list displaying a plurality of categories. Each category may be selected using a category object or control 4506. When selected, the control 4506 may present a further user interface for enabling the participants to browse applications in that particular category. The conferencing application store may provide other browsing, navigation, or other mechanisms for enabling the participants 104 to view the conferencing applications in the conference interface. In one embodiment, a search engine may be provided via a search text box displayed in the conference user interface 4400. The conferencing application store may also implement a recommendations feature that automatically, displays suggested applications to participants based on, for example, current applications, usage characteristics, profile parameters, social networking profiles, etc. In further embodiments, the conferencing application store may enable the participants 104 to recommend or share conferencing applications with other participants 104 and/or members 3102.

Figure 47:
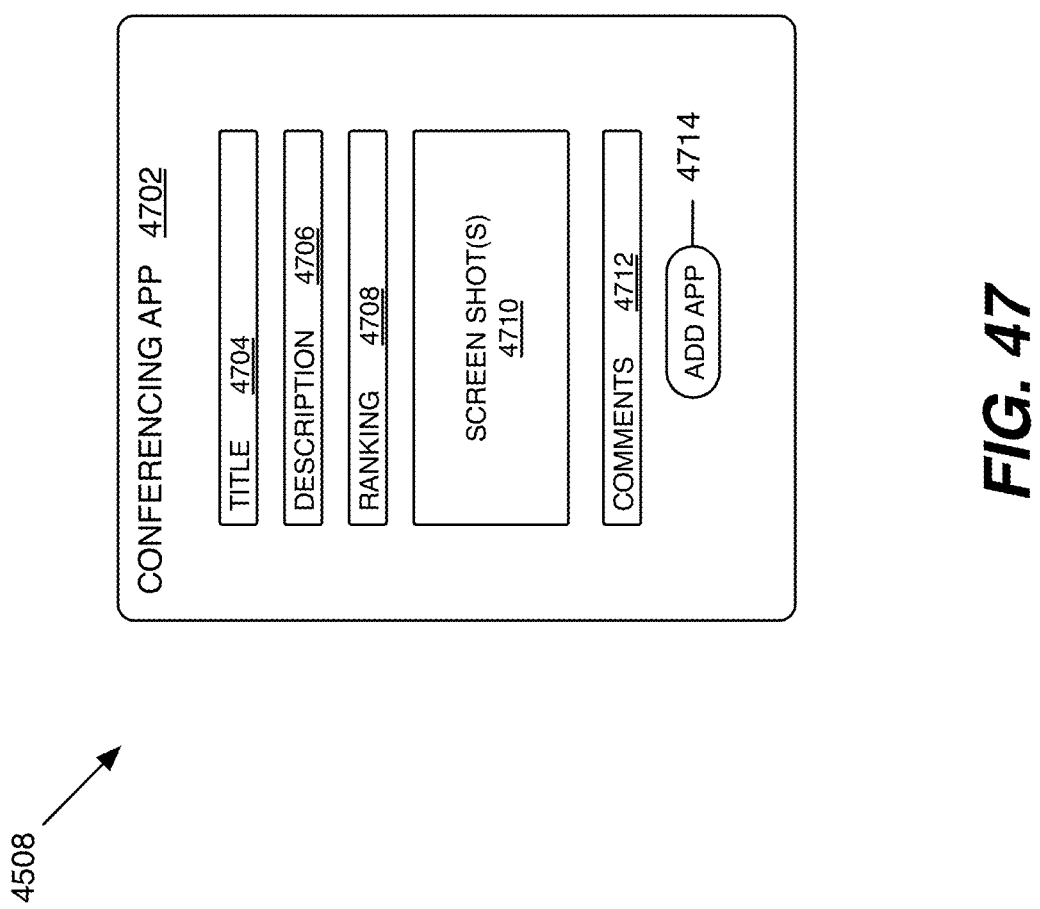
FIG. 47 is a screen shot of another embodiment of the conference interface for implementing aspects of the conference app store for enabling participants to purchase or otherwise access conferencing applications.

The top apps menu 4504 may display another scrollable list of application objects 4508 organized based on, for example, a ranking algorithm. Each application object 4508 is associated with a further user interface screen (e.g., component 4702—FIG. 47) for displaying information about the corresponding conferencing application. As illustrated in the embodiment of FIG. 47, when selected, one or more of the following types of information may be displayed: an application title 4704; a description 4706 of the conferencing application; a user ranking 4708; one or more screen shots 4710 of the conferencing application; and comments 4712 provided by other participants 104. Anywhere within the conference user interface 4400, an add app object 4714 (FIG. 47) may be displayed or otherwise presented. The add app object 4714 provides a user interface control for enabling the participant 104 to select the corresponding conferencing application. When selected, the conferencing application may be automatically added to the participant's profile and made available to the participant 104. Some conferencing applications may be made available for purchase from the host of the conferencing system 106 or the third party developers 4310, while others may be free. If the conferencing application is for purchase, the add app object 4714 may be linked to an online transaction functionality for enabling the participant to purchase the application. In other embodiments, purchases may be automatically processed according to a stored account profile 4602 (FIG. 46) and made available to the participant.

Figure 48:
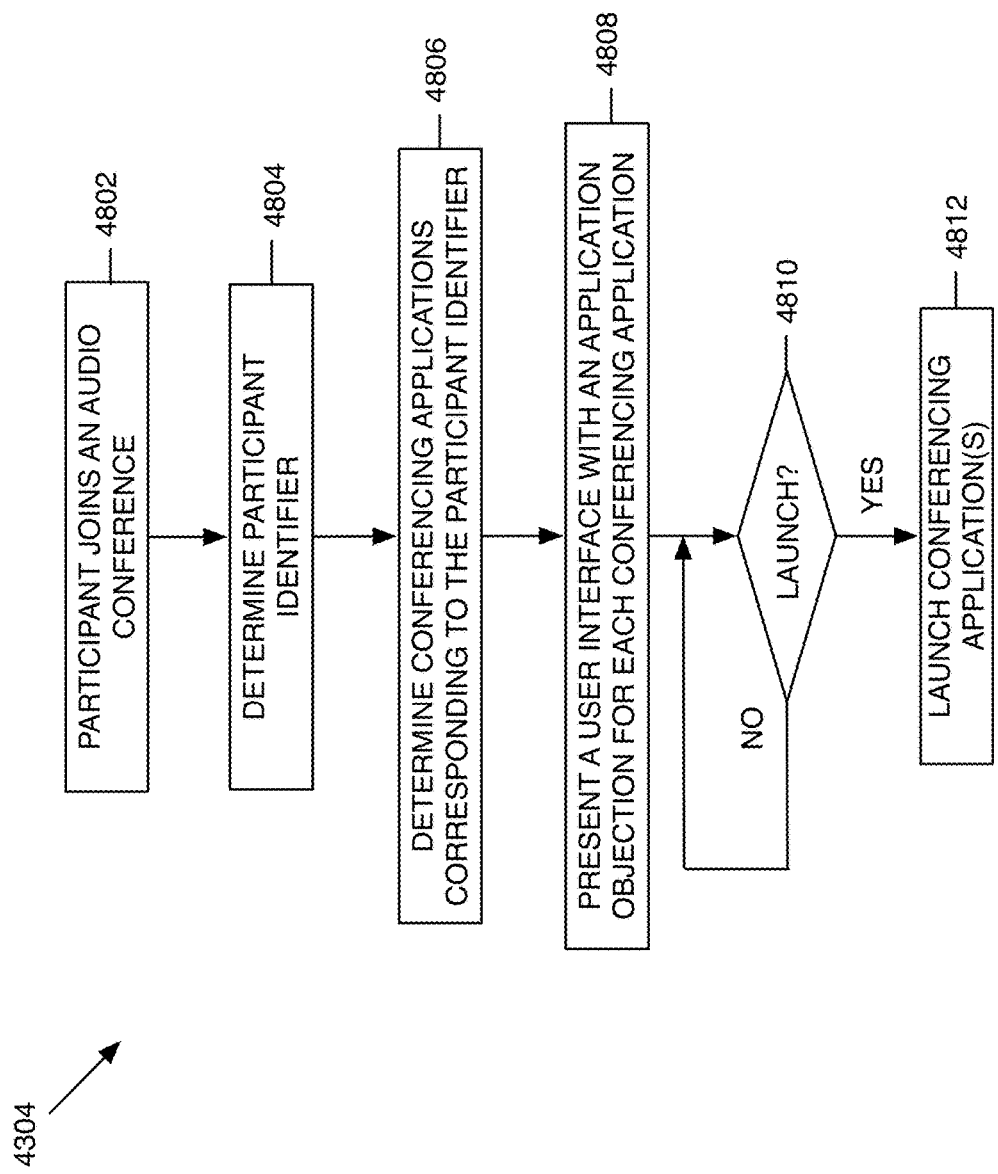
FIG. 48 is a flowchart illustrating the architecture, operation, and/or functionality of an embodiment of the participant application control modules in the conferencing system of FIG. 43.

FIG. 48 illustrates an embodiment of a method for operating a conferencing application store in a conferencing system 106. At block 4802, the participant 104 joins the audio conference 114. At block 4804, the participant application control module 4304, determines a participant identifier 3802 associated with the participant 104. The participant identifier 3802 may be obtained in various ways. In one embodiment, the participant 104 may provide profile information during a login process (FIG. 6), which is used to reference a participant identifier 3802 in the participant database 4308. It should be appreciated, however, that the participant identifier 3802 may be determined based on any available information, including, for example, the participant's originating telephone number, an IP address, a social networking profile, or a request from the computing device 102 (e.g., URL).

At block 4806, the participant application control module 4304 determines the conferencing applications associated with the participant identifier 3802. The participant application control module 4304 may access this information from a database (e.g., conference app database 4306, participant database 4308) and/or from a social networking system 3102. As mentioned above, in the enterprise context, the conferencing applications associated with an employee may be specified according to permissions, roles, etc. provided by the enterprise. In this manner, at block 4806, the conferencing applications are determined based on the enterprise-related information.

At block 4808, the conference user interface 4400 is presented to the computing device 102 associated with the participant, and the associated conferencing applications are made available for use. The conference user interface 4400 may display the available conferencing applications in, for example, the my apps component 4404 (FIG. 44) with a corresponding application control 4406. The application control 4406 may be selected to launch the conferencing application, configure application settings, share the application, or access other features.

At blocks 4810 and 4812, the participant application control module 4304 may automatically launch one or more of the available conferencing applications. Alternatively, the participant 104 may manually launch a conferencing application by selecting the corresponding application control 4406.

Figure 49:
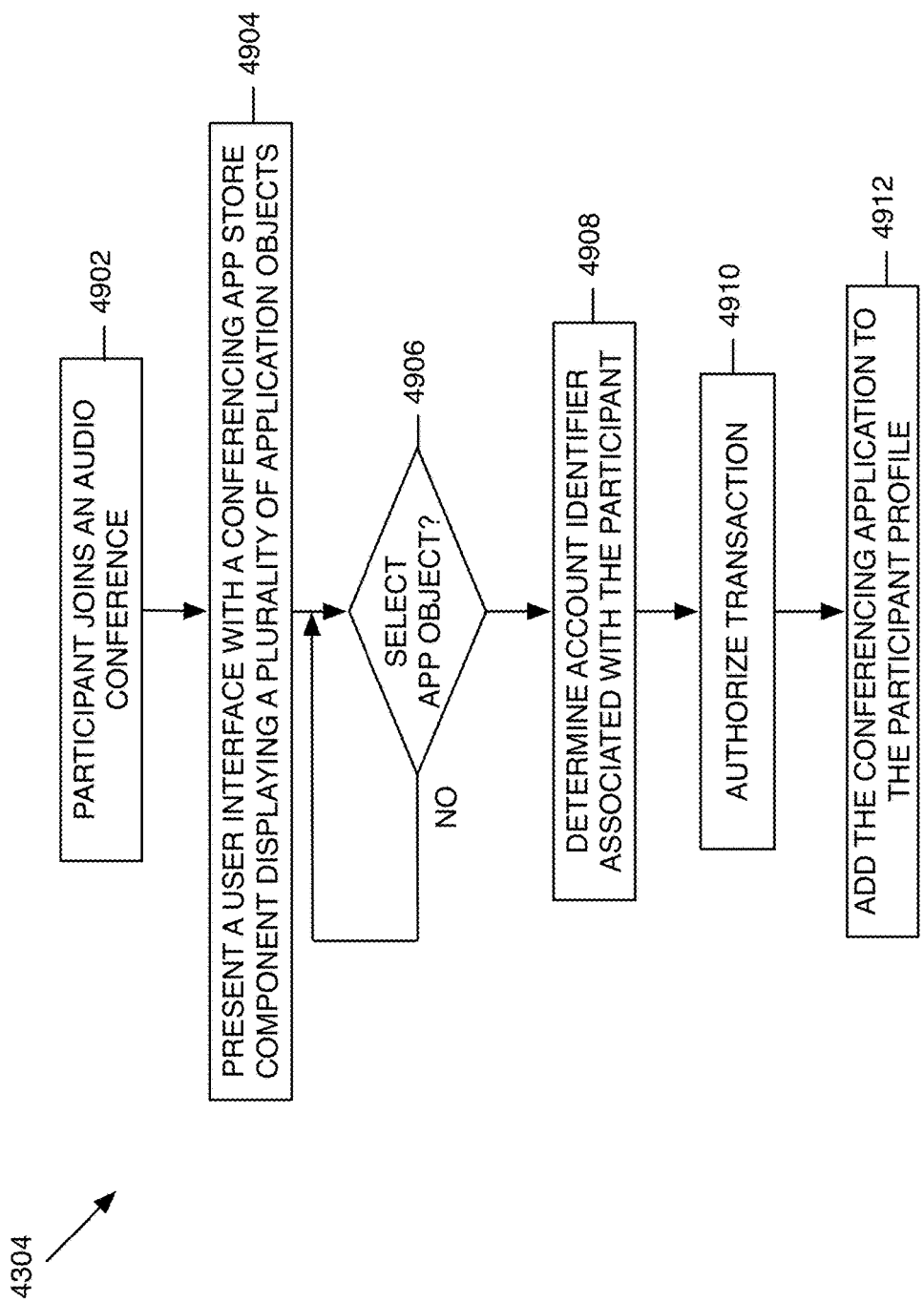
FIG. 49 flowchart illustrating the architecture, operation, and/or functionality of another embodiment of the participant application control modules in the conferencing system of FIG. 43.

FIG. 49 illustrates an embodiment of a method for providing conferencing applications to participants 104 in an audio conference 114. At block 4902, a participant joins an audio conference 114. At block 4904, a conference user interface 4400 is presented to a computing device 102 associated with the participant 104. The conference user interface 4400 comprises a conferencing application store component 4402 for browsing conferencing applications that are available via the conferencing system 106. The conferencing application store component 4402 may display a plurality of applications objects, each object associated with one of the available conferencing applications.

The participant 104 may select one or more of the available conferencing applications in the conferencing application store. At decision block 4906, the participant application control module 4304 may determine that one of the application objects has been selected by the participant 104. The selected conferencing application may be launched or made available for launching by the participant. In some embodiments, to access the conferencing application, the participant 104 may be required to purchase it. At block 4908, the participant application control module 4304 may determine the account identifier associated with the participant 104 and authorize the purchase (block 4910). At block 4912, the conferencing application may be added to the participants profile.

Figure 5:
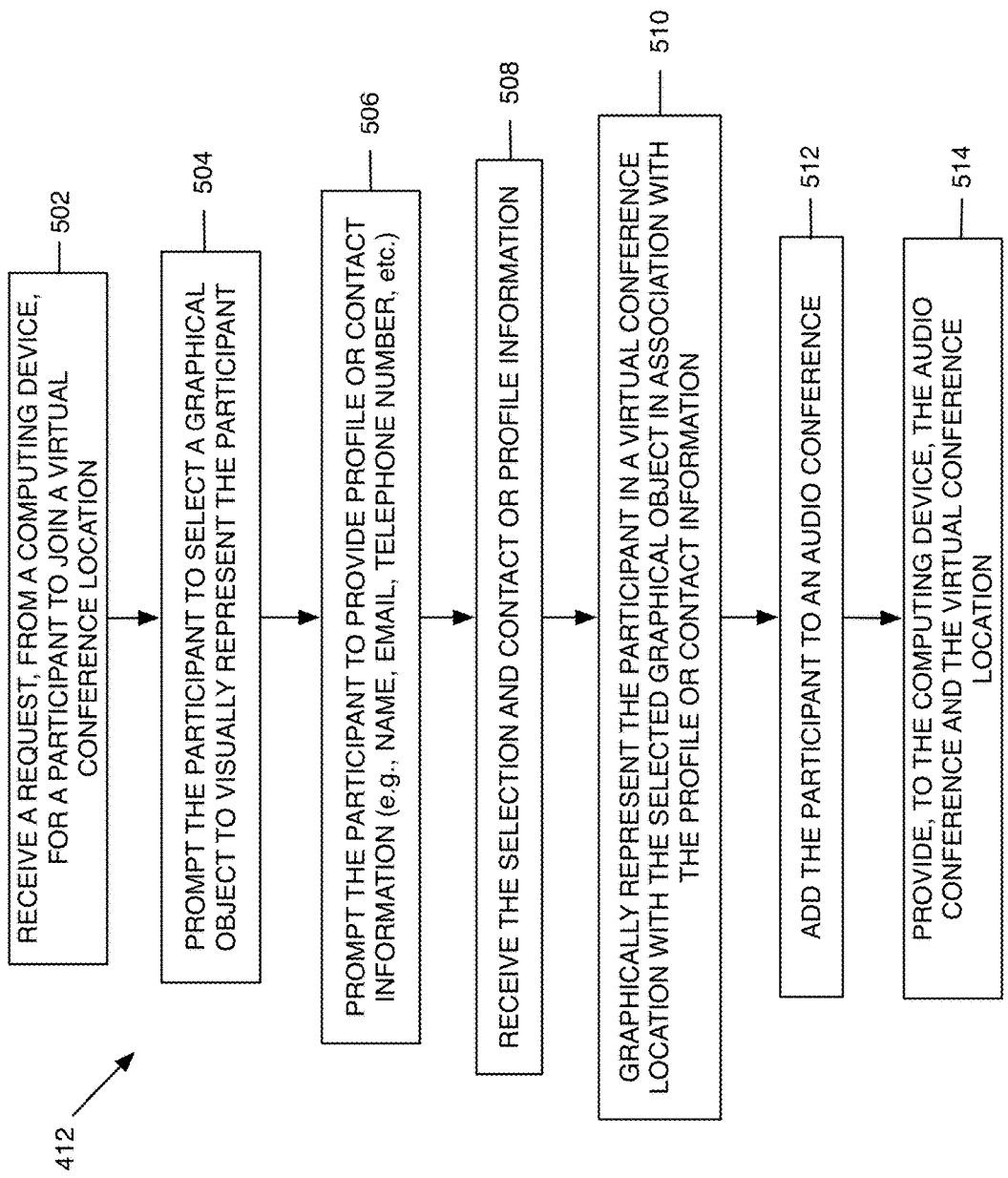
FIG. 5 is a flowchart illustrating the architecture, operation, and/or functionality of an embodiment of the participant configuration module(s) of FIG. 4.
Figure 6:
FIG. 6 is a login screen for a conference interface presented via the graphical user interface of FIGS. 1 & 4.
Figure 7:
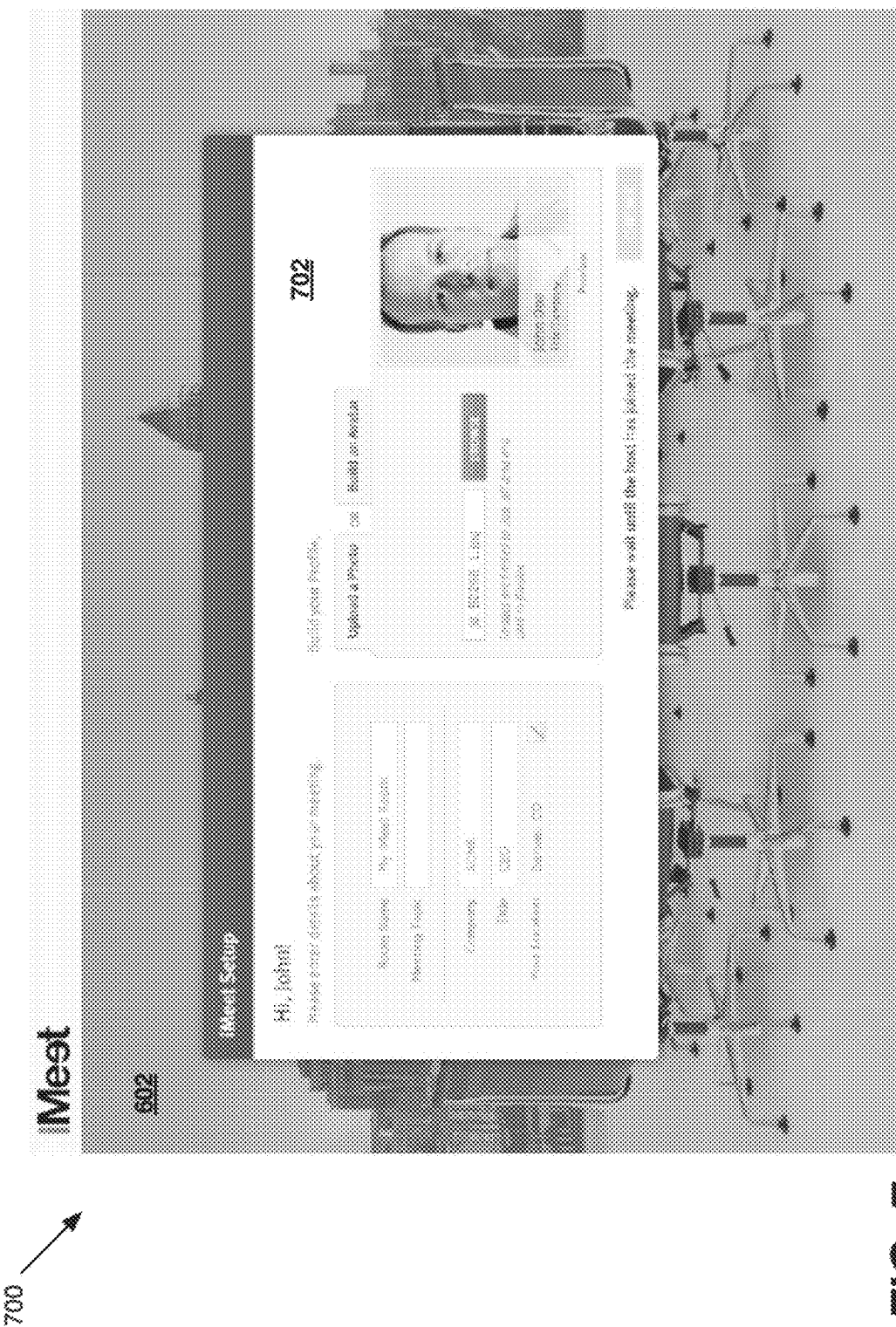
FIG. 7 is participant setup screen for a conference interface presented via the graphical user interface of FIGS. 1 & 4.
Figure 8:
FIG. 8 is host setup screen for a conference interface presented via the graphical user interface of FIGS. 1 & 4.

Referring again to FIG. 4 and the various software modules stored in the server memory 404, the participant configuration module(s) 412 generally comprise the logic or functionality for enabling participants to join the conference and/or configure their user-related information 130 via the conference interface. FIG. 5 is a flowchart illustrating the architecture, operation, and/or functionality of an embodiment of the virtual participant configuration module(s) 412. At block 502, the server 108 receives a request from a client device 102. The request may originate from, or be initiated from, for example, a link embedded in an electronic message sent to a participant 104 by the host. By selecting the embedded link, the client device 102 may access the server 108 and initiate a login and/or setup procedure (FIGS. 6-8). At block 504, the server 108 may prompt the participant 104 to select a graphical object to visually represent the participant 104 in the conference interface. At block 506, the server 108 may prompt the participant to provide profile or contact information (e.g., user-related information 130). At block 508, the server 108 may receive the user selections and/or information. FIG. 6 illustrates a screen shot 600 of an exemplary login screen 604 for enabling the participants 104*a*-104*c* to join the conference. The login screen 604 may be displayed over an image 602 representing the virtual location view 124. The login screen 604 comprises a "first name" text field, a "last name" text field, an "email address" text field, and a "phone number" text field. The login screen 604 also enables the user to request that the server 108 and/or the conferencing system 106 initiate an outgoing call to the user to join the audio conference 114. Referring again to FIG. 5, at block 510, the server 108 may graphically represent the participant 104 in a virtual conference location with the selected graphical object in association with the profile or contact information. At block 512, the server 108 may add the participant 104 to the audio conference 114 and, at block 514, provide to the computing device (e.g., client device 102) the audio conference 114 and the virtual conference location.

Figure 9:
FIG. 9 is a screen shot of an embodiment of a conference interface presented via the graphical user interface of FIGS. 1 & 4 with a first location view.
Figure 10:
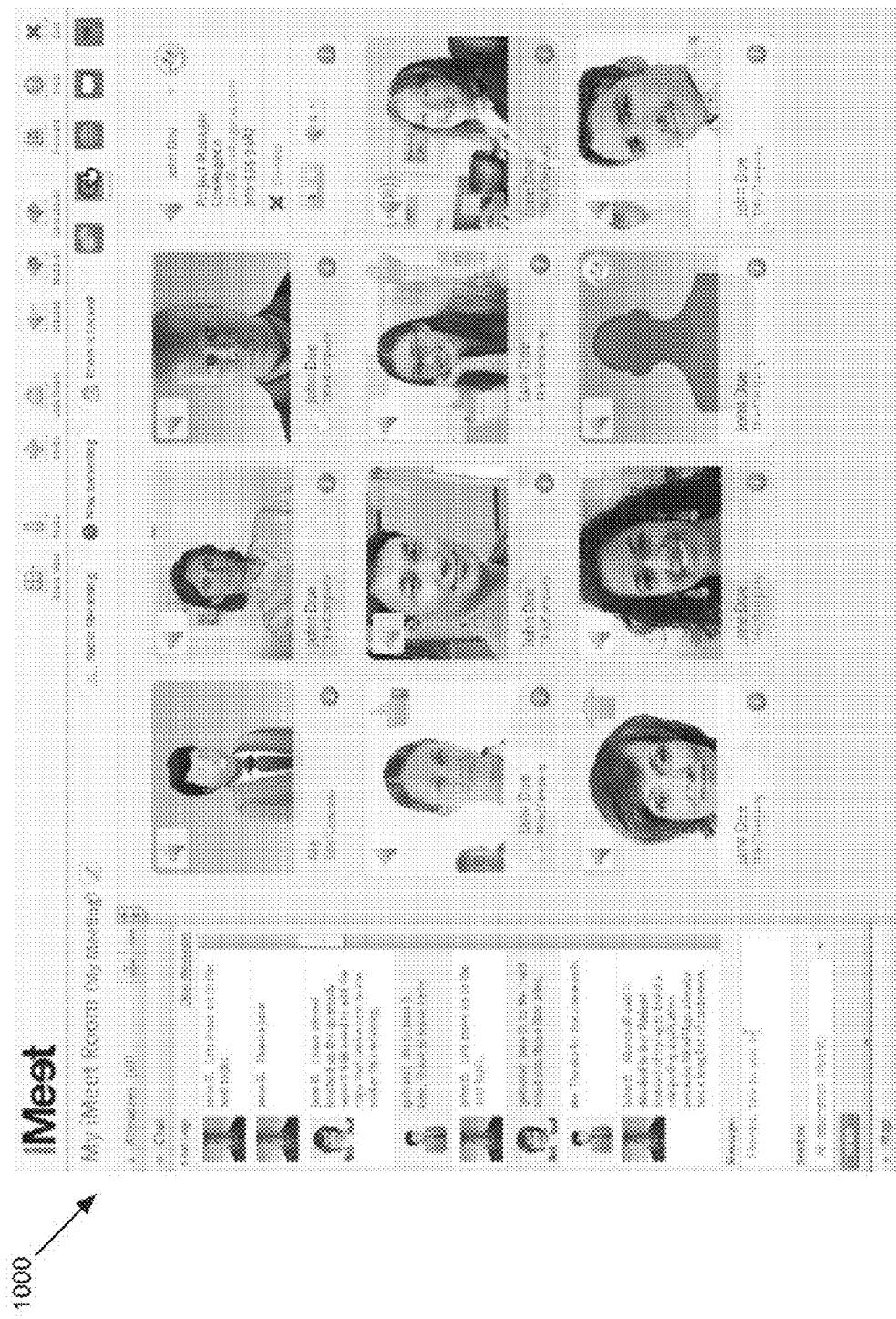
FIG. 10 is a screen shot of another embodiment of a conference interface with a tile view.
Figure 11:
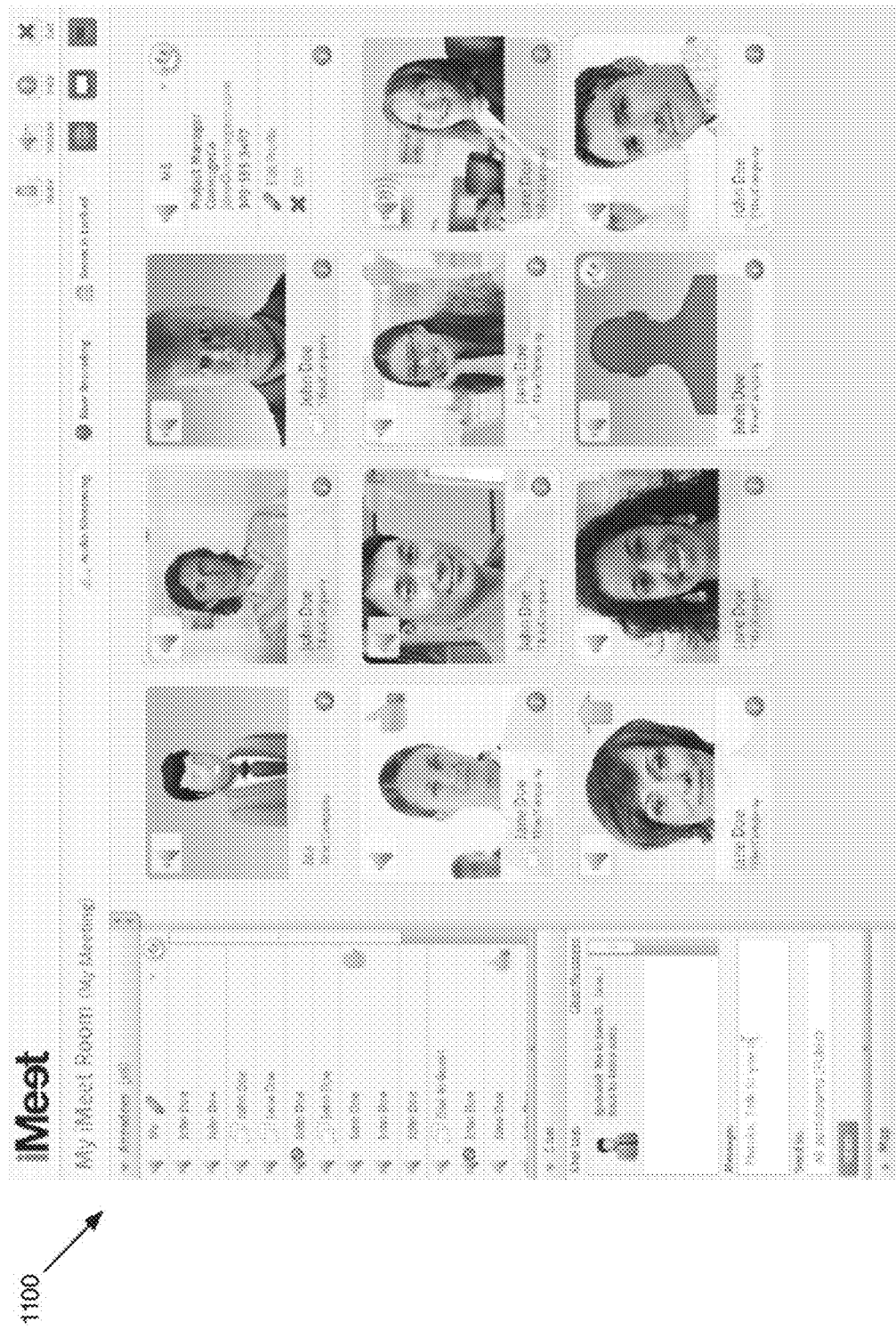
FIG. 11 illustrates the screen shot of FIG. 10 with the attendees list expanded.
Figure 12:
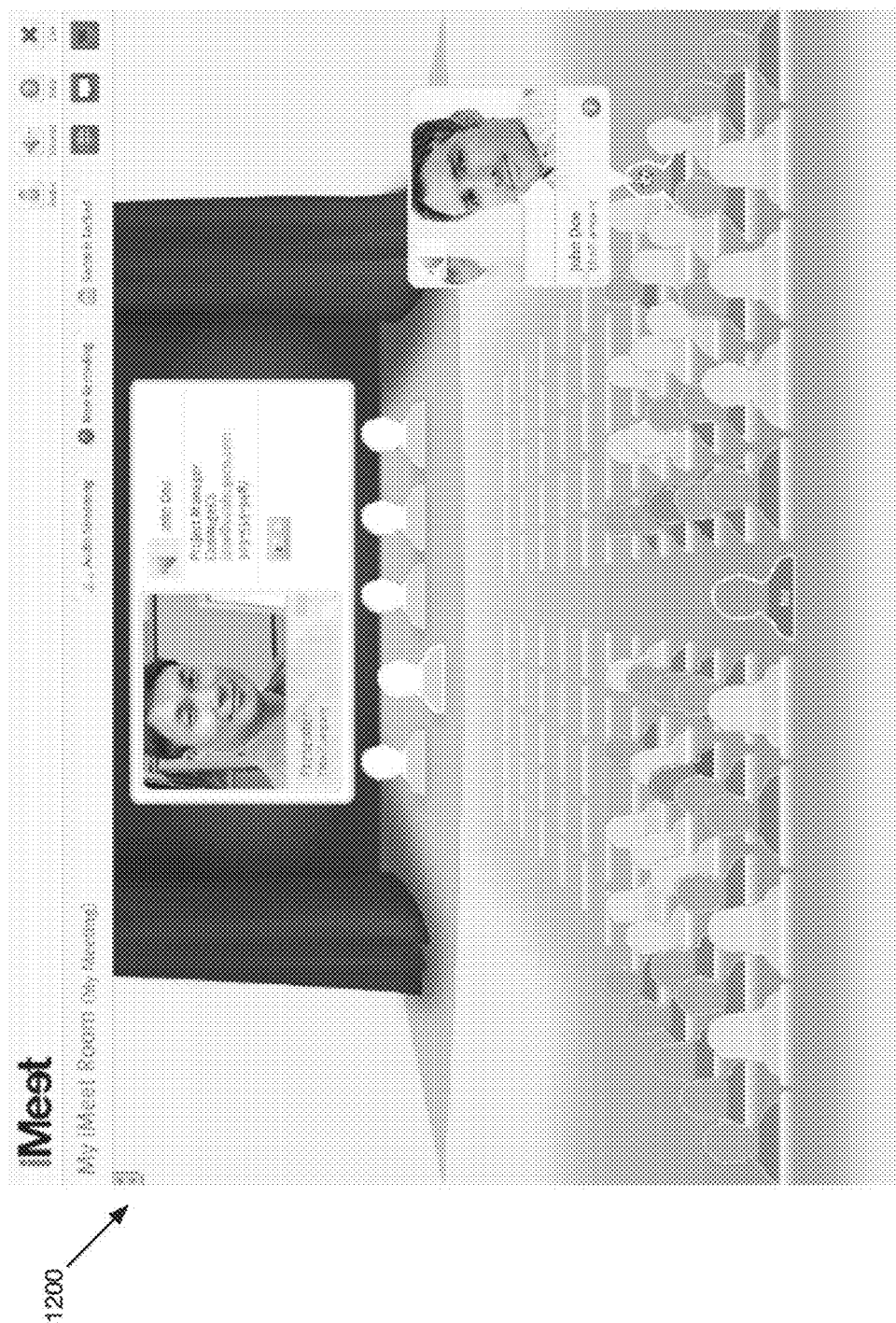
FIG. 12 is a screen shot of a further embodiment of a conference interface with a theatre view.
Figure 13:
FIG. 13 is a screen shot of another embodiment of a conference interface.
Figure 14:
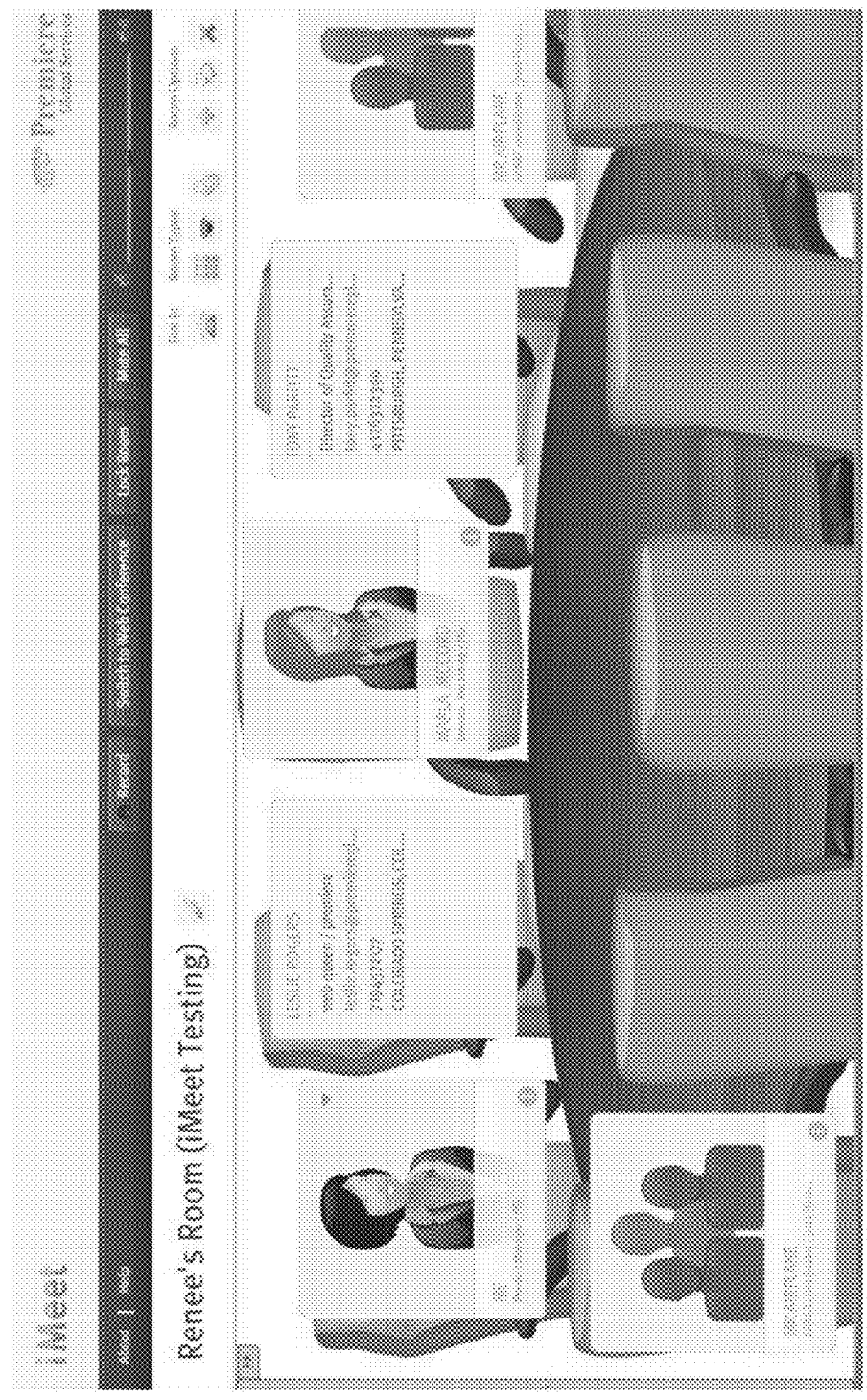
FIG. 14 illustrates the screen shot of FIG. 13 with two participants displaying business card.

Various embodiments of virtual location view(s) 124 are illustrated in FIG. 7-14. FIG. 7 illustrates a participant setup screen 700 for enabling the participants 104 to configure a user profile. FIG. 8 illustrates a host setup screen 800 for enabling the host 104*d* to configure a conference and customize a profile. FIG. 9 is a screen shot 900 that illustrates an exemplary conference location view (e.g., the image 602) of the conference. As further described herein, the participants 104 may be visually represented with tiles 304, which may include an audio indicator 904 (similar to the audio indicator 4106 of FIGS. 41*a* & 41*b*) and a business card component 902 (similar to the business card component 4108 of FIGS. 41*a* & 41*b*). FIGS. 10 & 11 illustrate screen shots 1000 and 1100, respectively, of an exemplary tile view of the virtual conference. In the embodiments of FIGS. 10 & 11, the tiles 304 are arranged in a grid format. The conference interface further comprises various selectable side panels. An attendees panel may display the participants 104 in a list format along with any desirable user information. A chat panel may enable the participants 104 to chat during the audio conference 114. A map panel may display the locations of the participants 104 in a map view. FIG. 12 is a screen shot 1200 that illustrates an exemplary theatre view for the conference interface, which may be desirable for conferences with a relatively large number of participants 104. In this embodiment, participants 104 defined as presenters may be displayed on a stage, and the other participants 104 may be displayed in the seats of the theatre. In the theatre view, the participants 104 may be presented in a default state without any contact information to reduce visual clutter, although the contact information may be accessed (FIG. 12) by a suitable user interface command (e.g., a mouse-over, mouse click, hot key, etc.). FIGS. 13 & 14 illustrate screen shots 1300 and 1400, respectively, of an alternative embodiment of a conference interface in which the virtual location comprises a conference room environment with the participants 104 arranged around the conference table.

Figure 15:
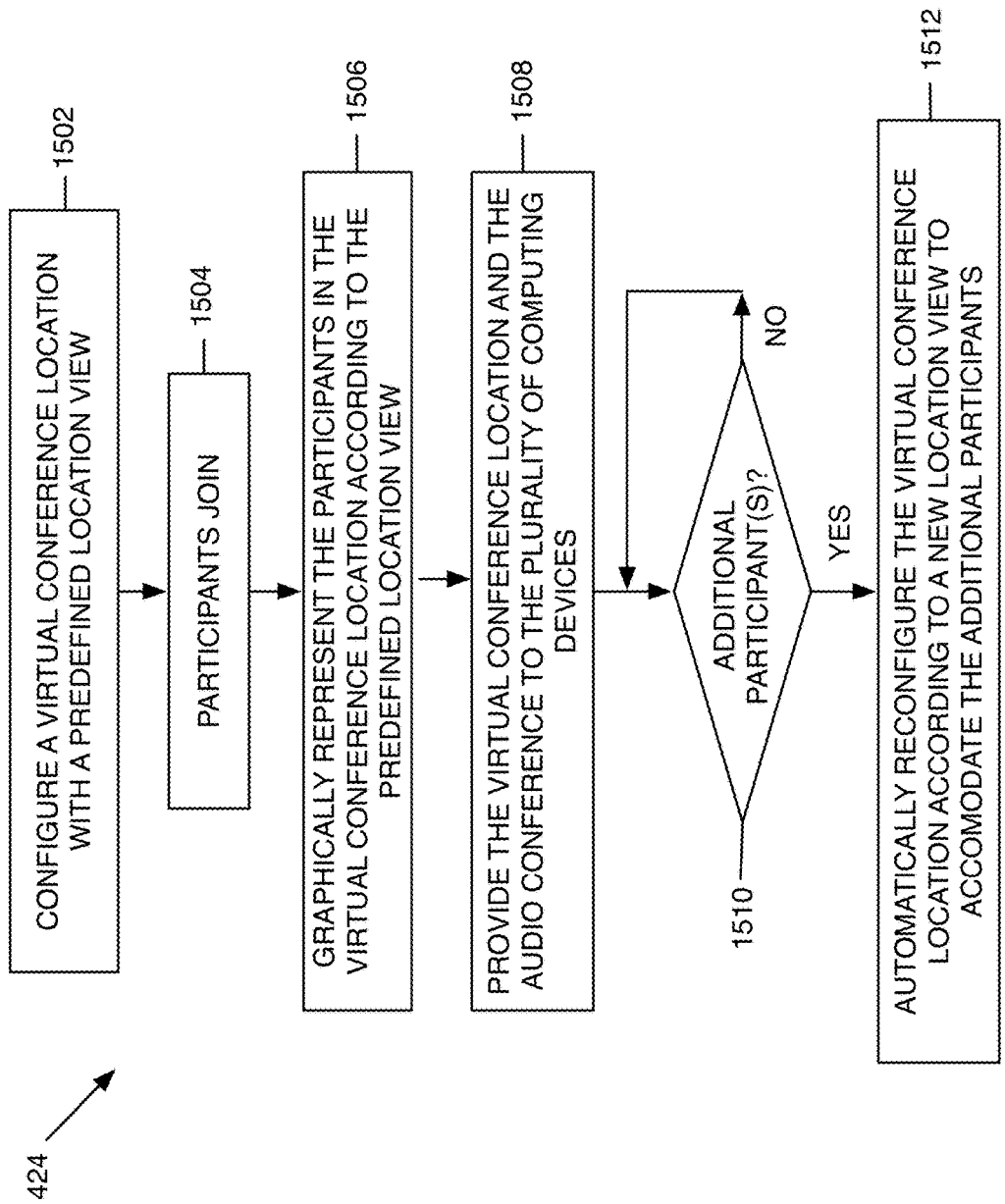
FIG. 15 is a flowchart illustrating the architecture, operation, and/or functionality of an embodiment of the automated location view configuration module(s) of FIG. 4.

FIG. 15 illustrates an embodiment of the automated location view configuration module(s) 424. In general, the automated location view configuration module(s) 424 comprise the logic of functionality for automatically configuring the location views 124 based on, for example, the number of participants 104 that have joined the conference, characteristics of the conference, etc. At block 1502, the virtual conference location 118 is configured with a predefined first location view 124. This may be a default location view 124 or one selected by the host and/or the participants 104. At blocks 1504 and 1506, one or more of the participants join the conference and are added to the first location view. At block 1508, the conference interface and the audio conference 114 are simultaneously presented to the client devices 102. At decision block 1510, the configuration module(s) 424 determine that additional participants 104 are joining the conference. The configuration module(s) 424 may be configured to determine that the existing location view 124 is not suitable for the additional participants 104. This determination may be made based on the number of participants, for example, or other information related to the existing participants and/or the new participants. At block 1512, the configuration module(s) 424 select a new location view 124 and automatically reconfigure the conference interface to accommodate the additional participants 104.

Figure 16:
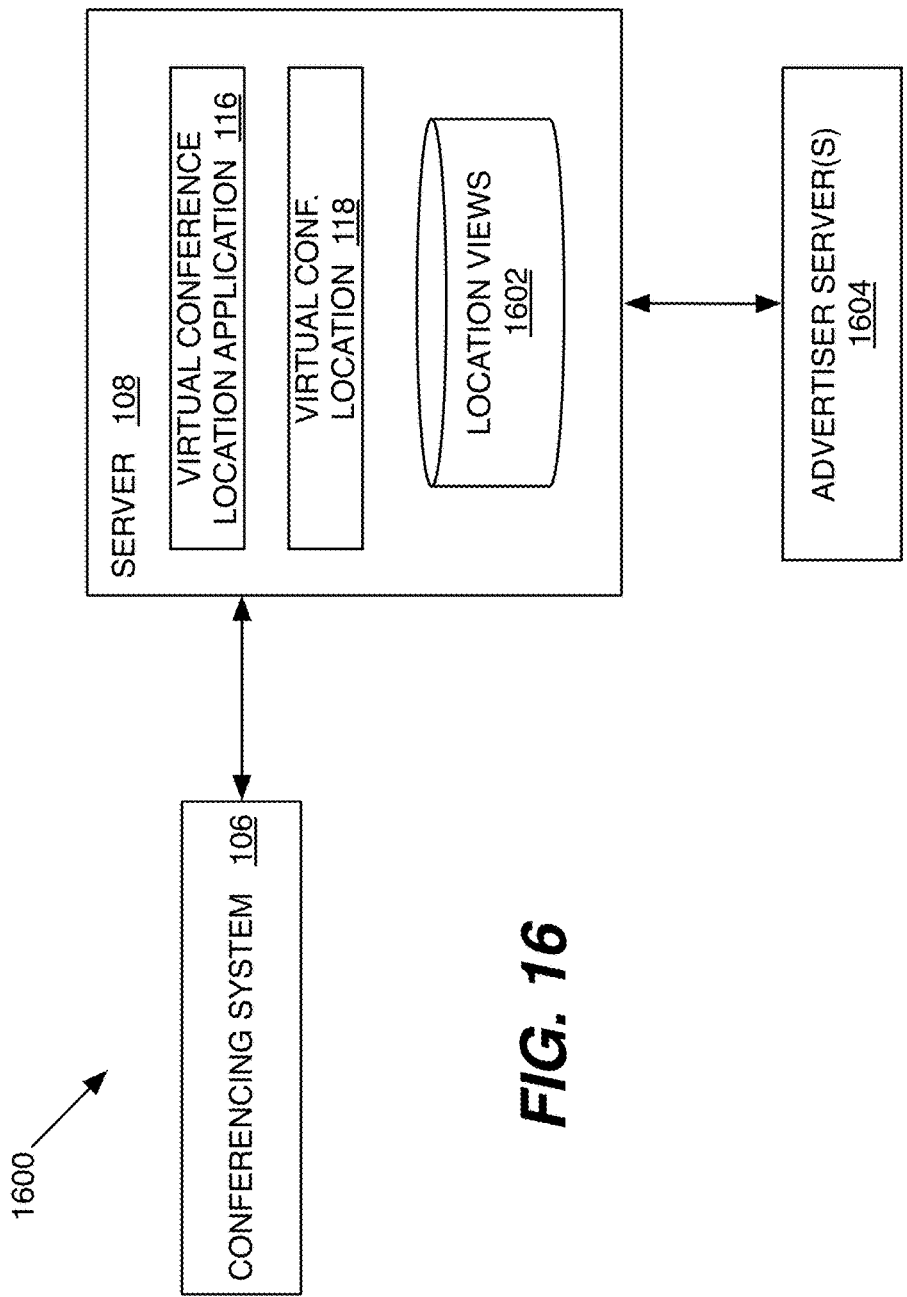
FIG. 16 is a block diagram illustrating another embodiment of the server of FIGS. 1 & 4.

It should be appreciated that the location views 124 may be stored in a database 1602 (FIG. 16), which is accessible to one or more of the module(s) stored in memory 404. The location views database 1602 may be leveraged to provide various advertising campaigns to advertiser server(s) 1604. For example, advertisers may desire to provide product placement advertisements or other advertisements in the virtual conference location 118. The server 108 may manage these advertisements via the database 1604. One of ordinary skill in the art will appreciate that the database 1604 may further support licensed assets that are also provided in the virtual conference location 118 during the audio conference 114. For example, the virtual conference location 118 may be customized to resemble a distinctive setting, such as, corporate boardroom, a host's office, or otherwise present licensed assets in the location view 1602.

The conferencing system 106 may license the assets from third parties and offer them for purchase by participants 104 for use in a virtual conference location 118. A licensed asset may comprise a licensed location for the virtual conference location 118, or graphics, audio, video, items, etc. that may be licensed from third parties and presented in a location view 1602. As an example, a licensed asset may include displaying a particular celebrity as a participant 104, displaying artwork (e.g., wall paintings, sculptures, etc.) in the location view 1602. Although not necessary to be considered licensed assets, it should be appreciated that the licensed assets may comprise any embodiment of intellectual property rights in any medium that are capable of being presented in the virtual conference location 118.

Figure 21:
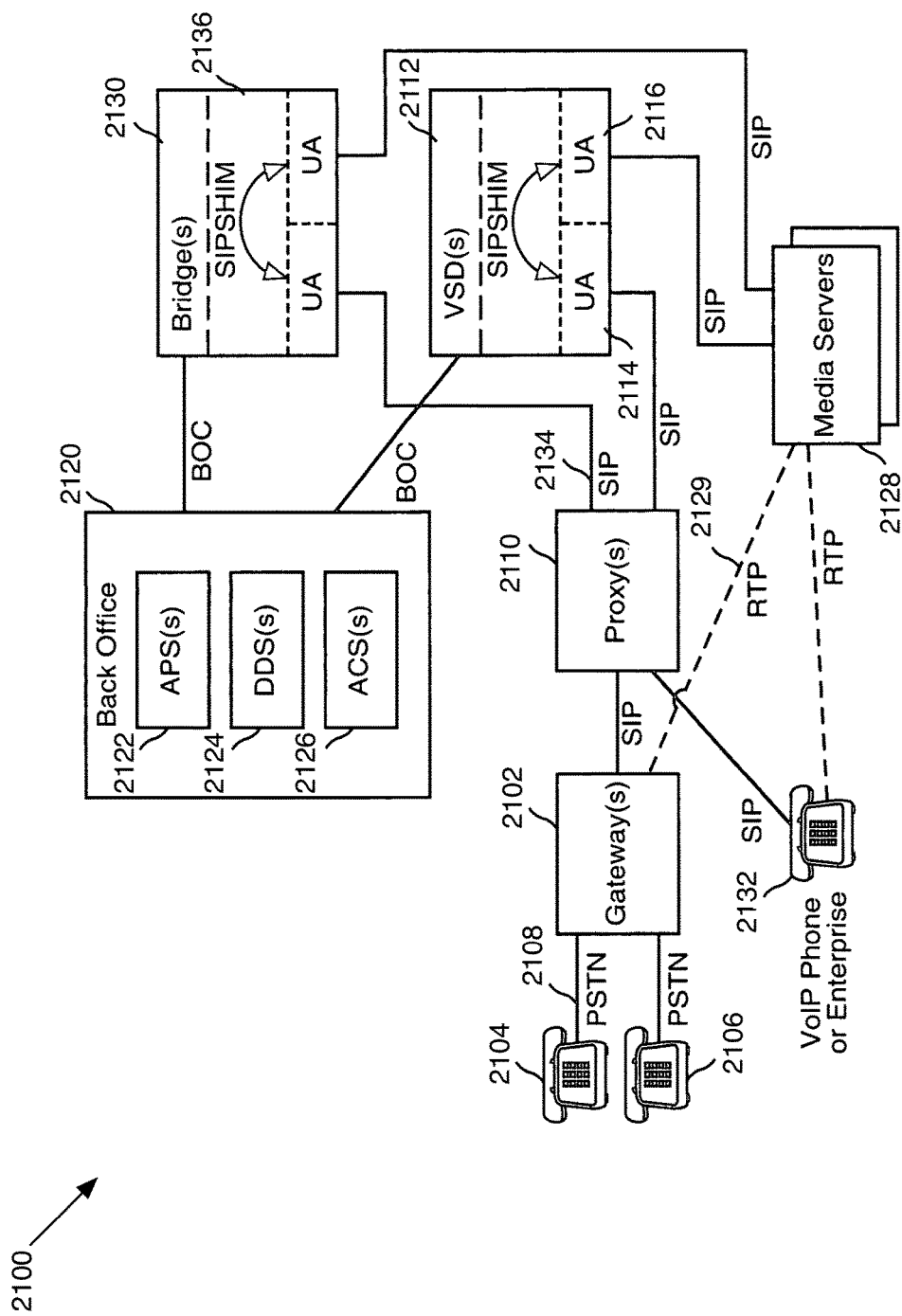
FIG. 21 is a block diagram of an embodiment of a VoIP conferencing system in which the conference interface of FIGS. 1 & 4 may be implemented.

The conferencing system 106 may be configured to support any desirable conferencing system, such as, for example, a teleconferencing system, a VoIP-based (Voice Over Internet Protocol) system, a web-based or online conferencing system, or any other suitable conferencing platform or system. FIGS. 21-25 illustrate several exemplary, non-limiting embodiments of VoIP conferencing systems or platforms for supporting the audio portion of the conference, which may be integrated with the conference interface. The VoIP conferencing systems may be configured to readily handle different protocols, load balance resources and manage fail-over situations FIG. 21 is a block diagram of an embodiment of a VoIP conferencing system 2100. One or more of the applications and/or servers in the following description may be single, clustered or load balanced to scale the system capacity and/or improve system reliability and/or system response times. The system comprises a gateway (GW) 2102, which is coupled to a telephone 2104, 2106 through the PSTN (Public Switched Telephone network) 2108. The telephones 2104, 2106 use a public switched telephone network format.

The gateway 2102 converts the PSTN format of the call into a control portion, usually SIP (Session Initiation Protocol) or control portion, and a media portion, usually RTP (Real Time Protocol). The gateway 2102 connects to a proxy 2110 through a network 110, such as, for example, the Internet, a local area network (LAN), a wide area network (WAN), etc. or any other suitable network. The proxy 2110 passes the SIP information to a Voice Services Director (VSD) 2112. The VSD 2112 has a back-to-back user agent (UA) 2114, 2116. One user agent 2114 acts as the termination point for the original call, while the other user agent 2116 communicates with and controls media server(s) 2118. The VSD 2112 also communicates with back office servers 2120 using some back-office communication protocol (BOC), either through the B2BUA (back-to-back user agent) or through another mechanism and/or protocol. The back office 2120 has a number of control services including an Advanced Protocol Server (APS) 2122, which routes back-office messages, a Dialog Database Server (DDS) 2124, which holds conference information and validates user passcodes, and an Active Conference Server (ACS) 2126, which tracks information about active conferences. Note that the ACS 2126 assigns conferences to various bridges and also load balances between the bridges. Once a media server 2118 is designated for a particular conference, RTP media 2129 is routed from the gateway 2102 to the media server 2118. The media server 2118 does the voice (audio, video, or real-time data) mixing. Note that each media server 2118 may have a number of blades, each further having a number of ports. As a result, a given media server 2118 may perform audio mixing for a number of conferences. The media servers 2118 are connected to a bridge application comprising one or more conferencing bridges (i.e., bridges 2130). A bridge 2130 performs the control functions for an active conference, including functions like muting, recording and conference creation and destruction. If a user is using a computer 2132 or a VoIP hard phone as their telephone they can connect directly to the proxy 2110 that then routes the SIP and the RTP portions of the call to the appropriate places. The telephone 2132 employs a VoIP connectivity rather than PSTN.

The bridge 2130 is SIP-protocol enabled, as illustrated by reference numeral(s) 2134. A control layer (SIPSHIM 2136) may comprise an implementation of a B2BUA, allowing the bridge application 2130 to interact with the caller and the media servers 2118 through generic higher-level commands rather than dealing directly with SIP protocol and SIP signaling events.

When a PSTN user calls into a conference, the call is routed through a gateway 2102, through the proxy 2110 and to the VSD 2112. The VSD 2112 plays a greeting and asks the user for a passcode. Different passcodes may be used to differentiate the conference leader for a given conference, as well as to select a particular conference. These passcodes are validated by the DDS 2124 at the request of the VSD 2112. Based on the DNIS, ANI, passcode, or any combination of these (customer defining code), a specific greeting may be selected by the VSD 2112, rather than playing a generic greeting. Next, the VSD 2112 asks the ACS 2126 which bridge 2130 the conference is assigned to. The VSD 2112 then transfers the caller to the appropriate conferencing bridge, 2130 where the caller's media is joined to a conference.

The back-to-back user agents 2114, 2116 allow the system to handle failures in conferencing resources. The call from the telephone 2104 is terminated at the first user agent 2114. If a media server 2118 stops functioning or gives indication of a pending failure (failure mode), the second user agent 2116 is instructed to reroute the call to another media server 2118. The back-to-back user agents 2114, 2116 also allow the system to handle different protocols. The first user agent 2114 generally receives SIP protocol information, but the second user agent 2116 can use a different protocol if that is convenient. This allows the system 2100 to interoperate between resources that use differing protocols.

It should be appreciated that the systems connected to the SIP/BOC channels may be considered part of the conference control system while those systems connected to the RTP or media data streams can be considered to be part of the data portion of the conference system.

Figure 22:
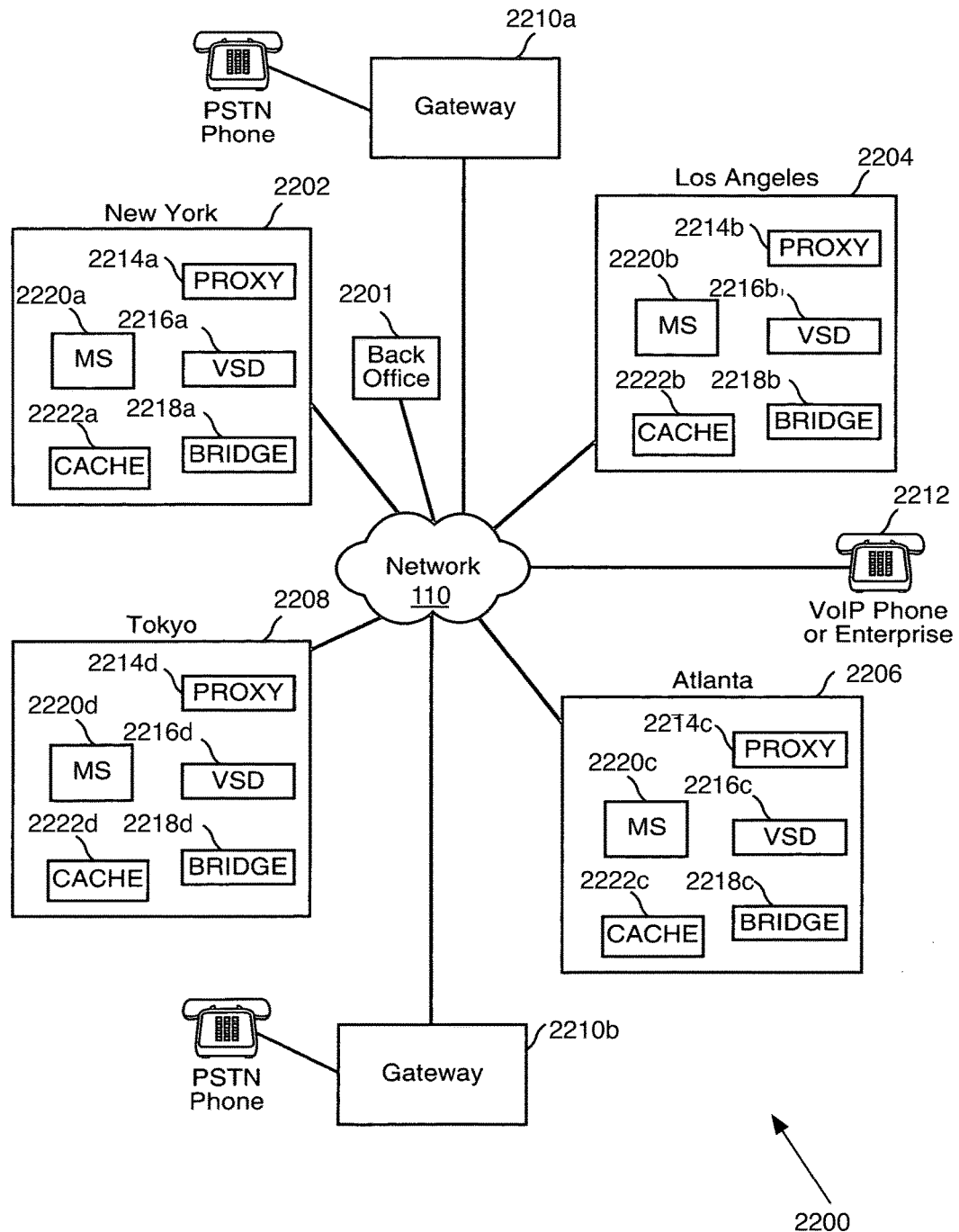
FIG. 22 is a block diagram of another embodiment of a distributed VoIP conferencing system in which the conference interface of FIGS. 1 & 4 may be implemented.

FIG. 22 is a block diagram of an embodiment of a distributed VoIP conferencing system 2200 for implementing the conferencing platform. The conferencing system 2200 is similar to that shown in FIG. 21 except that this system is distributed and has multiple instances of a system like that of FIG. 21. A number of conference centers 2202, 2204, 2206, 2208 are located in different locations in a geographical area (e.g., around a country or the world). Each conference center 2202, 2204, 2206, 2208 is coupled to a network 110. One or more gateways 2210a, b can also be coupled to the network 110, and VoIP phones or VoIP-based enterprises 2212 can tie in to the system. Each conference center would typically have one or more of a proxy 2214a-d, a VSD 2216a-d, a bridge 2218a-d and a media server 2220a-d. A software based distributed cache 2222a-d or other information-sharing mechanism (such as a Back Office 2201) is made available to all VSDs 2216 and provides shared information about the ongoing conferences and the resources that are available. The caches 2222a-d shares this information through the network 110. A call may arrive at the proxy 2214b in LA 2204 and be routed to the VSD 2216a in New York 2202. The VSD 2216a may select the media server 2220d in Tokyo 2208 and a bridge 2218c in Atlanta 2206. This allows the proxy 2214, VSD 2216 and bridge 2118c to load balance all available resources across the network 110. In addition, in a fail-over situation the VSD 2216a in New York 2202 can detect that the bridge 2218d in Tokyo is not responding. Under these circumstances, the VSD 2216 can redirect the conference to bridge 2218c in Atlanta.

Figure 23:
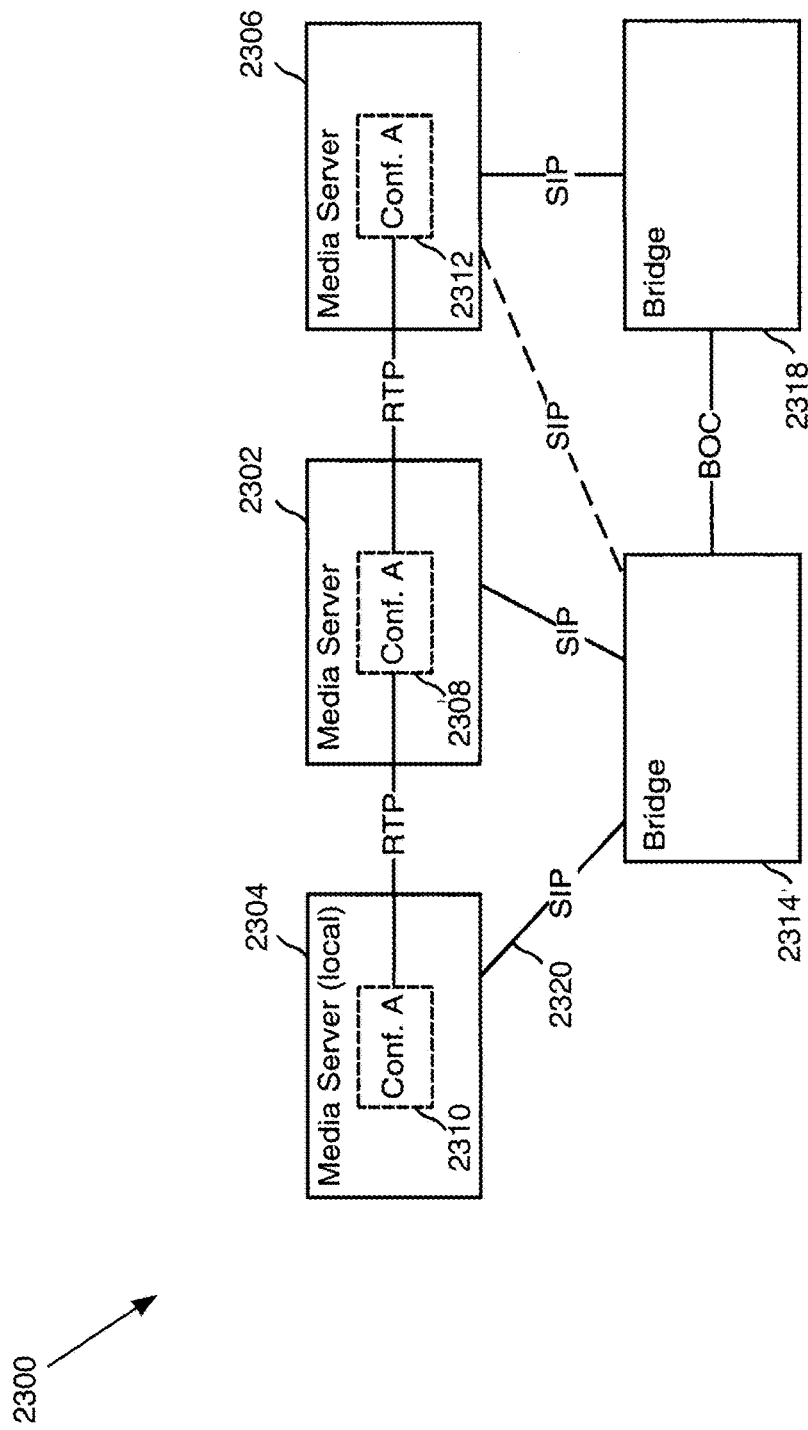
FIG. 23 is a block diagram of an embodiment of a distributed conference using the distributed VoIP conferencing system of FIG. 22.

FIG. 23 is a block diagram of another embodiment of a suitable conference platform in which the virtual conference location application 116 may be implemented. This implementation uses a distributed conference using a distributed VoIP conferencing system 2300. FIG. 23 shows how distributed resources may be shared. The system 2300 comprises a plurality of media servers 2302, 2304, and 2306, each of which may provide a large number of conferencing port resources. For example, assume that a conference 2308 starts on media server 2302. Five minutes into that conference, only ten ports are left unused on media server 2302 but twenty new people want to join that conference. These people can be allocated to other media servers. For instance, ten ports 2310 can be used in media server 2304 and ten ports 2312 can be used in media server 2306. Two additional conference ports may be required from the original conference and media server 2302 to link the RTP or media to the other two media servers, which each use one media (RTP) linking port in addition to their ten callers. A single bridge 2318 may control all three media servers 2302, 2304, and 2306 and the three conferences 2308, 2310, and 2312 through SIP 2320 or another protocol, even if one or more media servers are located in a remote location relative to the location of the bridge. Conference bridge applications may also be linked at a high level, where each bridge 2314, 2318 controls its own media server resources, and are linked through some form of back-office communications (BOC), which may include SIP. Conference media (RTP) linking may be initiated from one bridge that acts as a parent, with multiple subordinate or child conferences being instantiated on the other media servers and possibly also on other bridges.

This approach minimizes audio latency by having a common focal point for all child conferences to converge. However, this approach may use more "linking" ports on the parent conference. Hence, the initial conference may be deprecated to be a child conference, while the second conference is assigned to be the parent (or step-parent), and thus the media for all conferences is linked to the second conference as the focal point. When instantiating the second conference, sufficient ports may be reserved to allow linking further child conferences in the future.

This approach of linking conferences may also apply where large numbers of callers are located in different geographical regions, or possibly on different types of networks such as a combination of standard VoIP network or a proprietary network, but these need to be linked together. Rather than having all callers connect to a single location, each region or network could connect to a regional bridge, then the bridges and the media are linked together. This minimizes audio latency for callers in the same region, and may also reduce media transport and/or conversion costs. Each region or network could also use parent and child conferences as needed, and only the two parent (or step-parent) conferences in different regions or networks would have their media linked together.

Figure 24:
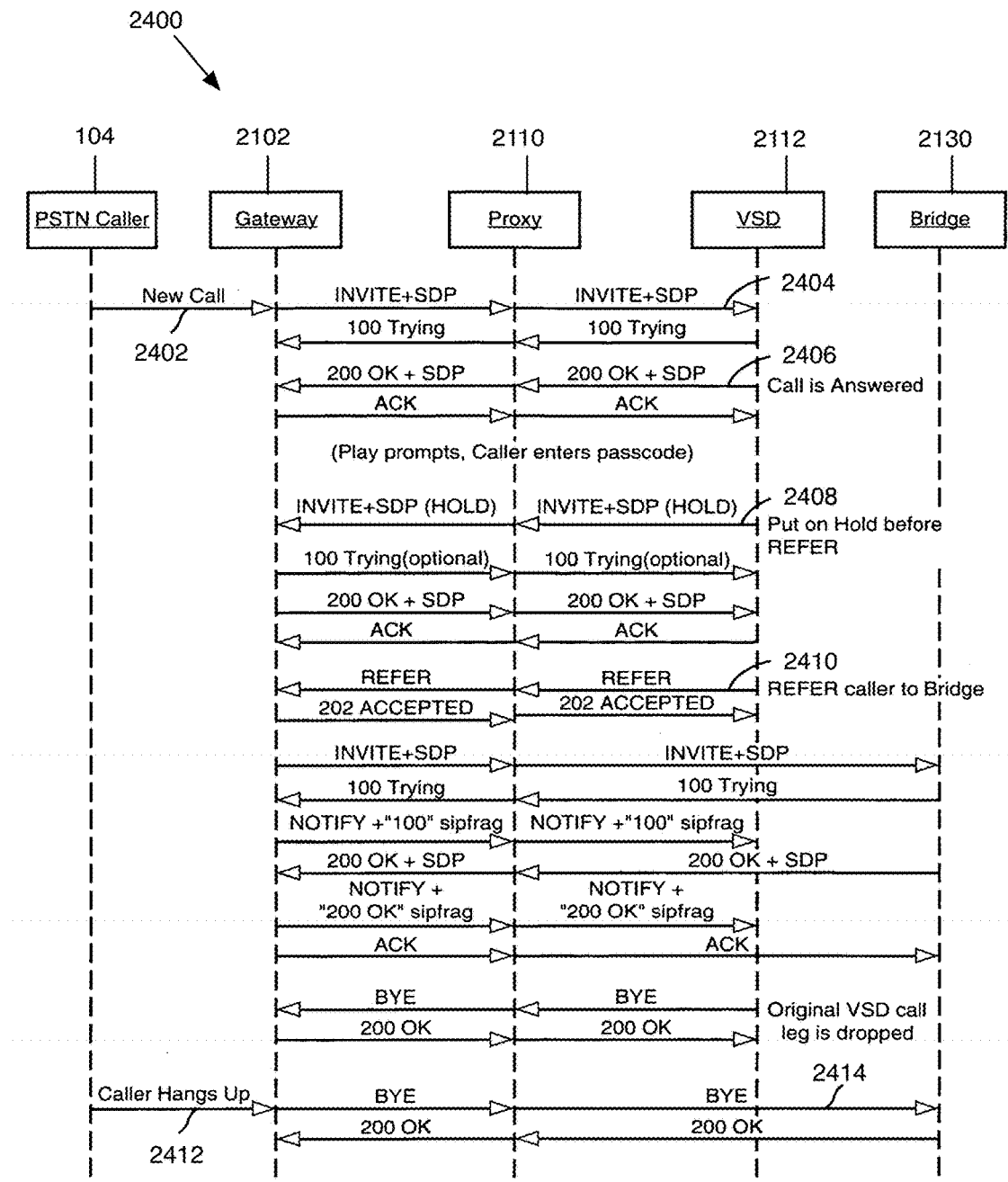
FIG. 24 is a call flow diagram for an embodiment of a PSTN participant in the VoIP conferencing systems of FIGS. 21-23.

FIG. 24 illustrates an embodiment of a method 2400 for establishing a call with a participant 104 via the PSTN. A gateway 2102 receives an incoming call 2402 from the PSTN. The gateway 2102 converts the PSTN call into a control (SIP) portion and media (RTP) portion. FIG. 24 shows the SIP portion of the call that is coupled to the gateway 2102. The SIP portion is not shown. The RTP is also not shown in FIG. 24, as this diagram details the control messaging (SIP) as opposed to the media. A proxy 2110 forwards the control portion of the incoming call 2402 to a VSD 2112. The VSD 2112 answers the call 2406, then plays one or more prompts to the caller requesting them to enter a passcode. After the caller enters the necessary information by, for example, DTMF, by speaker-independent voice recognition, or by other means, the media for the original call is put on hold 2408. Next, the VSD 2112 checks with the back-office system to see if the passcode is valid, and if so, the caller is transferred 2410 to a bridge 2130 as specified by the back-office system. When the caller hangs up 2412, the gateway 2102 informs the bridge 2130 of this event 2412 and the call is thereby terminated at both ends.

During the call, the state of the conference and of individual users can be controlled through DTMF by the caller, or from any other mechanism that allows a user to access the bridge 2130 directly or indirectly, such as a web-based interface that ties to the bridge 2130 through the back office. The bridge 2130 will subsequently control the media server(s) in use.

For both the VSD 2112 and the conferencing bridge 2130, when the caller presses a digit on his phone the digit press may be passed on as in-band tones within the RTP audio media stream, or may optionally be converted by the gateway 2102 to a telephony event signaling protocol that is carried inside the RTP. In either case, the digit press is detected by the media server and reported to the VSD 2112 or bridge application. The above describes the basic call flow of typical conference user.

Figure 25:
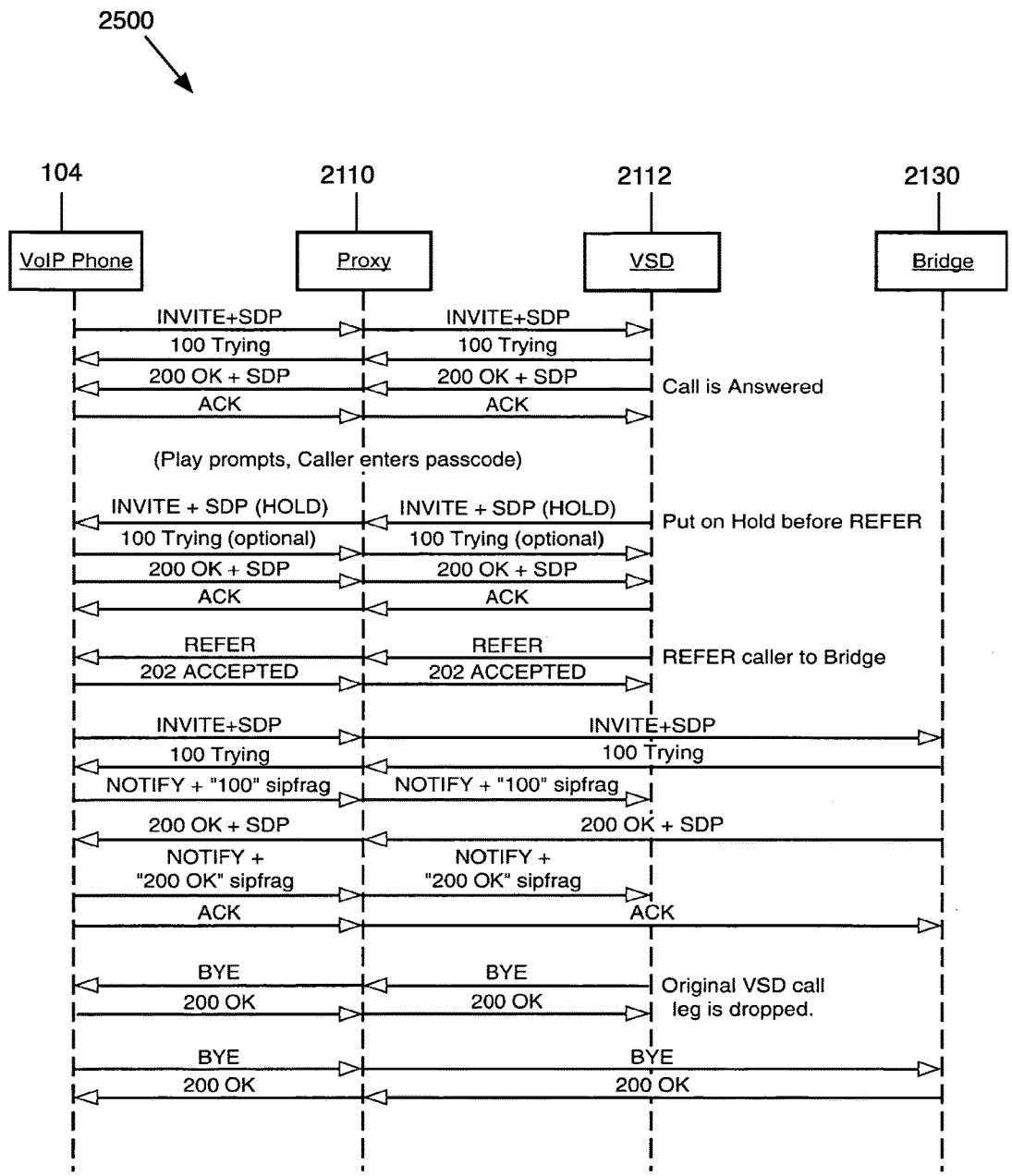
FIG. 25 is a call flow diagram for an embodiment of a VoIP participant in the VoIP conferencing systems of FIGS. 21-23.

FIG. 25 shows the identical call flow from FIG. 24, but with a native VoIP call origination rather than PSTN. The main difference is that a gateway 2102 is not used. Variations of these flows are also needed to handle error conditions that may occur, such as a bridge failing to answer when a caller is transferred to it. These have been omitted for clarity.

The SIP commands employed in the methods of FIGS. 24 & 25 are described below, for exemplary purposes.

SIP: Session Initiation Protocol, as defined primarily by IETF Standard RFC3261. SIP is an application-layer control protocol that can establish, modify, and terminate multimedia sessions such as Internet telephony calls.

INVITE: a SIP Request method used to set up (initiate) or modify a SIP-based communication session (referred to as a SIP "dialog").

SDP: Session Description Protocol. An IETF protocol that defines a text-based message format for describing a multimedia session. Data such as version number, contact information, broadcast times and audio and video encoding types are included in the message.

ACK: Acknowledgement. A SIP Request used within the SIP INVITE transaction to finalize the establishment or renegotiation of a SIP session or "dialog". 100, 200, 202: SIP Response codes that are sent back to the originator of a SIP request. A response code indicates a specific result for a given request.

NOTIFY: a SIP Request method that is used to convey information to one SIP session about the state of another SIP session or "dialog".

REFER: a SIP Request method that is used to transfer one end of a SIP session to a different SIP destination.

Sipfrag: SIP fragment. A fragment of a SIP message (such as a Response code) from another SIP session, that is sent as part of the body of a SIP NOTIFY message.

BYE: a SIP Request method that is used to terminate an existing SIP session or "dialog".

A conferencing system, such as those described above or other conferencing systems, may interface with a social networking system to provide various enhanced communication features. FIG. 31 illustrates a computer system 3100 comprising a conferencing system 106 and a social networking system 3102 that may communicate with client devices 102 via a communication network 110. In the embodiment of FIG. 31, the conferencing system 106 is configured in the manner described above, and comprises one or more servers 108, social networking integration module(s) 414, a conference interface, and one or more datastore(s) 3110. As described below in more detail, the social networking integration module(s) 414 enable the conferencing system 106 to communicate with the social networking system 3102 via, for example, an application programming interface (API) 3108. The conferencing system 106 and/or the social networking system 3102 may access data, applications, or any other stored content or functionality associated with the respective systems.

It should be appreciated that the social networking integration module(s) 414 may be configured to interface with any desirable social networking system 3102. However, to illustrate the general principles of the integrated systems, various exemplary embodiments of a social networking system 3102 will be described.

The social networking system 3102 generally comprises one or more server(s) 3104 for providing a social networking website 3106 to client devices 102 via, for example, a client or web browser 3110. The social networking system 3102 may expose an application program interface (API) 3108 to other computer systems, such as, the conferencing system 106. The API 3108 enables third party applications to access data, applications, or any other stored content or functionality provided by the social networking system 3102 to members 3201.

The social networking system 3102 offers its members 3201 the ability to communicate and interact with other members 3201 of the social network. Members 3201 may join the social networking system 3102 and then add connections to a number of other members 3201 to whom they desire to be connected. Connections may be explicitly added by a member 3201. For example, the member 3201 may select a particular other member 3201 to be a friend, or the social networking system 3201 may automatically recommend or create connections based on common characteristics of the members (e.g., members who are alumni of the same educational institution, organization, etc.). As used herein, the term "friend" refers to any other member to whom a member has formed a connection, association, or relationship via the social networking system 3102. Connections in social networks are usually in both directions, but need not be, so the terms "member," "friend," or "follower" may depend on the frame of reference. For example, if Bob and Joe are both members and connected to each other in the website, Bob and Joe, both members, are also each other's friends. The connection between members 3201 may be a direct connection. However, some embodiments of a social networking system 3201 may allow the connection to be indirect via one or more levels of connections. It should be appreciated that the term friend does not require that the members 3201 are friends in real life. It simply implies a connection in the social networking system 3102.

The social networking system 3102 may be implemented in various types of computer systems. The implementation of the social networking system 3102 may provide mechanisms for members 3201 to communicate with each other, form connections with each other, store information, and share objects of interest, among other things. The implementations described below include a social networking website 3106 that interacts with members 3201 at client devices 102 via a communication network 110, such as a web-based interface (e.g., via the browser 3110). However, other implementations are possible, such as one or more servers 3104 that communicate with clients using various client and server applications (e.g., non-web-based applications). Furthermore, the social networking system 3102 may not include any centralized server, but rather may be implemented as, for example, a peer-to-peer system with peer-to-peer applications running on the client devices 102 that allow members 3201 to communicate and perform other functions. One example is a peer-to-peer network of smart phones communicating via Short Message Service (SMS) over a cellular network. It should be appreciated that the embodiments of a social networking website 3106 described below may be adapted to various other implementations of social networking systems.

FIG. 32 illustrates a social networking system 3102 implemented as a social networking website 3106, in one embodiment. The social networking website 3106 provides various mechanisms to its members 3201 to communicate with each other or to obtain information that they find interesting, such as activities that their friends are involved with, applications that their friends are installing, and comments made by friends on activities of other friends, just to name a few examples. The mechanisms of communication between members are referred to as social networking communication channels 3202. In one embodiment, a communication channel 3202 is a computer-mediated communication mechanism for facilitating communication between or among members 3201 of the social networking website 3106 and/or the social networking website 3201 itself.

FIG. 32 illustrates an embodiment of various exemplary communication channels 3202, although it should be appreciated that various modifications, alternatives, etc. may be implemented in the social networking website 3106. An invitation channel 3204 communicates one or more invitations between users. An invitation is a message sent by a member 3201 inviting another member 3201 to do something, such as, a member 3201 inviting a friend to install an application. A notification channel 3210 communicates a message informing a member 3201 that some activity involving the member 3201 has occurred on the social networking website 3106. An email channel 3206 allows members 3201 to communicate by email. A wall post channel 3212 allows members 3201 to share information between friends. A wall is an application allowing members 3201 to provide information to be shared between friends. A message written to a member's wall is called a wall post. A member can post on his own wall, as well as a wall of any friends. A friend of a member 3201 may see what is written on his wall. A newsfeed channel 3208 informs a member 3201 of activities of the member's friends. The newsfeed is constantly updated as the member's friends perform various activities, such as adding applications, commenting on photos, or making new friends. In an embodiment, the newsfeed may be integrated with an online publication system, such as, for example, a blog or other authoring tools. A mini-feed channel 3214 provides a mini-feed listing actions taken by the member 3201. For example, the member 3201 may have added new friends to his social network or installed certain applications. One or more of a member's activities may be listed in the mini-feed of that member.

In addition to interactions with other members 3201, the social networking website 3106 provides members 3201 with the ability to take actions on various types of items supported by the social networking system 3102. These items may include groups or social networks (a social network refers not to physical communication networks but rather to social networks of people) to which members 3201 may belong, events or calendar entries in which a member 3201 might be interested, computer-based applications that a member 3201 may use via the social networking website 3106, and transactions that allow members 3201 to buy, sell, auction, rent, or exchange items via the social networking website 3106. These are just a few examples of the items upon which a member 3201 may act on the social networking website 3106, and many others are possible.

As illustrated in the embodiment of FIG. 32, the social networking website 3106 maintains a number of objects for the different kinds of items with which a member 3201 may interact on the social networking website 3106. In one embodiment, these objects include member profiles 3220, group objects 3222, event objects 3216, application objects 3218 (respectively, hereinafter, referred to as profiles 3220, groups 3222, events 3216, and applications 3218). In one embodiment, an object is stored by the social networking website 3106 for each instance of its associated item. For example, a member profile 3220 is stored for each member 3201 who joins the social networking website 3106, a group 3220 is stored for each group defined in the social networking website 3106, and so on. The types of objects and the data stored for each is described in more detail below.

The member 3201 of the social networking website 3106 may take specific actions on the social networking website 3106, where each action is associated with one or more objects. The types of actions that a member 3201 may perform in connection with an object are defined for each object and may depend on the type of item represented by the object. A particular action may be associated with multiple objects. Described below are a number of examples of particular types of objects that may be defined for the social networking website 3106, as well as a number of actions that may be taken for each object. The objects and actions are provided for illustration purposes only, and one or ordinary skill in the art will readily appreciate that an unlimited number of variations and features may be provided on the social networking website 3106.

Figure 33:
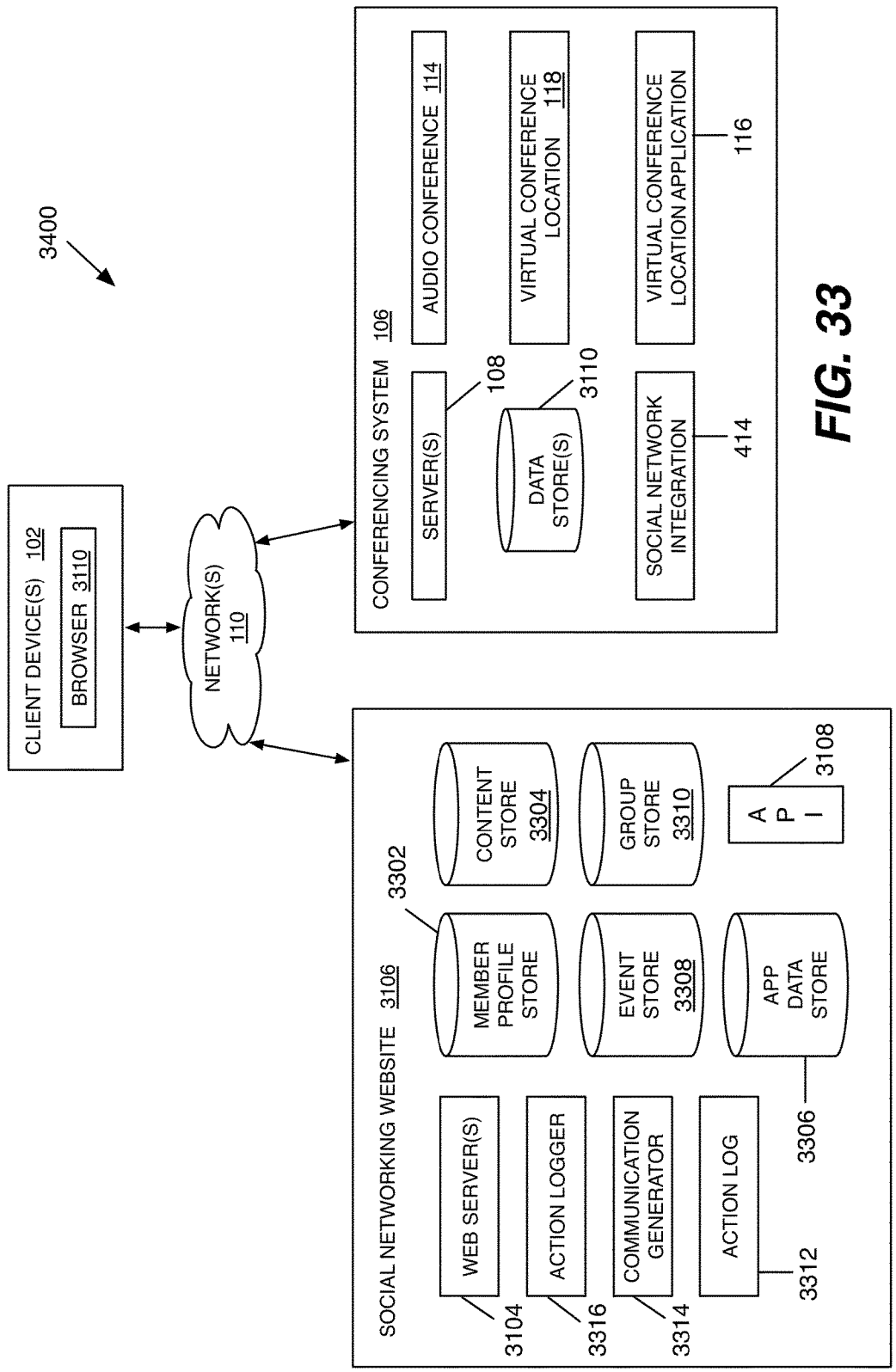
FIG. 33 is block diagram illustrating an exemplary social networking website in the social networking system of FIG. 31.

The social networking website 3106 maintains a member profile 3220 for each member of the website 3106. Any action that a particular member 3201 takes with respect to another member 3201 is associated with each member's profile 3220, through information maintained in a database or other data repository, such as the action log 3310 (FIG. 33). The tracked actions may include, for example, adding a connection to the other member 3201, sending a message to the other member, reading a message from the other member 3201, viewing content associated with the other member 3201, attending an event posted by another member 3201, among others. In addition, a number of actions described below in connection with other objects may be directed at particular members 3201, in which case these actions may be associated with those members 3201, as well.

A group 3222 may be defined for a group or network of members 3201. For example, a member 3201 may define a group to be a fan club for a particular band. The social networking website 3106 would maintain a group 3222 for that fan club, which might include information about the band, media content (e.g., songs or music videos) by the band, and discussion boards on which members 3201 of the group may comment about the band. In this regard, member actions that are possible with respect to a group 3222 may include joining the group, viewing the content, listening to songs, watching videos, and posting a message on the discussion board.

An event 3216 may be defined for a particular event, such as a birthday party. A member 3201 may create the event 3216 by defining information about the event, such as the time and place and a list of invitees. Other members 3201 may accept the invitation, comment about the event, post their own content (e.g., pictures from the event), and perform any other actions enabled by the social networking website 3106 for the event 3216. The creator of the event 3216, as well as the invitees for the event, may perform various actions that are associated with that event 3216.

The social networking website 3106 also enables members 3201 to add applications 3218 to their profiles. These applications provide enhanced content and interactivity within the social networking website 3106, which maintains an application object 3218 for each application hosted in the social networking system. The applications may be provided by the social networking system 3102, the conferencing system 106, and/or by third party developers. The social networking system 3102 and the conferencing system 106 may share applications between the respective computer systems. The use of any functionality offered by the application may constitute an action by the member 3201 in connection with the application 3218. The actions may be passive and need not require active participation by a member 3201. The scope and type of applications provided is limited only by the imagination and creativity of the application developers. The applications are generally written as server-side code that is run on servers of the social networking website 3106, although in other embodiments an application may also use client-side code as appropriate, or any combination thereof. When a member 3201 logs into the social networking website site 3106, the system determines which applications the user has installed (e.g., registered for, purchased, etc.), and then loads and runs such applications in combination with the underlying functionality of the social networking website 3106.

When a member 3201 takes an action on the social networking website 3106, the action is recorded in an action log 3312. In one embodiment, the social networking website 3106 maintains the action log 3312 as a database of entries. When an action is taken, the social networking website 3106 may add an entry for that action to the log 3312. The action loc 3312 may maintain any of the following or other types of information: a timestamp of when the action occurred; an identifier for the member 3201 who performed the action; an identifier for the member 3201 to whom the action was directed; an identifier for the type of action performed; an identifier for an object acted on by the action (e.g., an application); and content associated with the action. It should be appreciated that many types of actions that are possible in the social networking website 3106 need not require all of this information.

The social networking website 3106 generally comprises a computing system that allows members 3201 to communicate or otherwise interact with each other and access content and/or functionality as described herein. The social networking website 3106 stores member profiles 3220 in, for example, a member profile store 3302. A member profile 3220 may describe the member, including biographic, demographic, and other types of descriptive information, such as work experience, educational history, hobbies or preferences, location, and the like. The social networking website 3106 further stores data describing one or more relationships between different members 3201. The relationship information may indicate members 3201 who have similar or common work experience, group memberships, hobbies, or educational history. The social networking website 3106 may include member-defined relationships between different members 3201, allowing members 3201 to specify their relationships with other members 3201. For example, member-defined relationships may allow members 3201 to generate relationships with other members 3201 that parallel real-life relationships, such as friends, co-workers, partners, and so forth. Members 3201 may select from predefined types of relationships, or define their own relationship types as needed.

To further illustrate the manner in which the conferencing system 106 may share data and/or applications with a social networking system, FIG. 33 shows a block diagram of the social networking website 3106. In this embodiment, the social networking website 3106 includes a web server 3104, an action logger 3316, an action log 3312, a member profile store 3302, an application data store 3306, a group store 3310, and an event store. In other embodiments, the social networking website 3106 may include additional, fewer, or different modules for various applications. Conventional components such as network interfaces, security mechanisms, load balancers, failover servers, management and network operations consoles, and the like are not shown so as to not obscure the details of the system.

The web server(s) 3104 link the social networking website 3106 via the network 110 to the client devices 102. The web server 3104 serves web pages, as well as other web-related content, such as, for example, Java, Flash, XML, and so forth. The web server 3104 may include a mail server or other messaging functionality for receiving and routing messages between the social networking website 3106, the client devices 102, and the conferencing system 106. The messages can be instant messages, queued messages (e.g., email), text and SMS messages, or any other suitable messaging technique, using any suitable protocol(s).

The action logger 3316 is capable of receiving communications from the web server 3104 about member actions on and/or off the social networking website 3106. The action logger 3316 populates the action log 3312 with information about member actions to track them.

As discussed above, the social networking website 3106 maintains data about a number of different types of objects with which a member may interact on the social networking website 3106. In this regard, each of the member profile store 3302, application data store 3306, the group store 3310, and the event store 3308 stores instances of the corresponding type of object(s) maintained by the social networking website 3106. Each object type has information fields that are suitable for storing information appropriate to the type of object. For example, the event store 3308 may contain data structures that include the time and location for an event, whereas the member profile store 3302 may contain data structures with fields suitable for describing a member's profile 3220. When a new object of a particular type is created, the social networking website 3106 may initialize a new data structure of the corresponding type, assign a unique object identifier to it, and begin to add data to the object as needed.

Figure 34:
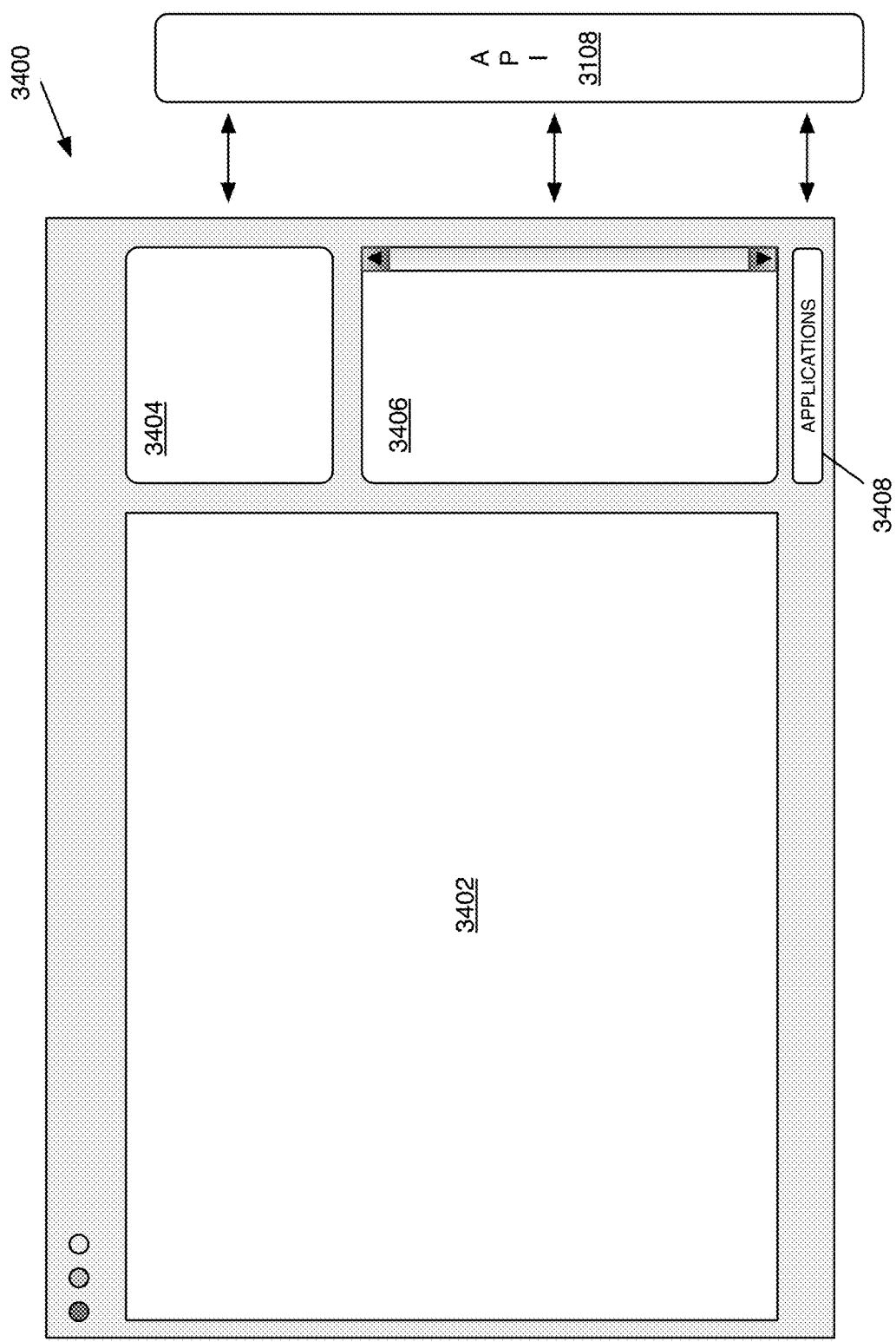
FIG. 34 is a user interface screen shot of an embodiment of a conference interface for enabling a participant to share social networking content during an audio conference.

Having described exemplary embodiments of a social networking system 3102 with which the conferencing system 106 may share data and/or functionality, the operation of additional embodiments of the social networking integration module(s) 414 will be described with reference to FIGS. 34-36. FIG. 34 illustrates another embodiment of a graphical user interface 3400 for presenting the audio conference 114 and the conference interface to participants 104. The graphical user interface 3400 may comprise a first portion 3402, a second portion 3404, and a third portion 3406. The conference interface may be presented in the first portion. The second portion 3404 and the third portion 3406 may comprise user interface mechanisms for accessing communication features related to the social networking system 3102 via, for example, the API 3108. It should be appreciated that the second portion 3404 and the third portion 3406 may be provided in separate screens from the first portion 3402. The graphical user interface 3400 may employ any desirable layout and other user interface mechanisms for accessing the associated content and/or functionality.

In an embodiment, the first portion 3404 may comprise an input mechanism for capturing content, during the audio conference 114, which may be posted to one or more of the social networking communication channels 3202 (FIG. 32). The input mechanism may enable the participants 104 to input text, upload photos and/or video, send invitations, join groups, etc. The content may comprise any form of content, and may be specified by the participant 104 or otherwise captured by hardware and/or software on the client device 102.

Figure 35:
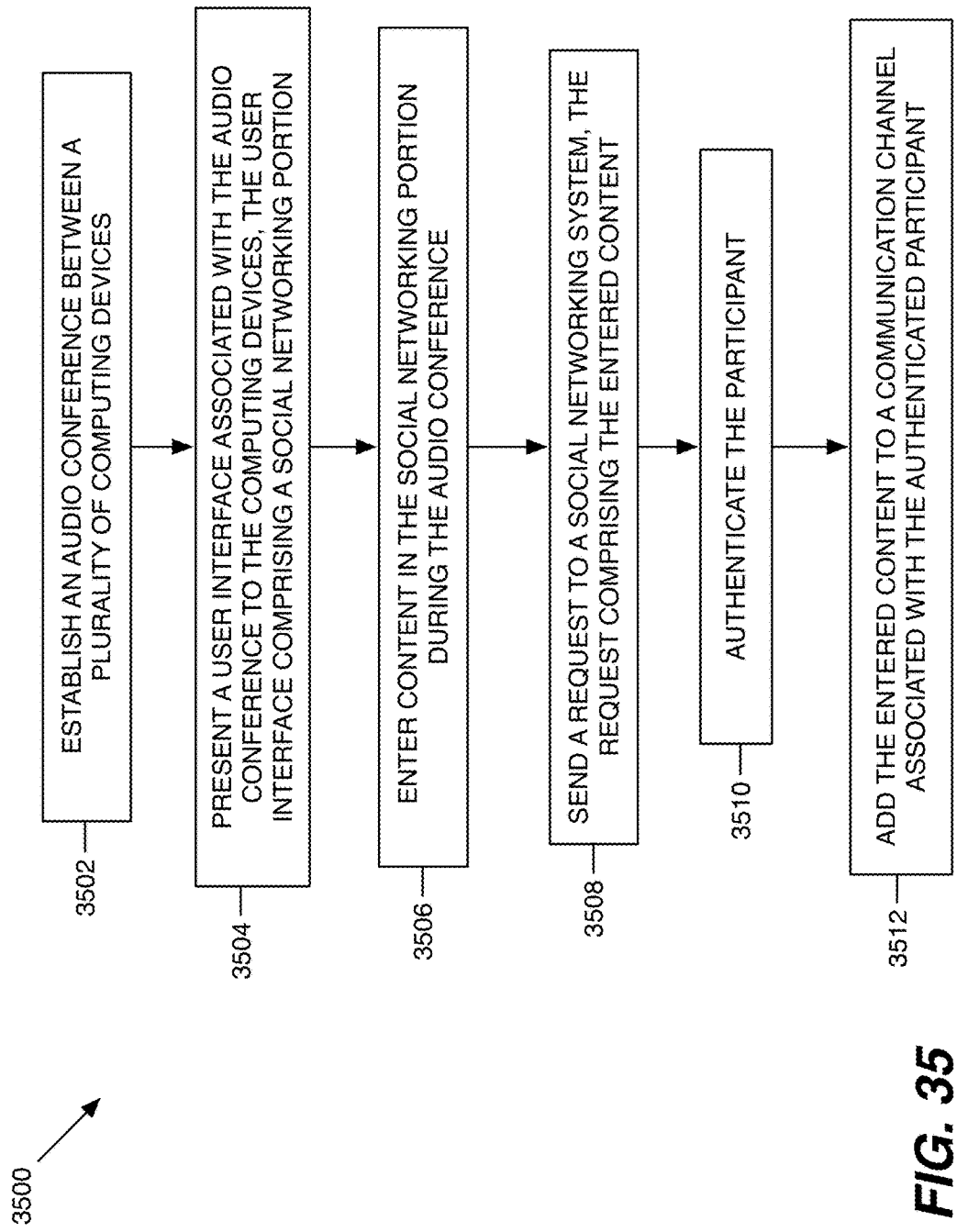
FIG. 35 is a flowchart illustrating an embodiment of a method for providing social networking content in a conference interface.

As illustrated in FIG. 35, in operation, the conferencing system 106 establishes the audio conference 114 with the participants 104 (block 3502). At block 3504, the conferencing system 106 presents the graphical user interface 3400 to a client device 102 operated by a participant 104. At any time during the audio conference 114, at block 3506, the participant 104 enters or specifies content to be provided to the social networking system 3102. At block 3508, a request is sent to the social networking system 3102. The request may originate from the client device 102 (e.g., the browser 3110) or the conferencing system 106. The social networking system 3102 may send a response to the originator enabling the content to be added to the participant's profile 3220 (block 3512). It should be appreciated that the content may be provided with the request or subsequently via additional message(s). Furthermore, the request may include the participant's credentials (e.g., username, password, etc.) to automatically authenticate the participant 104. In other embodiments, the participant 104 may be prompted by either the conferencing system 106 or the social networking system 3102 to enter the authentication credentials (block 3510).

Figure 36:
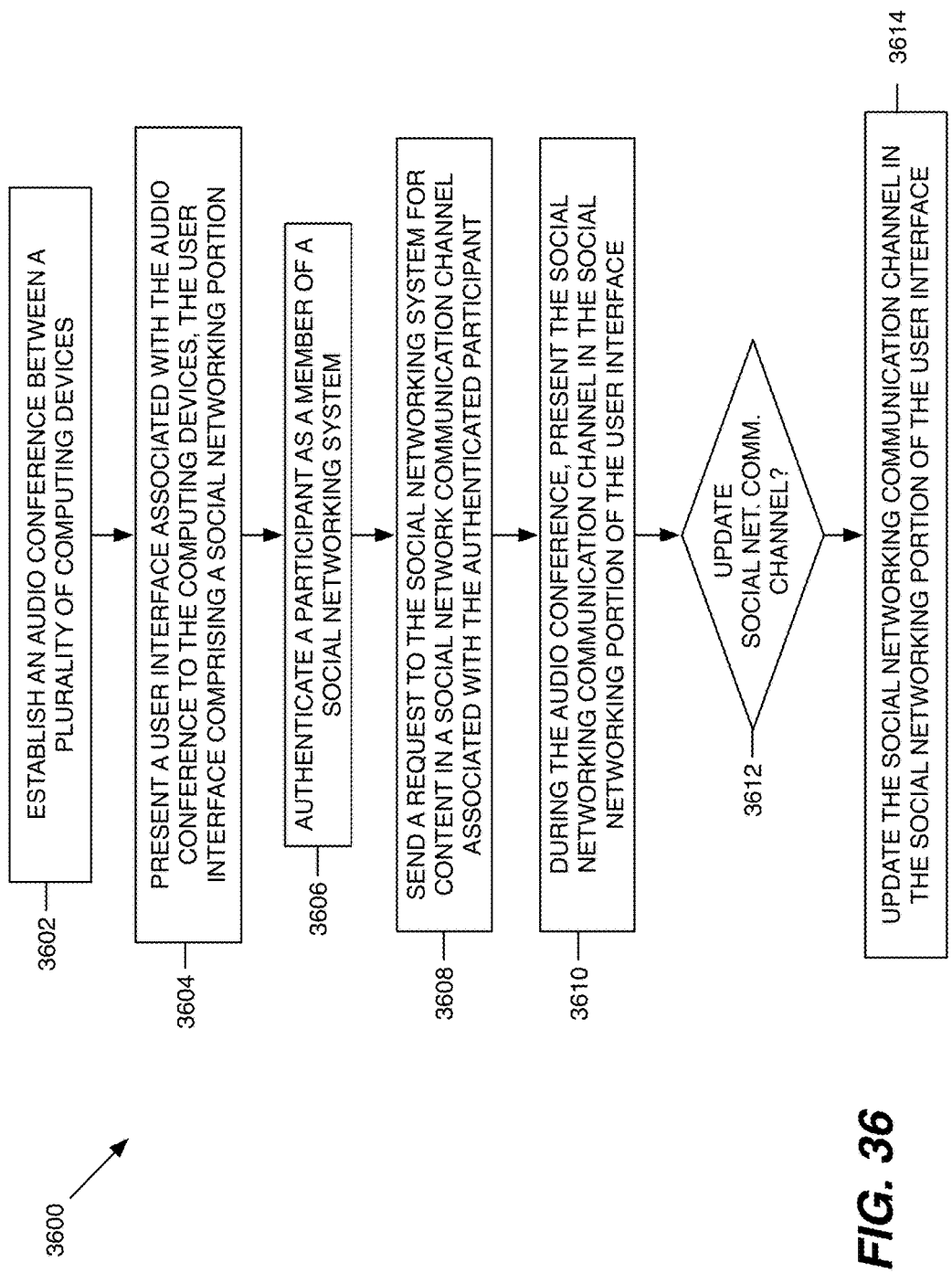
FIG. 36 is a flowchart illustrating an embodiment of a method for incorporating social networking data in a conference interface.

FIG. 36 illustrates another embodiment of a method for sharing content between the conferencing system 106 and the social networking system 3102. After establishing the audio conference 114 and presenting the graphical user interface 3400 (blocks 3602 and 3604), the conferencing system 106 or the social networking system 3102 may prompt the participant to enter authentication credentials. The participant 104 may be authenticated, at block 3606, for access to the social networking features. The authentication may be performed when the participant 104 logs into the conferencing system 106, or the participant 104 may be prompted for the authentication credentials when the social networking features are being accessed. Furthermore, in an embodiment, the conferencing system 106 may enable participants 104 to access the conferencing system 106 by using their social networking profile 3220. In this manner, if authentication is required, there may not be a need to separately authenticate with the social networking system 3102.

If the participant 104 is properly authenticated for access to the social networking system 3102, at block 3608, data from the social networking system 3102 (e.g., communication channels 3202) may be integrated with the graphical user interface 3400. The data may be presented in the second portion 3406, and may comprise any data described above, or any other data, content, and/or functionality associated with the social networking system 3102. As mentioned above, the data may be accessed using the API 3108, in which case suitable requests and responses may be sent (block 3608) from, and received by, either the client device 102 or the conferencing system 106. The participant 104 may also access social networking applications 3218 via a user interface control 3408. The participant 104 may select or otherwise engage the control 3408, which may trigger a menu for enabling the participant 104 to access applications 3218 associated with the participant's social networking profile 3220.

Referring to FIGS. 50-61, the conferencing system 106 may support an alert/notification functionality for enabling the participants 104 to receive information about an audio conference 114 and an associated conference without necessarily joining the audio conference 114 or viewing the conference interface. The alert/notification functionality generally comprises logic for monitoring an audio conference 114 and the content/functionality presented in the conference interface and providing alerts, notifications, or other messages (collectively referred to as "alerts") to the participant 104. An alert may comprise audio, video, text, graphics, or other information embodied in any medium and presentable via hardware and/or software components supported by the computing device, including, a browser 3110, an operating system 5004, a GUI 132, a microphone, and a display, such as, for example, a touchscreen 5004.

Figure 50:
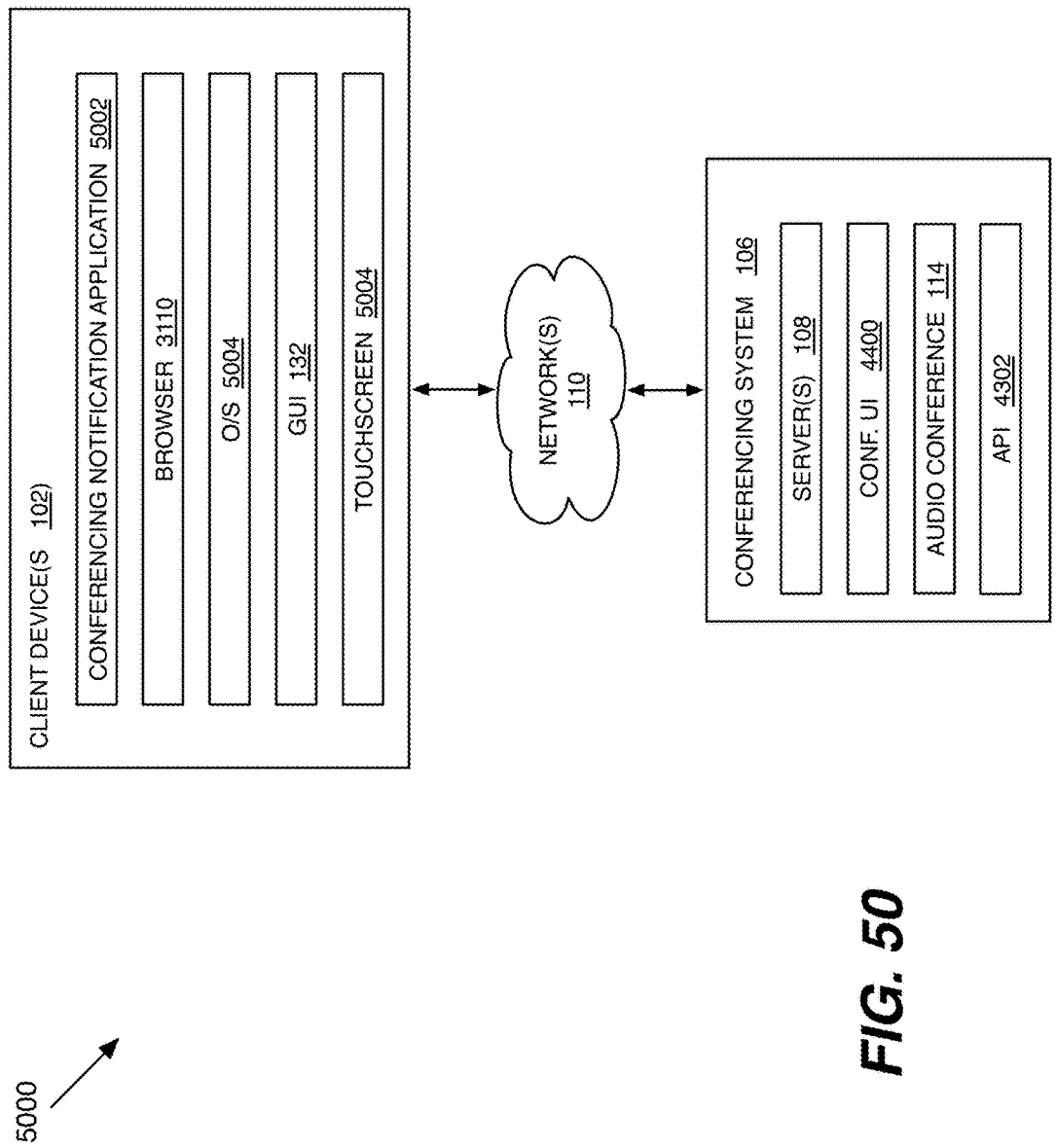
FIG. 50 is a block diagram illustrating an embodiment of a computer system for implementing a conferencing notification application on a client device.

In the embodiment illustrated in FIG. 50, the alert/notification functionality comprises a conferencing notification application 5002 residing in memory 404 on a client device 102 (FIG. 4) and executed by processor(s) 402. It should be appreciated that the logic associated with the conferencing notification application 5002 may be located at, and/or controlled by, the conferencing system 106 or other computer devices, systems, etc.

In general operation, the conferencing notification application 5002 may provide alerts based on various events monitored by the conferencing system 106. For instance, the conferencing notification application 5002 may notify a host when an audio conference 114 or conference has started and alert the host to who has joined the audio conference 114 or accessed the conference by showing, for example, the participant name, the number of current participants, etc. The alerts may be implemented using a push methodology by which the alerts are "pushed" from the conferencing system 106, a pull methodology by which the alerts are "pulled" from the conferencing system 106 by the computing device 102 using, for example, the conferencing API 4302, or other alert protocols, services, methodologies, etc. As participants 104 join the audio conference 114 or the associated conference, the conferencing system 106 maintains a counter of the number and identity of participants 104 and provides related or other information to the host. The conferencing notification application 5002 may also enable the host to conveniently access the conference interface from within the application (e.g., via a menu, key shortcut, or other user interface control), as well as modify conferencing, notification or account settings prior to or during a virtual conference.

The conferencing notification application 5002 may incorporate a user interface control for enabling users to launch the application or conveniently access certain functions or features of the application (e.g., configure remote or local settings, join a virtual conference, etc.). The user interface control may be presented in various ways depending on, for example, the configuration of the operating system 5004, the GUI 132, the display type and/or size, and other hardware and/or software characteristics.

Figure 51:
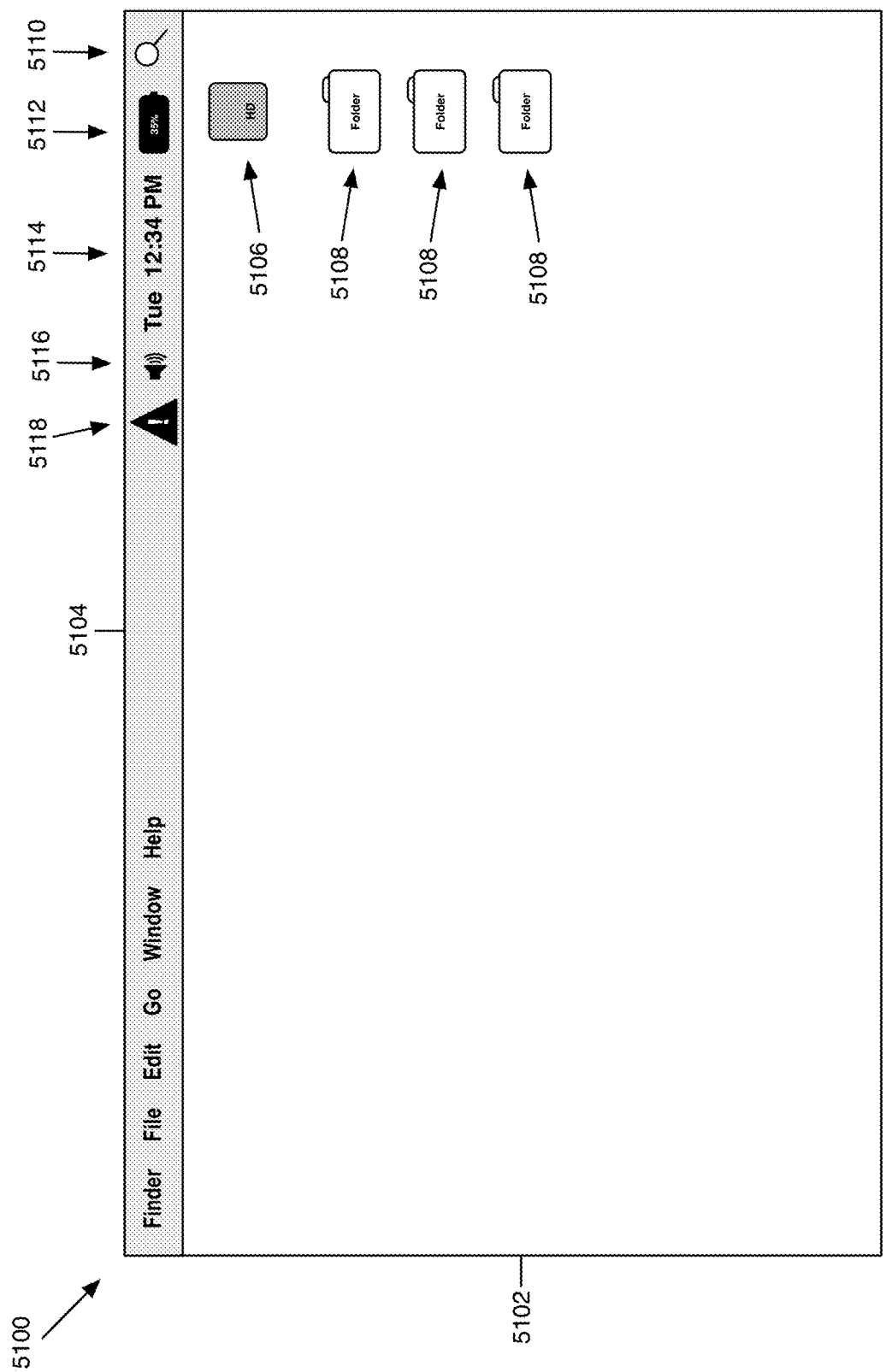
FIG. 51 is a screen shot illustrating an embodiment of a desktop user interface for accessing exemplary services provided by the conferencing notification application of FIG. 50.

FIG. 51 illustrates an embodiment of a user interface control 5118 implemented in a desktop environment 5100 for accessing the conferencing notification application 5002. The desktop environment 5100 comprises a desktop 5102 that may display one or more icons, folders, wallpaper, widgets, or other desktop objects associated with the system. The desktop objects enable the user to easily access, configure, or modify aspects of the operating system 5004 and/or other software or features of the computing device 102. In the embodiment of FIG. 51, the desktop 5102 may display a system application tray 5104, one or more folder icons 5108 for organizing files, and a hard drive icon 5106 for accessing a hierarchical folder structure for accessing files stored on the computing device 102.

The user interface control 5118 may be displayed anywhere within the desktop 5102. In FIG. 51, the user interface control 5118 is displayed on a system application tray 5104. The system application tray 5104 may display various icons (e.g., a search icon 5110, a battery level icon 5112, a system time icon 5114, a volume icon 5116, or any other system icon, application icon, or user-defined icon).

Figure 52:
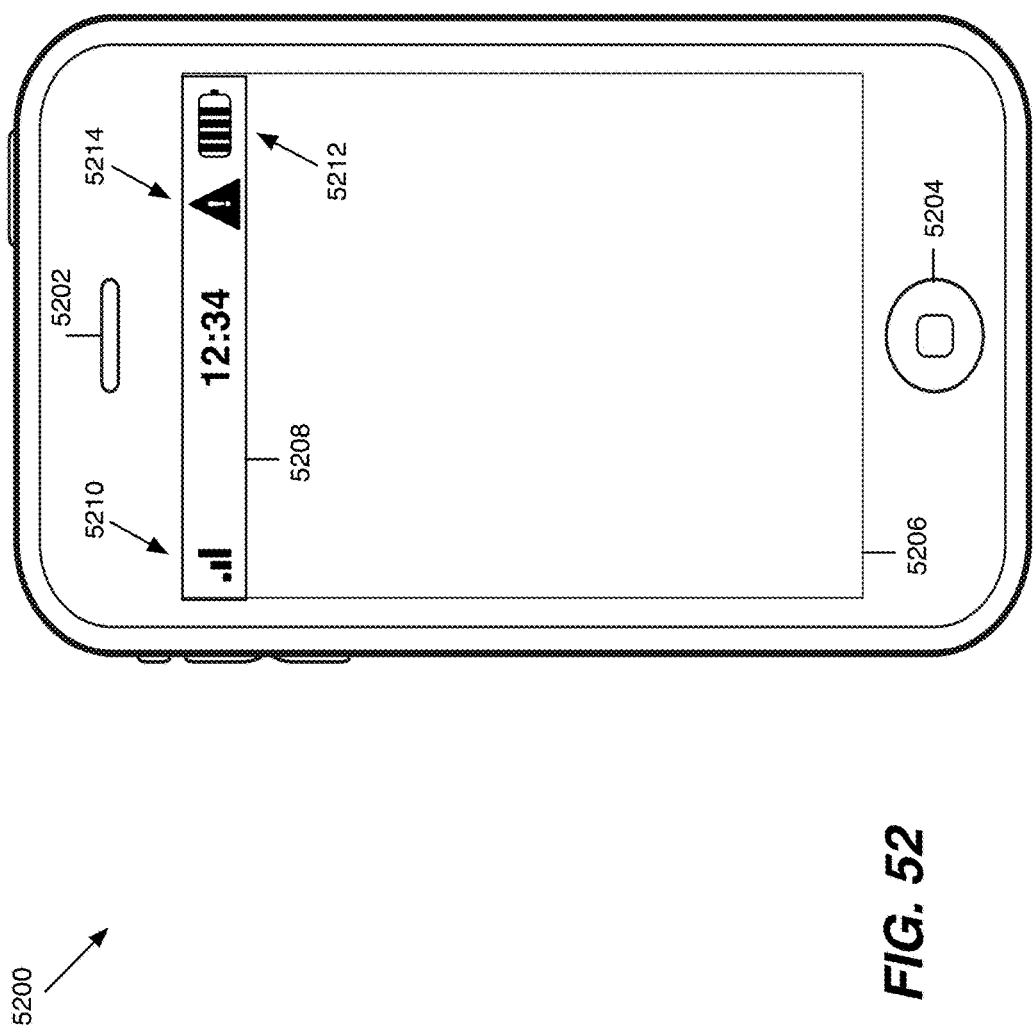
FIG. 52 is a user interface screen shot illustrating another embodiment of a mobile user interface for accessing services provided by the conferencing notification application of FIG. 50.
Figure 53:
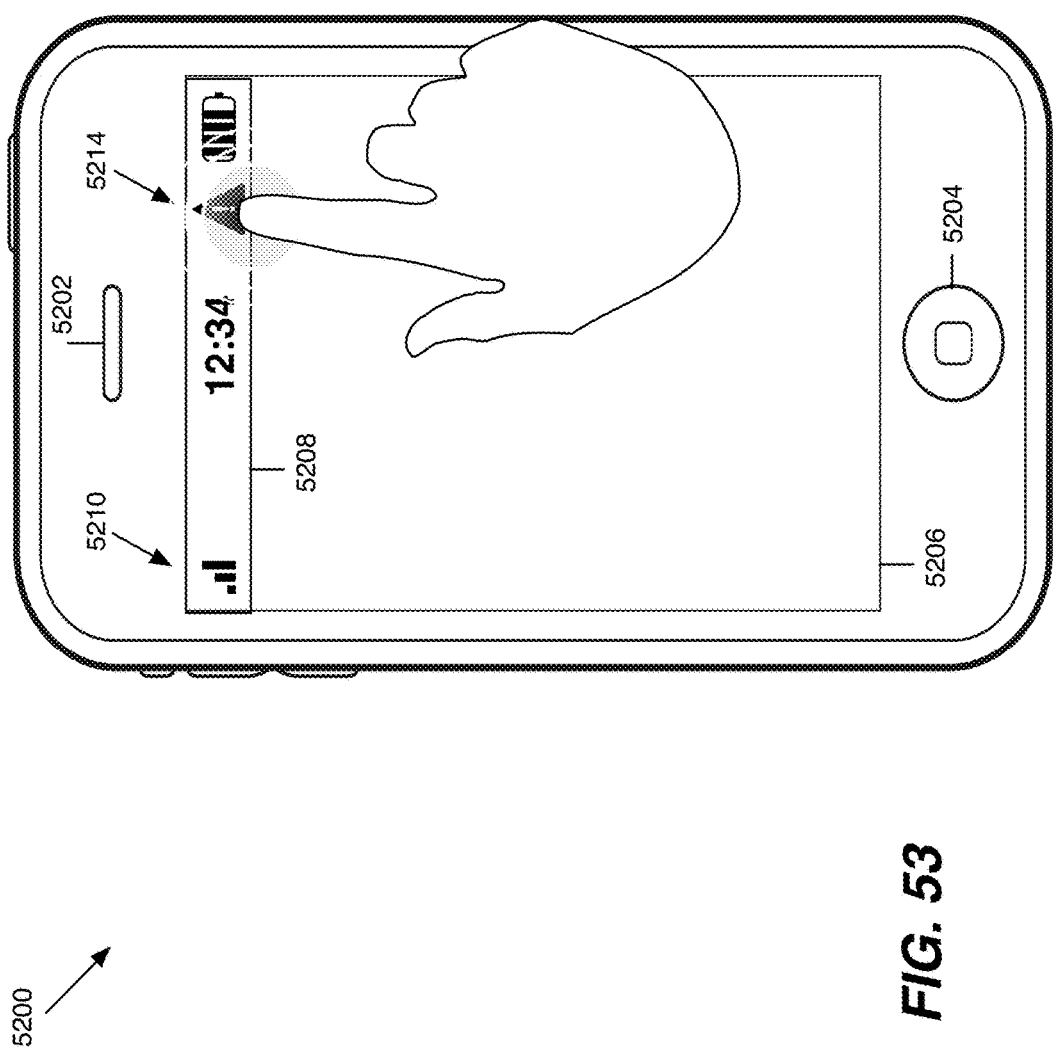
FIG. 53 is a screen shot illustrating an embodiment of a method for launching a conferencing notification menu via the mobile user interface of FIG. 52.

FIG. 52 illustrates another embodiment of a user interface control 5214 for providing user access to certain aspects of the conferencing notification application 5002. In this embodiment, the computing device 102 comprises a mobile telephone 5200 having a touchscreen display 5004. The touchscreen display 5004 comprises a display device that can detect the presence and location of a touch within the display area by, for example, a finger or hand or passive objects, such as, a stylus, pen, or other object. The touchscreen display 5004 may be based on any current or future touchscreen technology, and may employ various forms of input gestures for performing associated functions.

The touchscreen display 5004 may comprise a resistive touchscreen panel having two thin, metallic, electrically conductive layers separated by a narrow gap. When an object, such as a finger, presses down on a point on the panel's outer surface the two metallic layers become connected at that point. The touchscreen panel then behaves as a pair of voltage dividers with connected outputs. This causes a change in the electrical current which is registered as a touch event and sent to a controller (e.g., processor 402) for processing.

The touchscreen display 5004 may be implemented using surface acoustic wave (SAW) technology that uses ultrasonic waves that pass over the touchscreen panel. When the panel is touched, a portion of the wave is absorbed. This change in the ultrasonic waves registers the position of the touch event and sends this information to the processor 402.

In another embodiment, the touchscreen display 5004 supports capacitive sensing via a capacitive touchscreen panel. A capacitive touchscreen panel comprises an insulator, such as glass, coated with a transparent conductor, such as indium tin oxide. As the human body is also a conductor, touching the surface of the screen results in a distortion of the local electrostatic field, measurable as a change in capacitance. Different technologies may be used to determine the location of the touch. The location may be passed to the processor 402, which may calculate how the user's touch or gestures relate to the particular functions of the conferencing notification application 5002.

The touchscreen display 5004 may also support surface capacitance implementations, in which only one side of the insulator is coated with a conductive layer. In such implementations, a small voltage is applied to the layer, resulting in a uniform electrostatic field. When a conductor, such as a human finger, touches the uncoated surface, a capacitor is dynamically formed. The sensor controller may determine the location of the touch indirectly from the change in the capacitance as measured from the four corners of the display area 5206.

In a further embodiment, the touchscreen display 5004 implements a projected capacitive touch (PCT) display having an etched conductive layer. An XY array may be formed by, for example, etching a single layer to form a grid pattern of electrodes or by etching two separate perpendicular layers of conductive material with parallel lines or tracks to form the grid. Applying voltage to the array creates a grid of capacitors. Bringing a finger or conductive stylus close to the surface of the sensor changes the local electrostatic field. The capacitance change at every individual point on the grid may be measured to accurately determine the touch location. The use of a grid permits a higher resolution than resistive technology and also allows multi-touch operation. The PCT display may allow operation without direct contact, such that the conducting layers can be coated with further protective insulating layers, and operate even under screen protectors.

The touchscreen display 5004 may be configured to optically sense touch using, for example, an array of infrared (IR) light-emitting diodes (LEDs) on two adjacent bezel edges of a display, with photosensors placed on the two opposite bezel edges to analyze the system and determine a touch event. The LED and photosensor pairs may create a grid of light beams across the display. An object (such as a finger or pen) that touches the screen interrupts the light beams, causing a measured decrease in light at the corresponding photosensors. The measured photosensor outputs can be used to locate a touch-point coordinate.

Another embodiment of the touchscreen technology involves dispersive signal technology, which uses sensors to detect the mechanical energy in the glass that occurs due to a touch. Algorithms stored in memory 404 and executed by processor 402 interpret this information and provide the actual location of the touch.

Acoustic pulse recognition may also be used to detect the touch. In this embodiment, two piezoelectric transducers are located at some positions of the screen to turn the mechanical energy of a touch (i.e., vibration) into an electronic signal. The screen hardware then uses an algorithm to determine the location of the touch based on the transducer signals.

Referring again to FIG. 52, the mobile telephone 5200 includes a microphone 5202 and various hardware keys, including, for example, a scroll button 5204 for navigating the GUI 132. The mobile telephone 5200 includes a notification bar 5208 for displaying system information, such as, signal strength icon 5210, battery level icon 5212, or any other system of application information. The notification bar 5208 may be expandable based on touch input to display additional notification icons.

Figure 54:
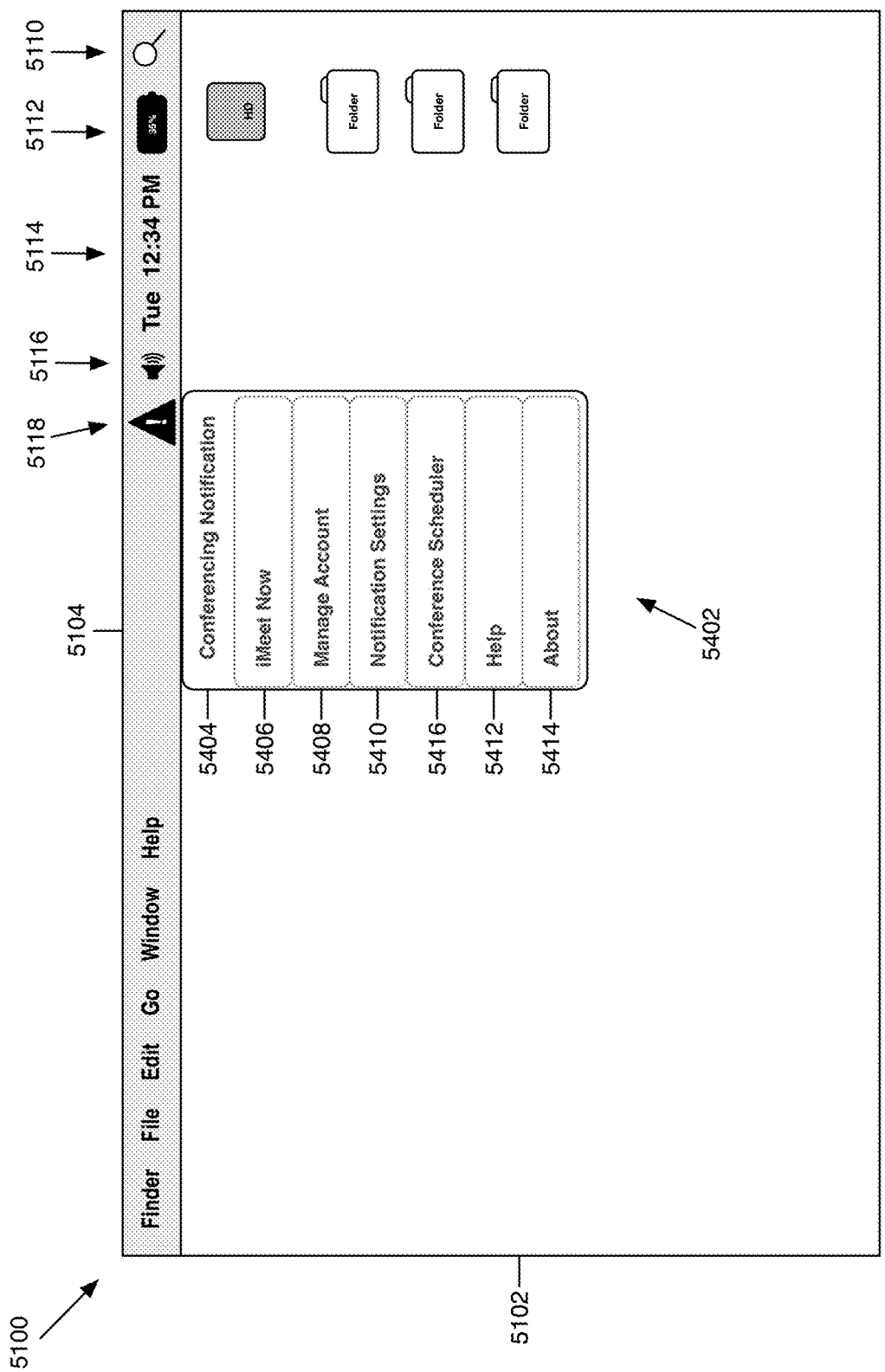
FIG. 54 is a user interface screen shot illustrating an embodiment of a conferencing notification menu in the desktop user interface of FIG. 51.

Regardless of the type and configuration of the computing device 102, the conferencing notification application 5002 may be accessed by selecting the user interface control. For example, a user may select the user interface control 5214 (FIG. 53) to display a conferencing notification menu 5402 (FIG. 54). The conferencing notification menu 5402 may comprise a display header 5404 and one or more additional user interface controls for selecting certain configuration or other options. In the embodiment of FIG. 54, conferencing notification menu 5402 displays an iMeet Now button 5406, a Manage Account button 5408, a Notification Settings button 5410, a Conference Scheduler button 5416, a Help button 5414, and an About button 5414.

The iMeet Now button 5406 may enable the user to connect to the conferencing system 106. When the user selects the button 5406, the conferencing notification application 5002 may launch the browser 3110 and enable the user to join an audio conference 114 and access the conference user interface 4400. The Manage Account button 5408 may enable the user to configure the account profile 4602 (FIG. 46). In an embodiment, the user may configure the parameters via the conferencing notification application 5002, and the parameters subsequently provided to the conferencing system 106 via the conferencing API 4302. In alternative embodiments, the Manage Account button 5408 may direct the user to a web page provided by the conferencing system 106, which receives the configuration parameters. The Notification Settings button 5410 may operate in a similar manner to enable the user to configure parameters associated with the conferencing notification. For example, the conferencing notification parameters may specify any of the following, or other, parameters: alert push enabled/disabled; alert pull enabled/disabled; alert frequency; and alert types.

In operation, the conferencing notification application 5002 may communicate with the conferencing system 106 using conferencing API(s) 4302. The conferencing API(s) 4302 may enable the conferencing notification application 5002 to submit requests 5516 to, and receive responses 5514 from, the conferencing system 106. These communications may include, for example, status checks of the user's conferences to determine if there are any active participants 104. In the event that someone has entered the user's conference or joined one of their bridges via a phone, this activity may be transmitted to the conferencing notification application 5002 as a status update or alert. The update may include other information about the newly joined participants, such as, the participant parameters described above and illustrated in FIGS. 38 and 46, information stored in participant database 4308 (FIG. 43), or other relevant information about the user, including, information associated with the social networking system 3102 (FIG. 31).

Figure 56:
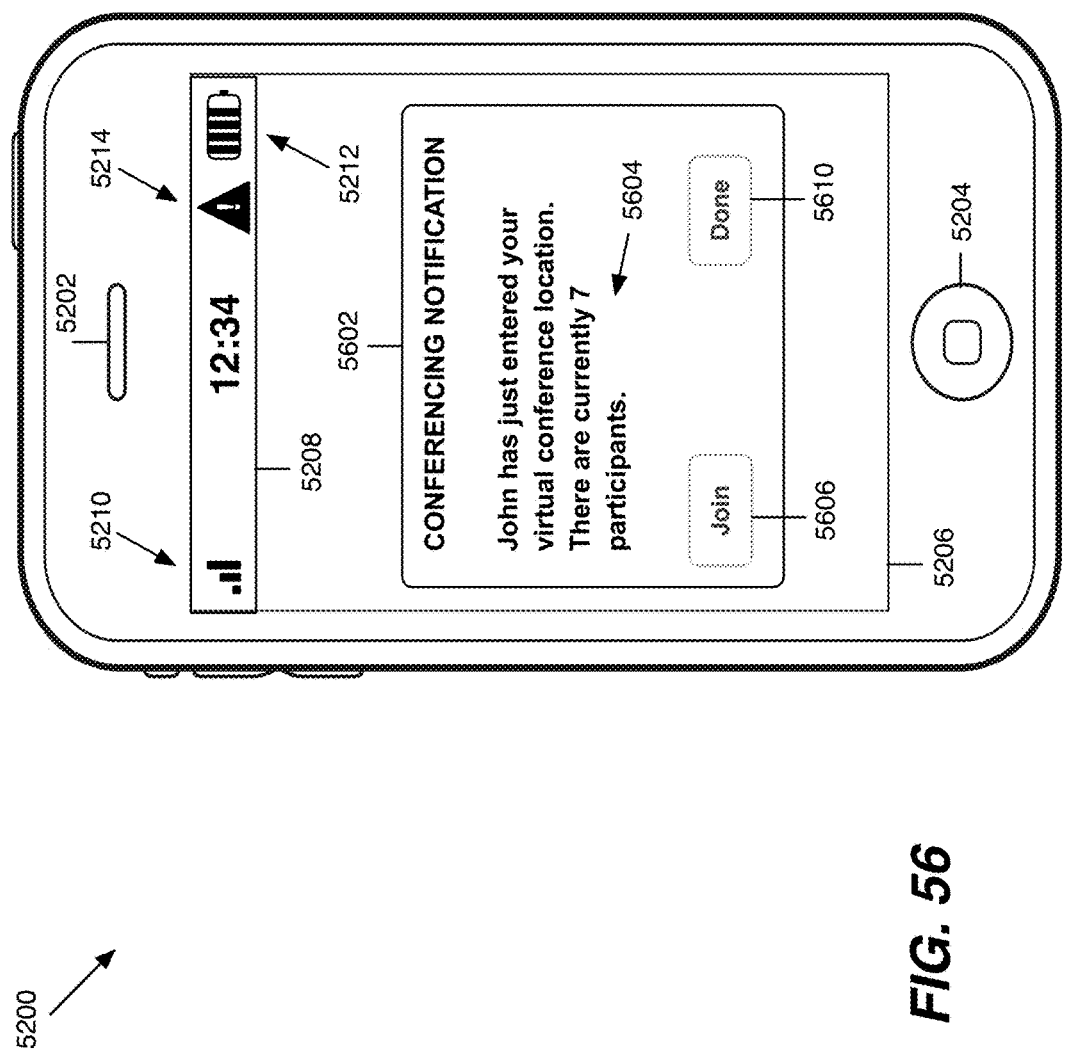
FIG. 56 is a user interface screen shot illustrating an embodiment of a conferencing notification functionality displayed in the mobile user interface of FIG. 52.
Figure 57:
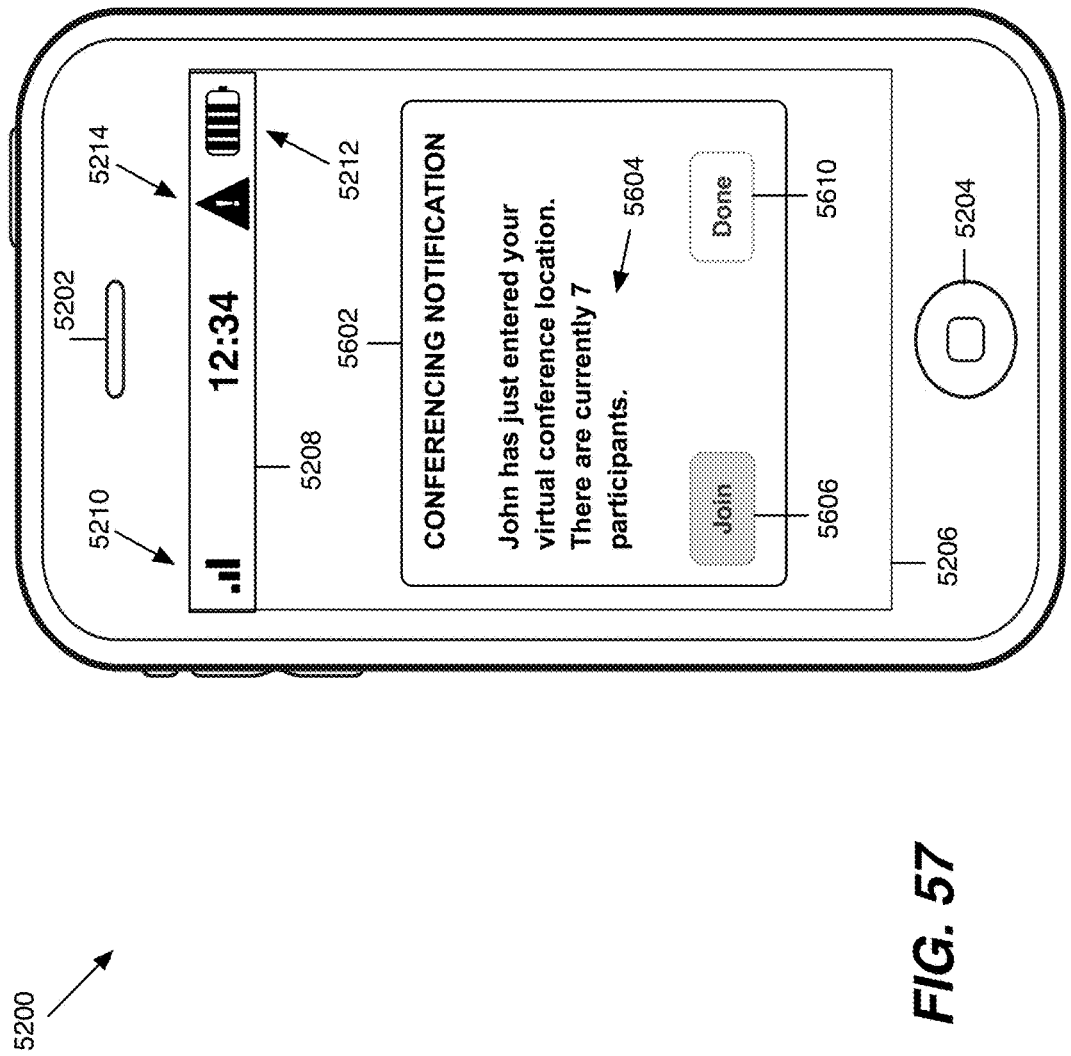
FIG. 57 illustrates the user interface screen shot of FIG. 57 for enabling a user to join a conference via the conferencing notification functionality.
Figure 58:
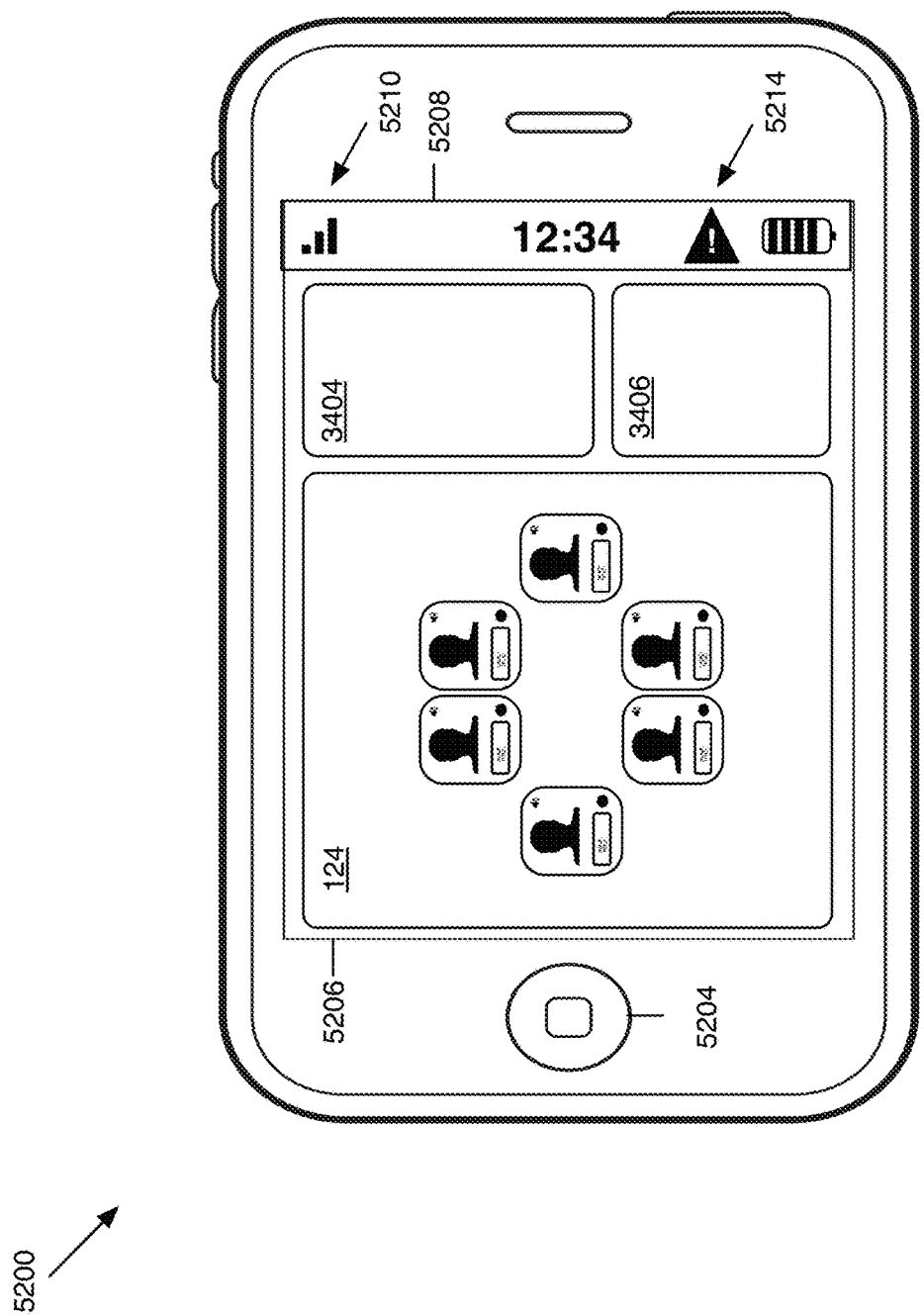
FIG. 58 is a user interface screen shot illustrating an embodiment of a conference interface for an exemplary mobile computing device.

The alerts provided to the conferencing notification application 5002 may be presented on the display. FIG. 56 illustrates an exemplary message or alert 5602 notifying the user of the identity of a newly joined participant and the current number of participants. The alert 5602 may appear for a predetermined amount of time, which may be configurable via the Notification Settings button 5410, or the user may cancel the alert message 5602 by selecting the Done button 5610. It should be appreciated that the content and/or format of the alert 5602 may vary depending on, for example, the events being monitored by the conferencing system 106. The alert 5602 may include a convenient mechanism for enabling the user to join the audio conference 114 and/or the associated conference from the displayed alert 5602. In an embodiment, the conferencing notification application 5002 may prompt the user to join the audio conference 114 and/or the associated conference. As illustrated in FIG. 56, the displayed alert 5602 may include a Join button 5606. When selected (FIG. 57), the conferencing notification application 5002 may initiate a process to enable the user to join the audio conference 114 and present a conferencing user interface 4400 on the computing device 102. The conferencing user interface 4400 may be configured in the manner described herein.

If the user chooses to cancel a particular message or the message expires without the user joining the conference, the conferencing system 106 may continue to send alerts as events occur. If the user chooses to join the conference, the conferencing system 106 may disable alerts.

To implement the conferencing notification application 5002, the conferencing system 106 may support various web services for exchanging structured information with the conferencing notification application 5002. The web services may be implemented using any suitable protocol. In an embodiment, the web services may be implemented via the Simple Object Access Protocol (SOAP) using Extensible Markup Language (XML) as the messaging format. The conferencing system 106 may respond to web service calls from the conferencing notification application 5002 by either returning the requested information immediately or by initiating the request and then providing the results (later) via a polling action.

Figure 55:
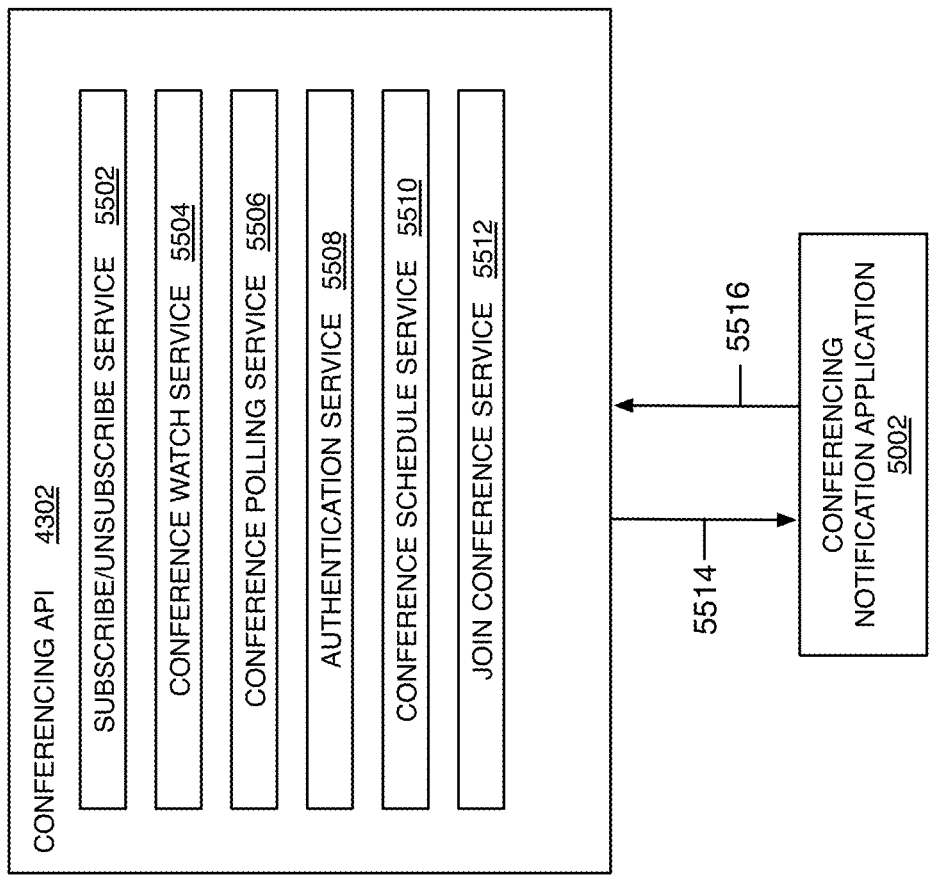
FIG. 55 is a block diagram illustrating an exemplary implementation of the conferencing API in FIG. 50.

FIG. 55 illustrates various exemplary web services for implementing one or more aspects of the conferencing notification application 5002. The web services may comprise any of the following, or other, web services: a subscribe/unsubscribe service 5502; a conference watch service 5504; a conferencing polling service 5506; an authentication service 5508; a conference schedule service 5510; and a join conference service 5512. Each of these web services are generally described below with reference to exemplary request and response XML messages.

The subscribe/unsubscribe service 5502 may be implemented with a Subscribe( ) call that establishes authorization to use the resources provided by the conferencing system 106. The Subscribe( ) call may be the first call made by the conferencing notification application 5002 to the conferencing system 106. In an embodiment, the Subscribe( ) call may require an authorization response before the conferencing notification application 5002 may access other services. In this regard, the subscribe/unsubscribe service 5502 may be configured without a security token in the SOAP header. The other web services may be implemented with the security token (e.g., a session ID obtained with the Subscribe( ) call).

An exemplary XML request for the Subscribe( ) call may be configured as follows:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema" xmlns:soap=
"http://schemas.xmlsoap.org/soap/envelope/">
<soap:Body>
<Subscribe xmlns="http://pia.premiereglobal.com/">
<ClientID>string</ClientID> <ClientPW>string</ClientPW>
<WebID>string</WebID>
<WebPW>string</WebPW>
</Subscribe>
</soap:Body>
</soap:Envelope>
```

An exemplary XML response for the Subscribe( ) call may be configured as follows:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema" xmlns:soap=
"http://schemas.xmlsoap.org/soap/envelope/">
<soap:Body>
<SubscribeResponse xmlns="http://pia.premiereglobal.com/">
<SubscribeResult>
<ResultCode>ResultCode</ResultCode>
<SessionID>string</SessionID>
</SubscribeResult>
</SubscribeResponse>
</soap:Body>
</soap:Envelope>
```

An Unsubscribe( ) call may be made to unsubscribe the user from the web services when the conferencing notification application 5002 is closed. The call may terminate the session with the conferencing system 106. Further interactions with the conferencing system 106 may require a subsequent Subscribe( ) call to be made by the conferencing notification application.

An exemplary XML request for the Unsubscribe( ) call may be configured as follows:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema" xmlns:soap=
"http://schemas.xmlsoap.org/soap/envelope/">
<soap:Header>
<SoapSecurityHeader xmlns="http://pia.premiereglobal.com/">
<SessionID>string</SessionID>
</SoapSecurityHeader>
</soap:Header>
```

```
<soap:Body>
<Unsubscribe xmlns="http://pia.premiereglobal.com/" />
</soap:Body>
</soap:Envelope>
```

An exemplary XML response for the Unsubscribe( ) call may be configured as follows:

```
<?xml version="1.0" encoding="utf-8"?>
<soap:Envelope xmlns:xsi=http://www.w3.org/2001/XMLSchema-instance
xmlns:xsd="http://www.w3.org/2001/XMLSchema" xmlns:soap=
"http://schemas.xmlsoap.org/soap/envelope/">
<soap:Body>
<UnsubscribeResponse xmlns="http://pia.premiereglobal.com/">
<UnsubscribeResult>
<ResultCode>ResultCode</ResultCode>
</UnsubscribeResult>
</UnsubscribeResponse>
</soap:Body>
</soap:Envelope>
```

The conference watch service 5504 may invoke a SetConferenceWatch( ) call that establishes a conference watch, which enables the conferencing system 106 to begin sending alerts to the conferencing notification application 5002. After setting a conference watch, the user may receive notifications or alerts for conference(s) associated with the user, including, for example, when a participant 104 joins or leaves a conference, when a participant speaks during an audio conference 114, when a participant posts or receives information associated with a social networking system 3102, etc.

The conference watch service 5504 may be useful for hosts who are too busy to join a conference, do not wish to join the conference, or are otherwise unable to join the conference but want to monitor the activity of the conference. For example, the host may be interested in joining the conference, for example, but only after a particular person has joined or some other event has occurred. The host may view the alert messages as they are provided by the conferencing system 106 and displayed by the computing device 102. When the desired event has occurred, the host may elect to join the conference. As described below, the alerts may be retrieved from the conferencing system 106 via the conference polling service 5506.

An exemplary XML request for the SetConferenceWatch( ) call may be configured as follows:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema" xmlns:soap=
"http://schemas.xmlsoap.org/soap/envelope/">
<soap:Header>
<SoapSecurityHeader xmlns="http://pia.premiereglobal.com/">
<SessionID>string</SessionID>
</SoapSecurityHeader>
</soap:Header>
<soap:Body>
<SetConferenceWatch xmlns="http://pia.premiereglobal.com/">
<ConferenceID>string</ConferenceID>
</SetConferenceWatch>
</soap:Body>
</soap:Envelope>
```

An exemplary XML response for the SetConferenceWatch( ) call may be configured as follows:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema" xmlns:soap=
"http://schemas.xmlsoap.org/soap/envelope/">
<soap:Body>
<SetConferenceWatchResponse xmlns="http://pia.premiereglobal.com/">
<SetConferenceWatchResult>
<ResultCode>ResultCode</ResultCode>
</SetConferenceWatchResult>
</SetConferenceWatchResponse>
</soap:Body>
</soap:Envelope>
```

The conference watch service 5504 may also invoke a ClearConferenceWatch( ) call that may be used to clear a previously established conference watch. Removing a conference watch may cause the alerts for the specified conference to be disabled. After clearing the conference watch, the user will no longer receive alerts.

An exemplary XML request for the ClearConferenceWatch( ) call may be configured as follows:

```
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema" xmlns:soap=
"http://schemas.xmlsoap.org/soap/envelope/">
<soap:Header>
<SoapSecurityHeader xmlns="http://pia.premiereglobal.com/">
<SessionID>string</SessionID>
</SoapSecurityHeader>
</soap:Header>
<soap:Body>
<ClearConferenceWatch xmlns="http://pia.premiereglobal.com/">
<ConferenceID>string</ConferenceID>
</ClearConferenceWatch>
</soap:Body>
</soap:Envelope>
```

An exemplary XML response for the ClearConferenceWatch( ) call may be configured as follows:

```
<?xml version="1.0" encoding="utf-8"?>
<soap:Envelope xmlns:xsi=http://www.w3.org/2001/XMLSchema-instance
xmlns:xsd="http://www.w3.org/2001/XMLSchema" xmlns:soap=
"http://schemas.xmlsoap.org/soap/envelope/">
<soap:Body>
<ClearConferenceWatchResponse xmlns=
"http://pia.premiereglobal.com/">
<ClearConferenceWatchResult>
<ResultCode>ResultCode</ResultCode> </
ClearConferenceWatchResult>
</ClearConferenceWatchResponse>
</soap:Body>
</soap:Envelope>
```

The conferencing polling service 5506 may invoke a PollForMessages( ) call, which is used to request events from a watched conference. In response to the request, the conferencing notification application 5502 will receive events associated with the watched conference.

An exemplary XML request for the PollForMessages( ) call may be configured as follows:

```
<?xml version="1.0" encoding="utf-8"?>
<soap:Envelope xmlns:xsi="http://www.w3.org/2001/XMLSchema-instance"
```

```
xmlns:xsd="http://www.w3.org/2001/XMLSchema" xmlns:soap=
"http://schemas.xmlsoap.org/soap/envelope/">
 <soap:Header>
  <SoapSecurityHeader xmlns="http://pia.premiereglobal.com/">
   <SessionID>string</SessionID>
  </SoapSecurityHeader>
 </soap:Header>
 <soap:Body>
  <PollForMessages xmlns="http://pia.premiereglobal.com/" />
 </soap:Body>
</soap:Envelope>
```

An exemplary XML response for the PollForMessages( ) call may be configured as follows:

```
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema" xmlns:soap=
"http://schemas.xmlsoap.org/soap/envelope/">
 <soap:Body>
  <PollForMessagesResponse xmlns="http://pia.premiereglobal.com/">
   <PollingRequestResult>
    <ResultCode>ResultCode</ResultCode>
   </PollingRequestResult>
  </PollForMessagesResponse>
 </soap:Body>
</soap:Envelope>
```

The authentication service 5508, the conference schedule service 5510, and the join conference service 5512 may enable the conferencing notification application 5002 to interface with a registration system. The authentication service 5508 may invoke a SecurityValidateLogOn( ) call to validate a user's logon credentials. The call may return a security token, which may be used to create a login header. The login header may be sent with one or more of the other service calls. An exemplary XML request for the SecurityValidateLogOn( ) call may be configured as follows:

```
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
 <soap:Body>
  <SecurityValidateLogOn xmlns="Conferencing">
   <request>
    <LogOnId>string</LogOnId>
    <Password>string</Password>
    <WebId>string</WebId>
    <WebPassword>string</WebPassword>
   </request>
  </SecurityValidateLogOn>
 </soap:Body>
</soap:Envelope>
```

An exemplary XML response for the SecurityValidateLogOn( ) call may be configured as follows:

```
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
 <soap:Body>
  <SecurityValidateLogOnResponse xmlns="Conferencing">
   <SecurityValidateLogOnResult>
    <Token>guid</Token>
    <TokenExpirationUtc>dateTime</TokenExpirationUtc>
    <FirstName>string</FirstName>
    <LastName>string</LastName>
    <Email>string</Email>
    <ClientId>int</ClientId>
    <IntlClientId>string</IntlClientId>
    <ProviderId>int</ProviderId>
    <ProviderName>string</ProviderName>
    <CompanyId>int</CompanyId>
    <IntlCompanyId>string</IntlCompanyId>
    <CompanyName>string</CompanyName>
    <CorporateCustomerId>int</CorporateCustomerId>
    <CorporateCustomerName>string</CorporateCustomerName>
    <HubId>int</HubId>
    <HubName>string</HubName>
    <HubGroupId>int</HubGroupId>
    <HubGroupName>string</HubGroupName>
    <HubUrls>
     <string>string</string>
     <string>string</string>
    </HubUrls>
    <RedFlagDate>dateTime</RedFlagDate>
    <FinanceChangeDate>dateTime</FinanceChangeDate>
   </SecurityValidateLogOnResult>
  </SecurityValidateLogOnResponse>
 </soap:Body>
</soap:Envelope>
```

Figure 61:
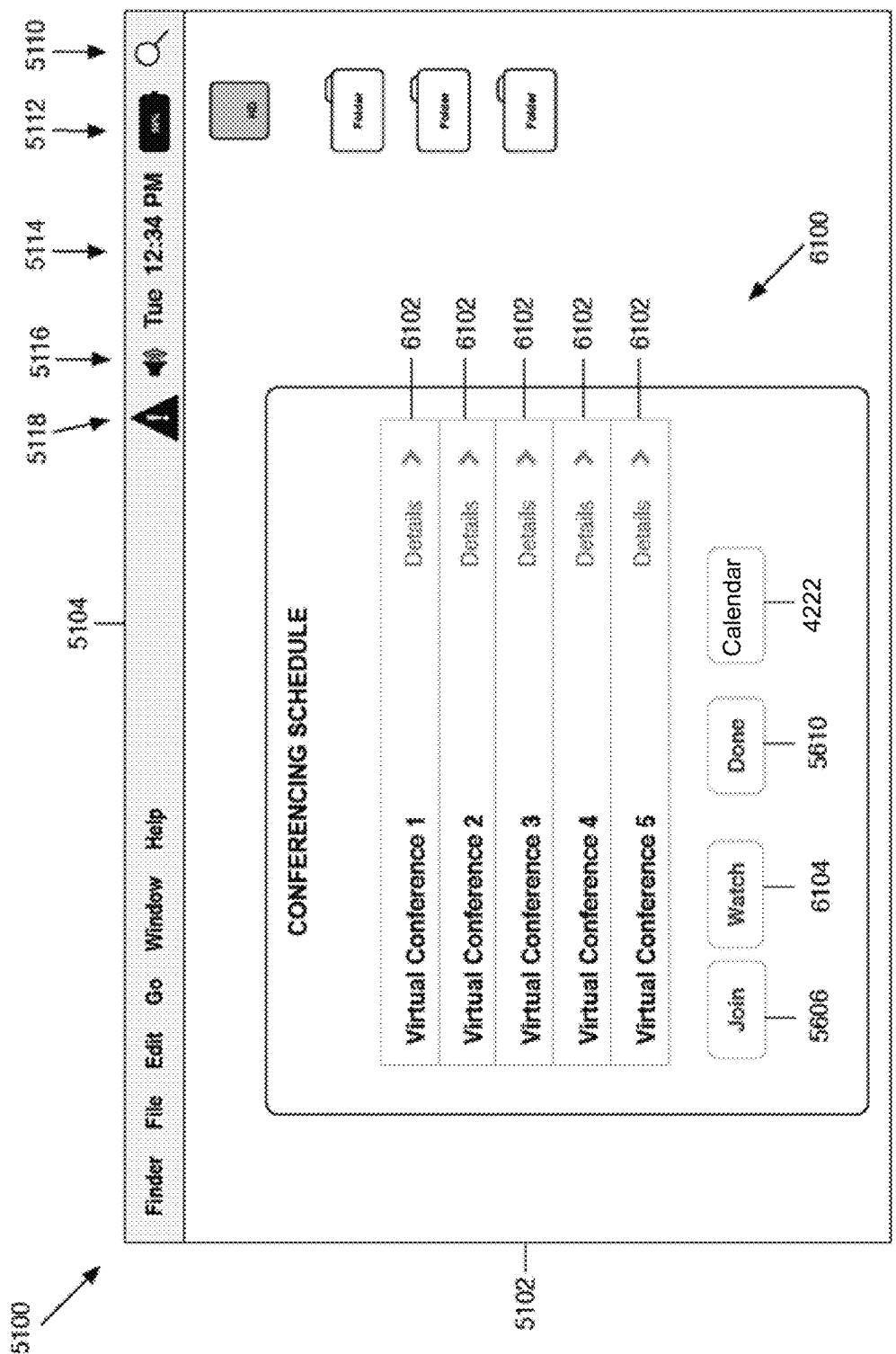
FIG. 61 is a user interface screen shot illustrating an embodiment of a conference scheduler functionality.
Figure 62:
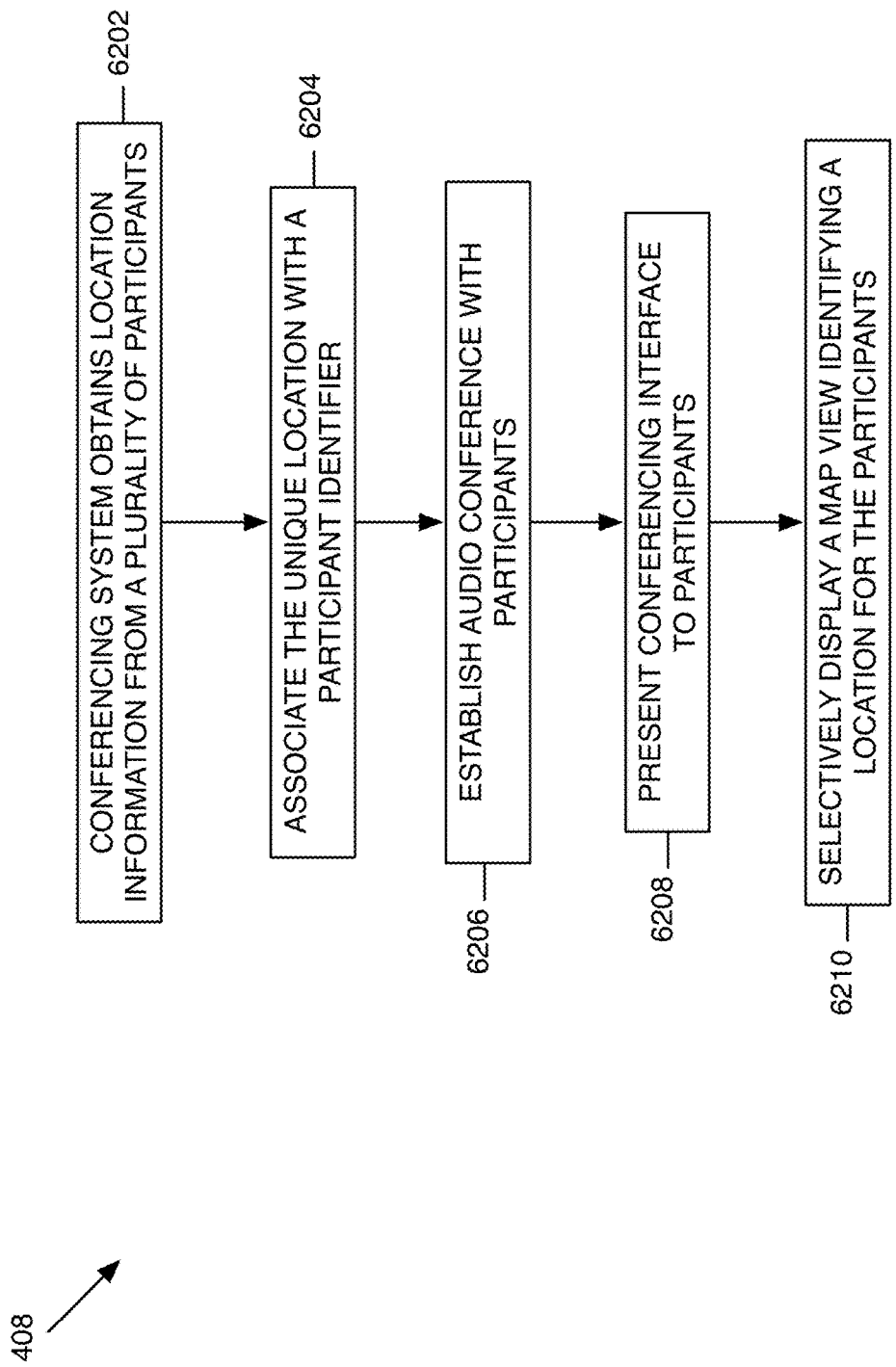
FIG. 62 is a flowchart illustrating the architecture, operation, and/or functionality of an embodiment of the location-based services module(s) of FIG. 19.

The conference schedule service 5510 may invoke a FindReservation( ) call that returns a list of conferences. The FindReservation( ) call may be initiated when a user selects the Conference Schedule button 5416, as illustrated in FIG. 54. The result contains detailed information of all conferences associated with the user. The conferencing notification application 5002 may present the results to the user. FIG. 61 illustrates an exemplary display 6100 for presenting the results. The display 6100 comprises a list of conference entries 6102. Additional details (e.g., dial-in numbers, passcodes, date, time, agenda, participants, etc.) about each conference may be accessed by selecting the particular entry 6102.

As illustrated in FIG. 61, when a user wants to watch a conference to receive alerts about that conference, the user may select an entry 6102 and select a watch button 6104. If a user wants to see his or her calendar 6505, then a user may select a calendar button 4222 as described in further detail below in connection with FIGS. 65-67.

An exemplary XML request for the FindReservation( ) call may be configured as follows:

```
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
 <soap:Header>
  <HeaderToken xmlns="Conferencing">
   <Token>string</Token>
  </HeaderToken>
 </soap:Header>
 <soap:Body>
  <FindReservation xmlns="Conferencing">
   <aFindReservationRequest TimeZone="string"
DisplayLanguage="string">
    <SearchCriteria CompanyID="string" ClientID="string"
ConfID="string" PPassCode="string"
ClientPassCode="string" ConfName="string"
ModeratorName="string" StartDate="string"
EndDate="string" AddDeleted="string" MaxRecords="string"
StartRecord="string" InterfaceID="string"
SortByModified="string">
     <ConfTypes>
      <ConfType>string</ConfType>
      <ConfType>string</ConfType>
     </ConfTypes>
```

```
        </SearchCriteria>
      </aFindReservationRequest>
      <aIgnoreUserId>boolean</aIgnoreUserId>
    </FindReservation>
  </soap:Body>
</soap:Envelope>
```

An exemplary XML response for the FindReservation( ) call may be configured as follows:

```
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
  <soap:Body>
    <FindReservationResponse xmlns="Conferencing">
      <FindReservationResult Count="string">
        <Result ErrorCode="string" ErrorText="string" />
        <Reservation Deleted="string" DeleteDate="string"
Created="string" Modified="string" Attended="string"
Participants="string">
          <ReservationDetails ConfID="string" ConfName="string"
PPassCode="string" MPassCode="string"
LPassCode="string" ClientPassCode="string"
ClientMPassCode="string" SecurityCode="string"
PassCodeType="string">
            <PhoneNumbers xsi:nil="true" />
          </ReservationDetails>
          <Client ClientID="string" ConfName="string"
Password="string" Email="string" Company="string"
PONumber="string" ModeratorName="string"
InterfaceID="string" SystemID="string"
MinutesAvailable="string" SecurityCode="string"
RSVPCustom="string" Language="string"
DisplayLanguage="string" ClientNumMinLen="string"
ClientNumMaxLen="string" MatterNumMinLen="string"
MatterNumMaxLen="string" PONumMinLen="string"
PONumMaxLen="string" />
          <BridgeOptions>
            <BridgeOption>string</BridgeOption>
            <BridgeOption>string</BridgeOption>
            <Option xsi:nil="true" />
            <Option xsi:nil="true" />
          </BridgeOptions>
          <Options>
            <Option xsi:nil="true" />
            <Option xsi:nil="true" />
          </Options>
          <Schedule TimeZone="string" TimeZoneName="string">
            <AdHoc xsi:nil="true" />
            <AdHoc xsi:nil="true" />
            <Daily xsi:nil="true" />
            <Daily xsi:nil="true" />
            <Weekly xsi:nil="true" />
            <Weekly xsi:nil="true" />
            <WeekDays xsi:nil="true" />
            <WeekDays xsi:nil="true" />
            <MonthlyDesc xsi:nil="true" />
            <MonthlyDesc xsi:nil="true" />
            <MonthlyDate xsi:nil="true" />
            <MonthlyDate xsi:nil="true" />
            <Skip xsi:nil="true" />
            <Skip xsi:nil="true" />
            <NextConference xsi:nil="true" />
            <NextConference xsi:nil="true" />
            <ConferenceTime xsi:nil="true" />
            <ConferenceTime xsi:nil="true" />
          </Schedule>
          <PhoneURL Value="string" />
          <VisionCast ParticipantURL="string"
ModeratorURL="string" ReplayURL="string" />
        </Reservation>
        <Reservation Deleted="string" DeleteDate="string"
Created="string" Modified="string" Attended="string"
Participants="string">
          <ReservationDetails ConfID="string" ConfName="string"
PPassCode="string" MPassCode="string"
LPassCode="string" ClientPassCode="string"
ClientMPassCode="string" SecurityCode="string"
PassCodeType="string">
            <PhoneNumbers xsi:nil="true" />
          </ReservationDetails>
          <Client ClientID="string" ConfName="string"
Password="string" Email="string" Company="string"
PONumber="string" ModeratorName="string"
InterfaceID="string" SystemID="string"
MinutesAvailable="string" SecurityCode="string"
RSVPCustom="string" Language="string"
DisplayLanguage="string" ClientNumMinLen="string"
ClientNumMaxLen="string" MatterNumMinLen="string"
MatterNumMaxLen="string" PONumMinLen="string"
PONumMaxLen="string" />
          <BridgeOptions>
            <BridgeOption>string</BridgeOption>
            <BridgeOption>string</BridgeOption>
            <Option xsi:nil="true" />
            <Option xsi:nil="true" />
          </BridgeOptions>
          <Options>
            <Option xsi:nil="true" />
            <Option xsi:nil="true" />
          </Options>
          <Schedule TimeZone="string" TimeZoneName="string">
            <AdHoc xsi:nil="true" />
            <AdHoc xsi:nil="true" />
            <Daily xsi:nil="true" />
            <Daily xsi:nil="true" />
            <Weekly xsi:nil="true" />
            <Weekly xsi:nil="true" />
            <WeekDays xsi:nil="true" />
            <WeekDays xsi:nil="true" />
            <MonthlyDesc xsi:nil="true" />
            <MonthlyDesc xsi:nil="true" />
            <MonthlyDate xsi:nil="true" />
            <MonthlyDate xsi:nil="true" />
            <Skip xsi:nil="true" />
            <Skip xsi:nil="true" />
            <NextConference xsi:nil="true" />
            <NextConference xsi:nil="true" />
            <ConferenceTime xsi:nil="true" />
            <ConferenceTime xsi:nil="true" />
          </Schedule>
          <PhoneURL Value="string" />
          <VisionCast ParticipantURL="string"
ModeratorURL="string" ReplayURL="string" />
        </Reservation>
      </FindReservationResult>
    </FindReservationResponse>
  </soap:Body>
</soap:Envelope>
```

The join conference service 5512 may be invoked when, for example, the user selects the join button 5606 (FIG. 56) or selects a conference from the conferencing schedule (FIG. 61). A WebHostLogin( ) call may return a location for the virtual conference location. In an embodiment, the call may return a redirectUrl of a given client and host, which logs the client into a host. The conferencing notification application 5002 may send the WebHostLogin( ) request, which contains the user's credentials, and then opens a web browser placing the user directly into the conference without the need to login again.

An exemplary XML response for the WebHostLogin( ) call may be configured as follows:

```
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
  <soap:Header>
    <HeaderToken xmlns="Conferencing">
```

```
        <Token>string</Token>
      </HeaderToken>
    </soap:Header>
    <soap:Body>
      <WebHostLogin xmlns="Conferencing">
        <request>
          <ClientId>string</ClientId>
          <WebHost>None or VisionCast or VisionCastDemo or
ReadyCast or ReadyCastDemo or ReadyCastProtect or
AcrobatConnectPro or PgiAdobeConnect or ReadyCastMeeting
or ReadyCastEvent or ConferencingHub</WebHost>
          <ConfId>int</ConfId>
          <DialInNumbers>
            <PhoneNumber>
              <Location>string</Location>
              <Number>string</Number>
            </PhoneNumber>
            <PhoneNumber>
              <Location>string</Location>
              <Number>string</Number>
            </PhoneNumber>
          </DialInNumbers>
          <Target>string</Target>
        </request>
      </WebHostLogin>
    </soap:Body>
  </soap:Envelope>
```

An exemplary XML response for the WebHostLogin( ) call may be configured as follows:

```
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
  <soap:Body>
    <WebHostLoginResponse xmlns="Conferencing">
      <WebHostLoginResult>
        <RedirectUrl>string</RedirectUrl>
      </WebHostLoginResult>
    </WebHostLoginResponse>
  </soap:Body>
</soap:Envelope>
```

Figure 59:
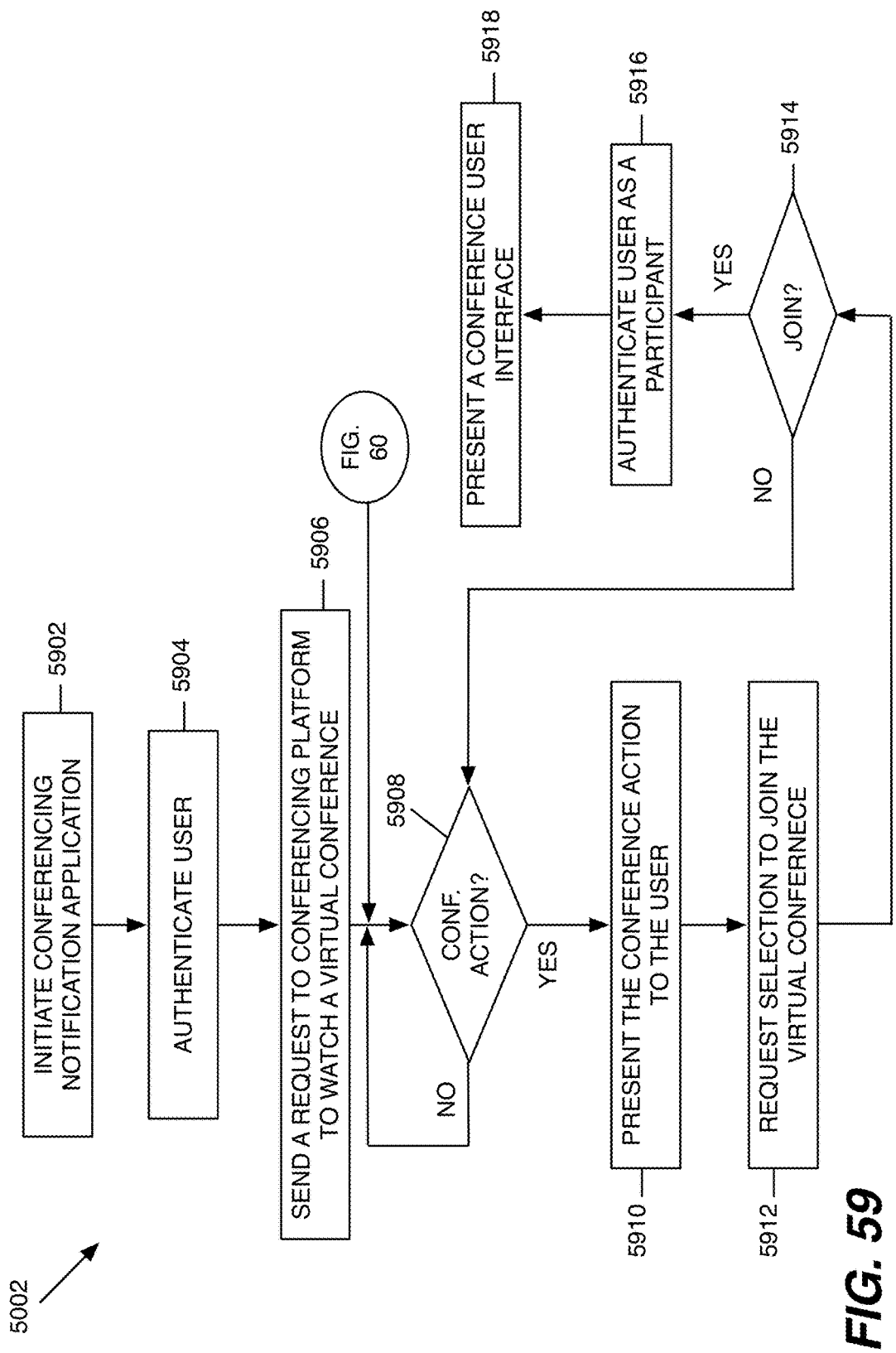
FIG. 59 is a flowchart illustrating the architecture, operation, and/or functionality of an embodiment of the conferencing notification application of FIG. 50.

FIG. 59 illustrates an embodiment of a method for enabling a user to watch a conference via the notification application without having to join the audio conference 114 or access the conference interface. At block 5902, the conferencing notification application 5002 is initiated. A user may manually launch the conferencing notification application 5002 or the operating system 5004 may be configured to automatically launch the application at startup or upon a predetermined event. At block 5904, the conferencing notification application 5002 may authenticate the user with the conferencing system 106. At block 5906, the conferencing notification application 5002 sends a request to the conferencing system 106 to watch a virtual conference. The request may comprise information identifying the conference. At decision block 5908, the conference and/or the audio conference 114 are monitored for specific actions or events. As events occur during the audio conference 114, the conferencing notification application 5002 may receive and present related messages or alerts to the user (block 5910). At block 5912, the conferencing notification application 5002 may prompt the user for a selection to join the conference via the conference interface. In an embodiment, the request to join may be presented in association with the message or alert. If the user makes a selection to join the virtual conference (decision block 5914), the conferencing notification application 5002 may further authenticate the user as a participant in the conference, at block 5916. This authentication may substitute for the authentication at block 5904 or provide further or separate authentication. At block 5918, the conferencing notification application 5002 enables the user to access the conference via, for example, the conference user interface 4400.

Figure 60:
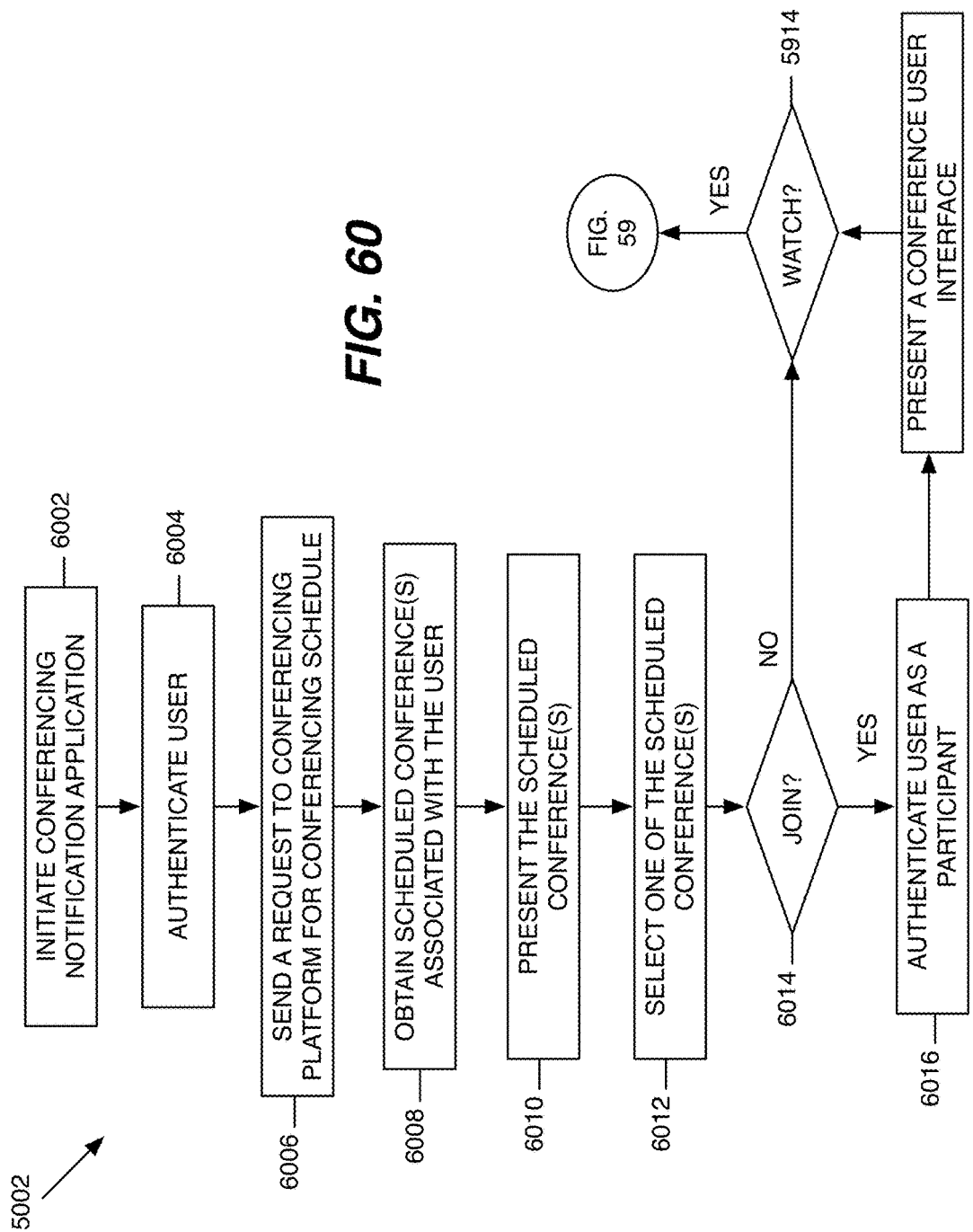
FIG. 60 is a flowchart illustrating the architecture, operation, and/or functionality of another embodiment of the conferencing notification application of FIG. 50.

FIG. 60 illustrates another embodiment of a method for implementing certain aspects of the conferencing notification application 5002. The conferencing notification application 5002 is initiated, at block 6002. At block 6004, the conferencing notification application 5002 may authenticate the user with the conferencing system 106. At block 6006, the conferencing notification application 5002 sends a request to the conferencing system 106 for available conferences associated with the user. At decision block 6008, the conferencing notification application 5002 may receive a schedule of conferences associated with the user, which may be presented to the user (block 6010). At block 6012, the conferencing notification application 5002 may prompt the user for a selection of one of the conferences (block 6012). If the user requests to join the selected conference (decision block 6014), the user may be authenticated (block 6016) and then permitted to join the audio conference 114 and/or the virtual conference. As illustrated at decision block 5914, the user may also request to watch the conference without necessarily joining the conference.

Figure 65A:
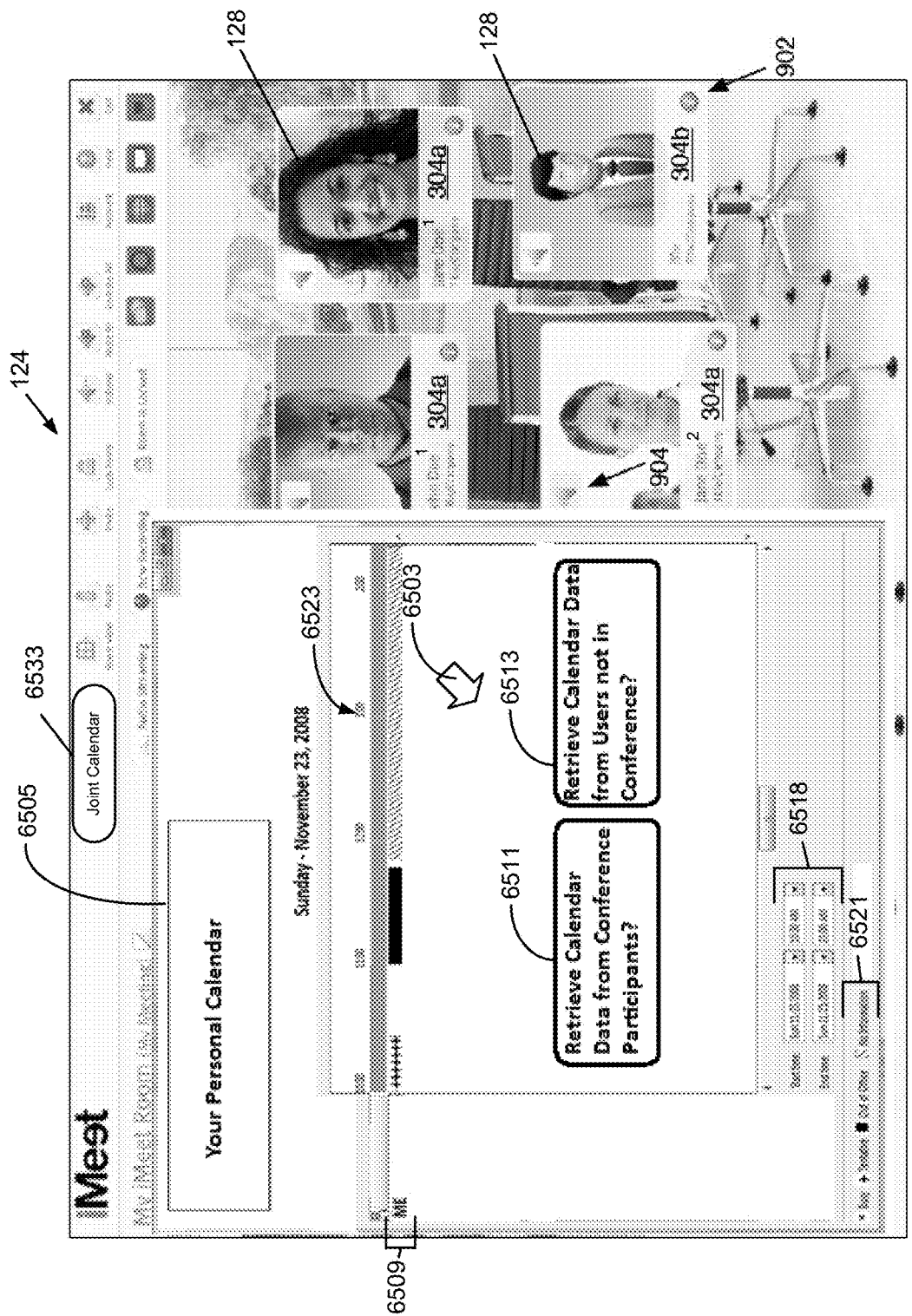
FIG. 65*a* is a screen shot illustrating an embodiment of a virtual conference location with a calendar function.

FIG. 65a is a screen shot illustrating an embodiment of a virtual conference location 124 with a calendar function. The calendar function of FIG. 65a as well as FIGS. 65b-67 are supported by one or more calendar module(s) 429 running on the server 108, as illustrated in FIG. 4.

A user interface for a personal calendar 6505 is illustrated in FIG. 65a. The personal calendar 6506 was generated by calendar module(s) 429 in response to the conference participant "ME" selecting the calendar button 4222 of FIG. 42b, after the business card button 902/4108 has been selected, or in response to the calendar button 4222 of FIG. 61. The personal calendar 6505 may present detailed time increments of a conference participant's schedule. For example, the personal calendar 6505 may present hourly increments 6523 which are illustrated in a graphical manner. The hourly increments 6523 can comprise various symbols to indicate the status of a particular time increment relative to other increments of a user's personal schedule.

For example, a particular time increment may be displayed with the plus sign "+" symbol to indicate a tentative status for that particular time increment. Similarly, a particular time increment may be displayed with an asterisk "*" to indicate a busy status for that particular time increment. A particular time increment may be displayed with a solid color, such as black, to indicate an out of office status. A particular time increment may be displayed with a particular crosshatching, such as angled lines, to indicate an unknown status for a particular time increment. One of ordinary skill in the art recognizes that various combinations of symbols and graphical elements indicating additional or the same status described above are within the scope of the invention. The personal calendar 6505 may provide a key 6521 that explains the relationship between the graphical symbols and the particular status that the symbols may represent.

In the embodiment of FIG. 65a, the personal calendar 6505 lists the time of day in increments 6523 between 10 AM and 2 PM for the day of Sunday, Nov. 23, 2008. One of ordinary skill in the art recognizes that displaying additional days and times on the calendar 6505 is within the scope of the invention.

Row 6509 conveys the time of day 6523 between 10 AM and 2 PM for the personal calendar 6505 of a single conference participant. For the time period between 10 AM and 10:30 AM, row 6509 indicates that a tentative event has been planned by the participant as suggested by the plus signs "+." For the time period between 10:30 AM and 11 AM, there is empty space to indicate that the participant may have availability for an event during this window.

A user may scroll through the times of day 6523 by using a screen pointer 6503 or a user may select other times with drop-down menus 6518. One of ordinary skill in the art recognizes that additional similar user interfaces as well as additional different user interfaces may be provided for allowing a user to select various times of day, as well various as days of the week, various days of a month, certain months, certain years, etc. without departing from the scope of the invention.

The personal calendar 6505 may also provide additional options or functionality that can be selected by a user. For example, the personal calendar 6505 may display the calendar data for conference participants button 6511 as well as the calendar data from nonparticipants button 6513. These buttons 6511, 6513 may be selected by the user who can move a screen pointer 6503 to select either or both buttons 6511, 6513.

The calendar data for participants button 6511 allows a user to retrieve calendar data from various participants having tiles 304 in a conference. In response to activation of button 6511, the calendar module(s) 429 of FIG. 4 may send requests for calendar data or the calendar module(s) 429 may retrieve calendar data from any of the conference participants who are using the features supported by the server 108. Further details of the conference data from conference participants, like John Doe1, Jane Doe1, Jane Doe2, and the "ME" participant as illustrated in FIG. 65A are discussed below in connection with FIG. 65c.

The calendar data from nonparticipants button 6513 allows a user to retrieve calendar data from users of the server 108 who may not be participating in a particular active/on-going/existing conference. That is, while a current user such as the "ME" user is conducting a conference with three other participants, such as John Doe1, Jane Doe1, and Jane Doe2, the "ME" user may also review calendar data of users who may not be part of the conference involving the four participants of John Doe1, Jane Doe1, and Jane Doe2, and the "ME" user.

Figure 65B:
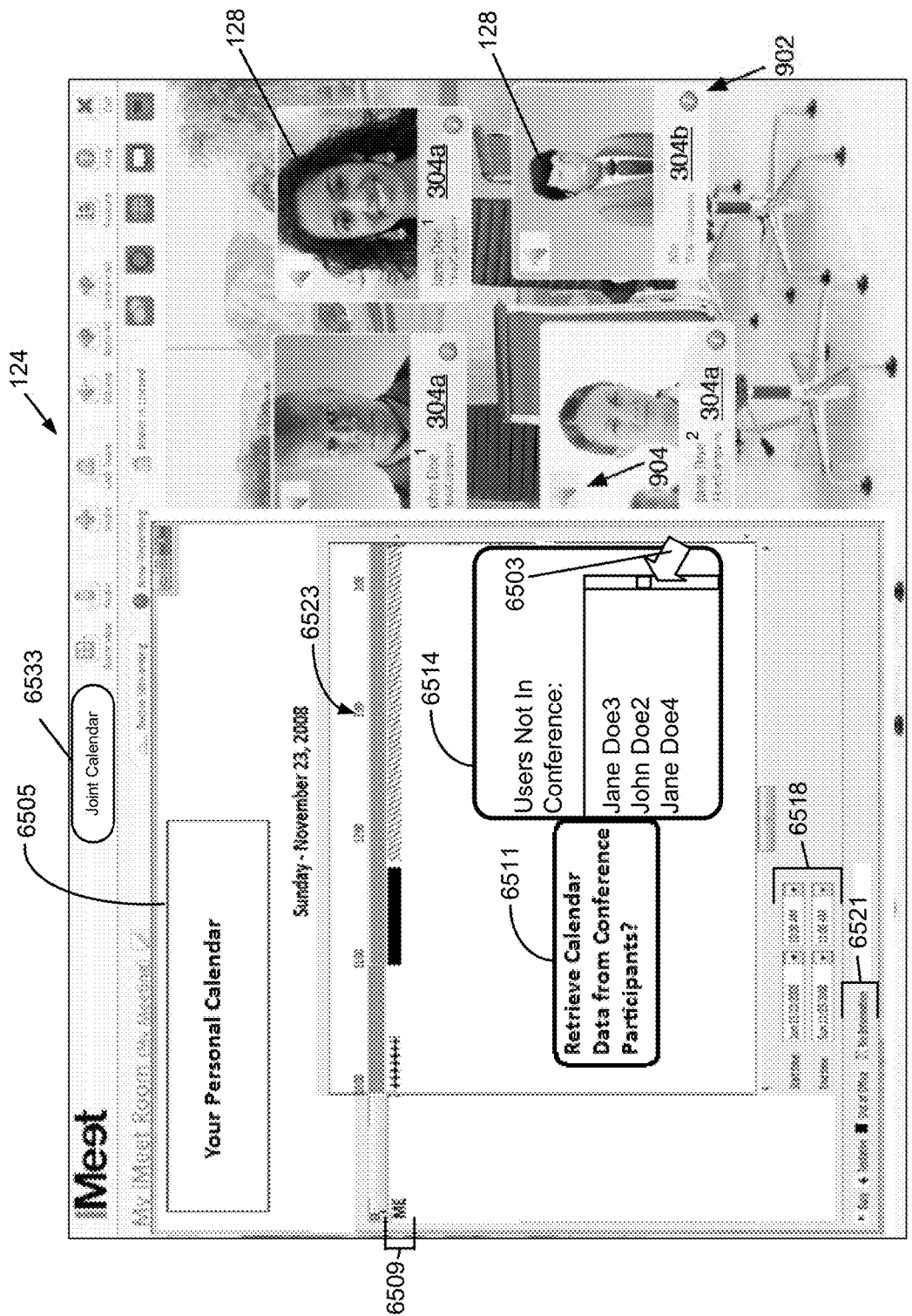
FIG. 65*b* is a screen shot illustrating an embodiment of the virtual conference location of FIG. 65*a* with a calendar for a single participant and an option for pulling calendar data from users not in a current conference.

FIG. 65b is a screen shot illustrating an embodiment of the virtual conference location of FIG. 65a with a calendar for a single participant and an option for retrieving calendar data from users not in a current conference. In FIG. 65B, a scrollable menu 6514 may be displayed in response to a user selecting the calendar data from nonparticipants button 6513 of FIG. 65a. The scrollable menu 6514 may list users of the server 108 who are not participating with an existing or on-going conference, such as the one between John Doe1, Jane Doe1, and Jane Doe2, and the "ME" user as illustrated in FIG. 65b.

A user may select names of nonparticipants in the menu 6514 with the screen pointer 6503, so that the calendar module(s) 429 may retrieve the calendar data of the nonparticipants. A user may select one or more nonparticipants from the menu 6514. After the names of one or more nonparticipants are selected from the menu 6514, the calendar module(s) 429 may display the schedule in a graphical manner for the nonparticipants, such as generating a row of data similar to row 6509 of FIGS. 65a-b.

Figure 65C:
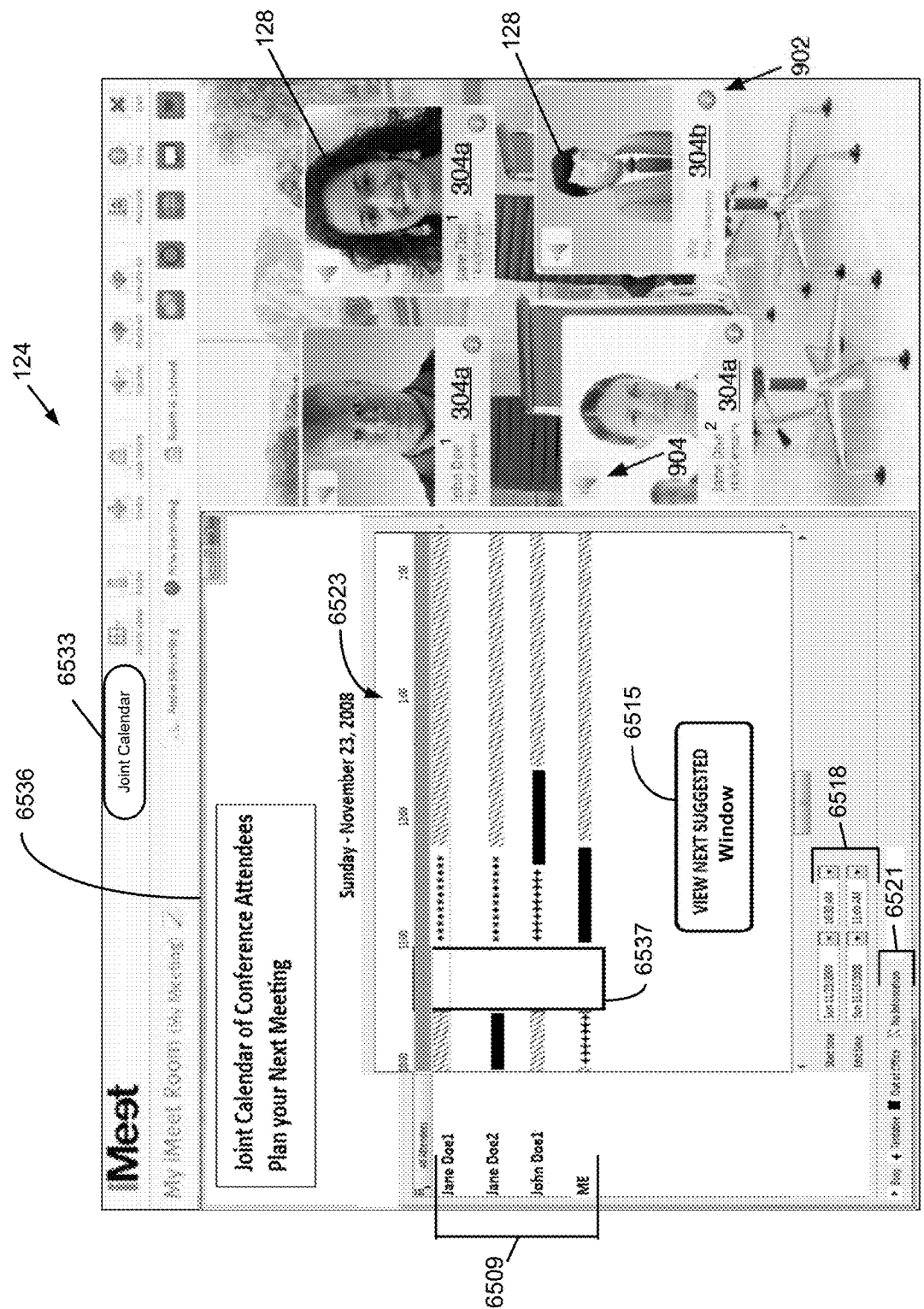
FIG. 65*c* is a screen shot illustrating an embodiment of the virtual conference location of FIG. 65*a* with a joint calendar for multiple participants.

FIG. 65c is a screen shot illustrating an embodiment of the virtual conference location of FIG. 65a with a joint calendar 6536 for multiple users of the server 108. The joint calendar 6536 may be generated in response to a user selecting nonparticipants from menu 6514 or by selecting calendar data from conference participants button 6511 or both. The joint calendar 6536 may also be generated in response to a user selecting the joint calendar button 6533 illustrated in FIGS. 65a-c. The joint calendar 6536 can display times of day 6523 for conference participants as well as nonparticipants as described above.

Multiple rows 6509 of calendar data may be displayed with the joint calendar. In the embodiment illustrated in FIG. 65c, the times of day 6523 for the four conference participants John Doe1, Jane Doe1, and Jane Doe2, and the "ME" user are displayed. The calendar module(s) 429 of FIG. 4 can retrieve calendar data from users of the server 108 and then merge this data so that it can be displayed in graphical manner in a single user interface, such as the joint calendar 6536 of FIG. 65c. One of ordinary skill in the art recognizes that other graphical representations of the merged calendar data can be employed and are within the scope of the invention. For example, instead of displaying rows 6509 of symbols representing status, the calendar module(s) 429 could display text-based listings of times of day and use words, such as "busy", "tentative," "unknown," or available.

In addition to displaying the merged calendar data in a graphical manner as illustrated in rows 6509 of FIG. 65c, the calendar module(s) 429 may also review the merged calendar data to determine common availability among the participants of the conference, or among nonparticipants relative to the conference, or any combination thereof. In the embodiment of FIG. 65c, the calendar module(s) 429 has identified a window 6537 of availability among the four participants John Doe1, Jane Doe1, and Jane Doe2, and the "ME" user. The calendar module(s) 429 has highlighted this window 6537 with a rectangular box. Other graphical elements besides a rectangular box could be employed to indicate common or shared availability and are within the scope of the invention. For example, other graphical elements could include using a particular symbol for each row 6509 to indicate availability, such as the letter "A."

The joint calendar 6536 may also include a next suggested window button 6515. In response to selecting the next suggested window button 6515, the calendar module(s) may search the joint calendar data for the next availability window and then display the times of day which may contain this next availability window.

Each user of the joint calendar 6536 or the personal calendar 6505 may use the screen pointer 6503 two block out or select the times for a future meeting. In response to this selection, the calendar module(s) 429 of FIG. 4 may send out meeting requests which correspond to the selected times so that each participant may accept those times and have them inserted into their respective electronic calendars.

For example, the meeting requests could comprise e-mail messages containing calendar requests such as those generated by off-the-shelf software platforms, like MICROSOFT™ Outlook calendar software, in which a user can accept such e-mail messages so that the meeting information contained within the e-mail messages is automatically inserted into the calendar software, such as the calendar maintained by MICROSOFT™ Outlook brand software. The joint calendar 6536 allows a single user to select and block out times for future meetings for all of the participants displayed on the joint calendar 6536. This means that a single user such as the "ME" user may select and block out times for the John Doe1, Jane Doe1, and Jane Doe2 users of the embodiment illustrated in FIG. 65. When the single "ME" user selects and blocks out the times for the other users, this can cause the calendar program module(s) 429 to produce meeting requests which are e-mailed to each of the participants, including the "ME" user.

Figure 66:
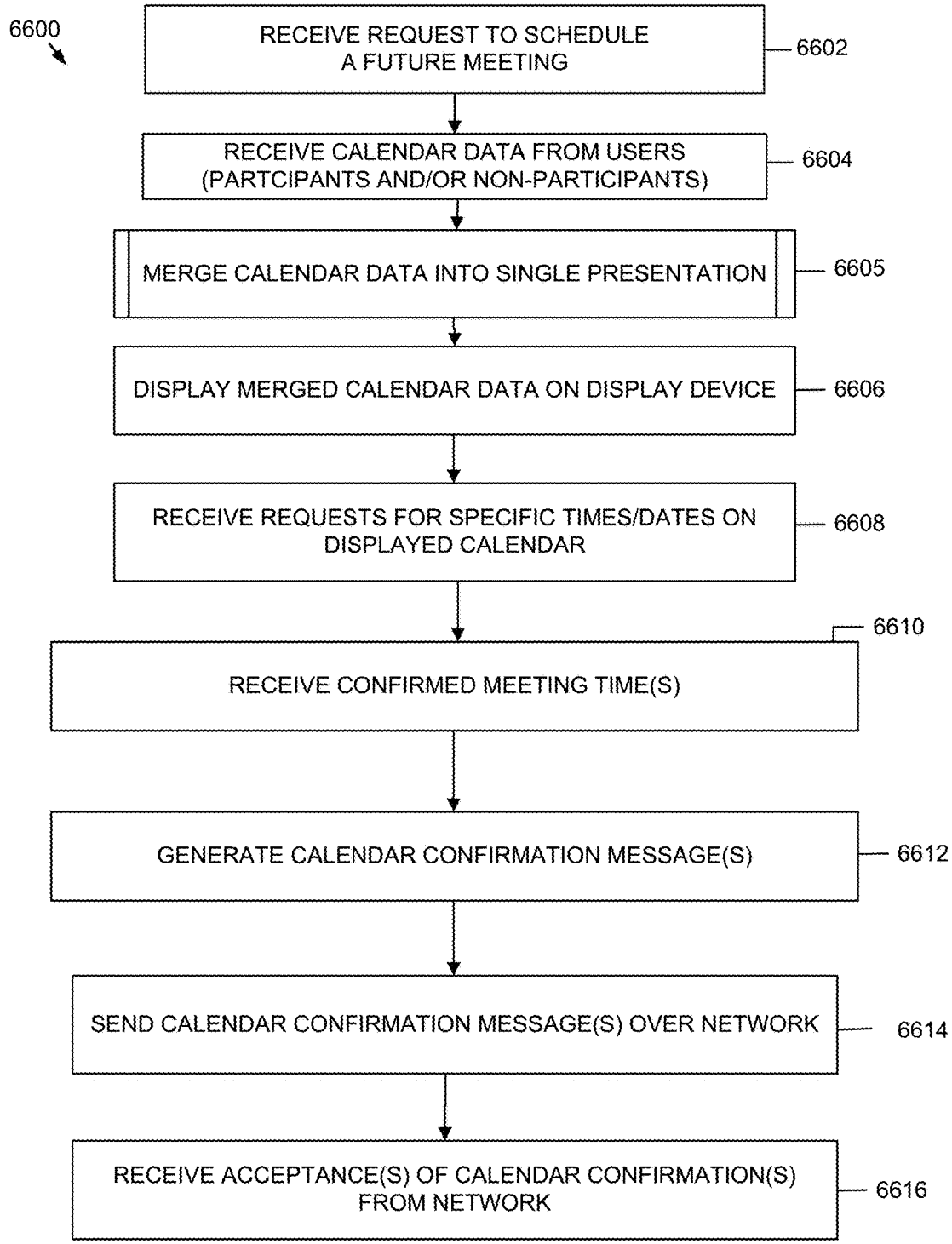
FIG. 66 is a flowchart illustrating an embodiment of the operation of the calendar function of FIGS. 65*a-c*.

FIG. 66 is a flowchart illustrating an embodiment of the operation of the calendar function of FIGS. 65a-c. Specifically, FIG. 66 illustrates an embodiment of a method 6600 for providing calendar functions. At block 6602, the calendar module(s) 429 of FIG. 4 may receive a request to schedule a future meeting. This request may be generated in response to a user selecting the joint calendar button 6533, the calendar button 4222 of FIG. 42b, or the calendar button 4222 of FIG. 61.

At block 6604, the calendar module(s) 429 of FIG. 4 may request and receive calendar data from a single user or from multiple conference participants depending upon what button/function was selected. If only an individual or single calendar 6505 was selected, then the conference module(s) 429 may display this data as illustrated in FIG. 65a. If only the personal calendar 6505 was selected, then the process may end at the step.

At block 6604, if the joint calendar option was selected in block 6602, then the conference module(s) 429 may request and receive the calendar data from one or more conference participants and/or nonparticipants as selected by a user. Then, at block 6605, which may comprise a routine or sub-method, the calendar module(s) 429 may merge the calendar data from the conference participants and nonparticipants. Further details of the routine or sub-method 6605 will be discussed in further detail below in connection with FIG. 67.

At block 6606, the calendar module(s) 429 may display the merged calendar data on a display device in the format of a joint calendar 6536, such as illustrated in FIG. 65c. For the suggested days with shared availability as identified by the routine or submethod of block 6605, the calendar module(s) 429 may highlight the shared availability among the users with a rectangular window as illustrated in FIG. 65c. At block 6608, the calendar module(s) may receive requests for specific times/dates to be displayed on the joint calendar 6536. These requests may come in the form of a user moving the screen pointer 6503 to screen controls such as a scrollbar or drop down menus 6518.

At block 6610, the calendar module(s) 429 may receive confirmed meeting times as selected by one or more users. At this stage, the confirmed meeting times may be received in response to a user double-clicking on times/regions of the joint calendar 6536 for one or more rows 6509 of the joint calendar. The confirmed meeting times may also be received in response to a user double-clicking the suggested meeting window 6537 of FIG. 65c.

At block 6612, the calendar module(s) 429 may generate one or more calendar confirmation messages that can comprise one or more e-mails that contain the selected future meeting time. As noted previously, these calendar confirmation messages can comprise e-mails which allow a user to select or to "opt-in" for a suggested future meeting time. These e-mails can comprise those formatted similar to current off-the-shelf products, like MICROSOFT™ Outlook brand meeting requests.

At block 6614, the calendar module(s) 429 may send the calendar confirmation messages over the network 110 to client device 102. If a client device 102 accepts or rejects a calendar confirmation message, then the calendar module(s) 429 may receive a confirmation message over the network 110 indicating whether the client device 102 accepted or rejected the meeting request.

Figure 67:
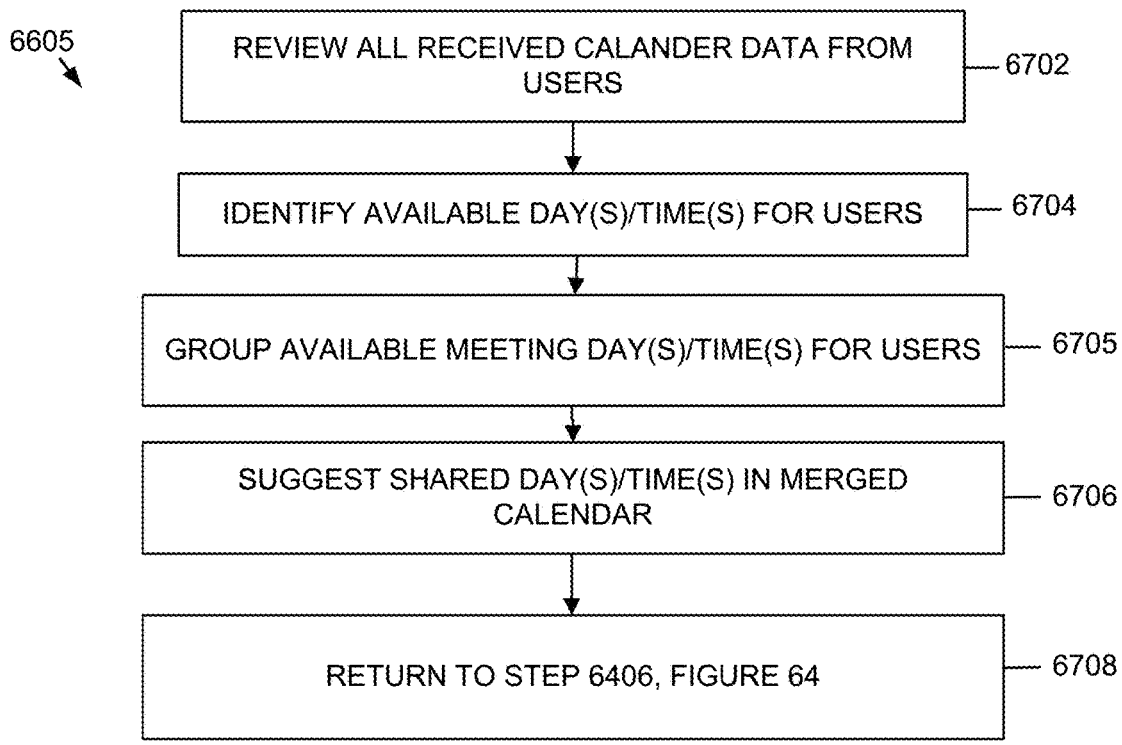
FIG. 67 is a flowchart illustrating an embodiment of the operation of a merging routine described in the flowchart of FIG. 66.

FIG. 67 is a flowchart illustrating an embodiment of the operation of a merging routine 6605 described in the flowchart of FIG. 66. Block 6702 is the first step of the merging routine 6605 of FIG. 67. At block 6702, the calendar module(s) 429 review all of the received calendar data from the selected users. As noted previously, the users can include participants in the meeting as well as users who are not participating in the current/active/on-going meeting.

At block 6704, the calendar module(s) 429 can identify days and times in which the users may have availability in each respective schedule of a user. At block 6705, the calendar module(s) 429 can look for common or shared availability among the users and group or otherwise identify these available meeting days and times. At block 6706, the calendar module(s) 429 may suggest the specific dates and times found in block 6705 in which the users have shared availability. At block 6708, the sub-method returns to block 6606 of FIG. 66.

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the multi-platform virtual conference location system. Furthermore, the logical functions may be embodied in any computer readable medium for use by or in connection with an instruction execution system, apparatus, or device, such as a computer-based system, processor-containing system, or other system associated with the multi-platform virtual conference location system that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for providing a virtual conference, the method comprising:

a conferencing system establishing a virtual conference between a plurality of participants and presenting a conference user interface comprising a plurality of interactive participant objects uniquely identifying the plurality of participants in the virtual conference;

the conferencing system receiving, during the virtual conference and via the conference user interface, a request to schedule, during the virtual conference, a future meeting involving two or more of the participants in the virtual conference and at least one non-participant, the request initiated by a first of the two or more participants selecting a calendar button displayed in their own interactive participant object; and during the virtual conference between the plurality of participants, the conferencing system scheduling via the conference user interface the future meeting involving the two or more of the participants in the virtual conference and the non-participant by:
- in response to the first participant selecting the calendar button in their own interactive participant object, the conferencing system displaying a future meeting schedule window in the conference user interface, the future meeting schedule window comprising a participant selection window and a non-participant selection window;
- the conferencing system receiving a first user selection of the other of the two or more participants and the non-participant for the future meeting via the participant selection window and the non-participant selection window;
- the conferencing system displaying in the conference user interface a calendar associated with a first conference participant identifier corresponding to the first participant;
- in response to the first user selection of the other of the two or more participants and the non-participant to participate in the future meeting, the conferencing system requesting calendar data associated with the selected non-participant and one or more second conference participant identifiers corresponding to the other of the two or more selected participants in the virtual conference;
- the conferencing system receiving the calendar data through one or more communication channels associated with the one or more second conference participant identifiers and the non-participant;
- merging the received calendar data and displaying the merged calendar data as a joint calendar in the conference user interface presented to the participants during the virtual conference, the joint calendar graphically displaying a shared availability window associated with the one or more conference participant identifiers in registration with respective timelines associated with the participants in an interactive display for navigating from a first shared available window to view a next suggested window; and
- receiving a second user selection of a confirmed meeting time for the future meeting via the joint calendar displayed in the conference user interface from the two or more participants in the virtual conference.

2. The method of claim 1, wherein the conferencing system scheduling the future meeting during the virtual conference comprises the conferencing system providing an audio conference associated with the one or more conference participant identifiers.

3. The method of claim 1, wherein the conferencing system displaying the interactive display comprises symbols arranged along the respective timelines that represent availability and unavailability associated with respective conference participant identifiers.

4. The method of claim 1, wherein the request to retrieve the calendar data is initiated by selecting a calendar button presented in a business card component associated with one of the interactive participant objects presented in the conference user interface.

5. The method of claim 1, further comprising the conferencing system generating calendar confirmation messages.

6. The method of claim 5, further comprising the conferencing system sending the calendar confirmation messages over a computer network to the nonparticipant and the two or more participants in the virtual conference to attend the future meeting.

7. A method for providing a virtual conference, the method comprising:
- a conferencing system establishing a virtual conference between a plurality of participants and presenting a conference user interface comprising a plurality of interactive participant objects uniquely identifying the plurality of participants;
- the conferencing system receiving, during the virtual conference and via the conference user interface, a request to schedule a future meeting involving two or more of the participants in the virtual conference and at least one non-participant, the request initiated by a first of the two or more participants selecting a calendar button displayed in their own interactive participant object; and
- during the virtual conference between the plurality of participants, the conferencing system scheduling via the conference user interface the future meeting by:
  - in response to the first participant selecting the calendar button in their own interactive participant object, the conferencing system display a future meeting schedule window in the conference user interface, the future meeting schedule window comprising a participant selection window and a non-participant selection window;
  - the conferencing system receiving a first user selection of the other of the two or more participants and the non-participant for the future meeting via the participant selection window and the non-participant selection;
  - in response to the first user selection of the other of the two or more participants and the non-participant, the conferencing system receiving a request to retrieve calendar data associated with the selected non-participant and one or more conference participant identifiers corresponding to the other of the two or more selected participants in the virtual conference;
  - the conferencing system receiving the calendar data through one or more communication channels associated with the two or more conference participant identifiers and the non-participant;
  - merging the received calendar data and displaying the merged calendar data as a joint calendar in the conference user interface presented to the participants during the virtual conference, the joint calendar graphically displaying respective timelines associated with the one or more conference participant identifiers in an interactive display including an element for selectively navigating between suggested shared available windows represented in registration with the respective timelines; and
  - receiving a second user selection of a confirmed meeting time for the future meeting via the joint calendar from the two or more participants in the virtual conference.

8. The method of claim 7, wherein the conferencing system displaying the interactive display comprises symbols along a timeline that represent availability and unavailability associated with a respective conference participant identifier.

9. A conferencing system for providing a virtual conference, the system comprising:

a processor, wherein the processor is operable to:
: establish a virtual conference between a plurality of participants and present a conference user interface to the plurality of participants during the virtual conference, the conference user interface comprising a plurality of interactive participant objects uniquely identifying the plurality of participants;
: receive, during the virtual conference and via the conference user interface, a request to schedule, during the virtual conference, a future meeting involving two or more of the participants and at least one non-participant, the request initiated by a first of the two or more participants selecting a calendar button displayed in their own interactive participant object;
: in response to the first participant selecting the calendar button in their own interactive participant object, displaying a future meeting schedule window in the conference user interface, the future meeting schedule window comprising a participant selection window and a non-participant selection window;
: receive a first user selection of the other of the two or more participants and the non-participant for the future meeting via one of the participant selection window and the nonparticipant selection window;
: in response to the first user selection, request calendar data associated with the non-participant and one or more conference participant identifiers corresponding to the other of the two or more of the participants in the virtual conference;
: receive calendar data through one or more communication channels associated with the non-participant and the one or more conference participant identifiers;
: merge the calendar data associated with the non-participant and the one or more conference participant identifiers with the first selecting participant's calendar;
: display the merged calendar data as a joint calendar in the conference user interface presented to the participants during the virtual conference, the joint calendar graphically displaying a plurality of shared availability windows in registration with symbolically represented timelines associated with the one or more conference participant identifiers in an interactive display for selectively navigating the merged calendar data to display times of day that may contain a next availability window;
: receiving a second user selection of a confirmed meeting time for the future meeting via the joint calendar from the two or more participants in the virtual conference; and
: schedule the future meeting during the virtual conference based on the merged calendar data and the second user selections of the confirmed meeting time.

10. The conferencing system of claim 9, further comprising a display device, and wherein the processor is further operable to display the merged calendar data on the display device.

11. The conferencing system of claim 9, wherein the processor is further operable to establish an audio conference among one or more conference participant identifiers.

12. The conferencing system of claim 9, wherein the request to retrieve the calendar data is initiated by selecting a calendar button presented in a business card component associated with one of the interactive participant objects presented in the conference user interface.

* * * * *